US010172750B1

(12) United States Patent
Dickie

(10) Patent No.: US 10,172,750 B1
(45) Date of Patent: Jan. 8, 2019

(54) POWER ASSIST APPARATUS FOR HAND-PROPELLED WHEELCHAIRS

(71) Applicant: Paul C. Dickie, Clovis, CA (US)

(72) Inventor: Paul C. Dickie, Clovis, CA (US)

( * ) Notice: Subject to any disclaimer, the term of this patent is extended or adjusted under 35 U.S.C. 154(b) by 0 days.

(21) Appl. No.: 15/293,271

(22) Filed: Oct. 13, 2016

Related U.S. Application Data

(60) Provisional application No. 62/339,020, filed on May 19, 2016, provisional application No. 62/240,940, filed on Oct. 13, 2015.

(51) Int. Cl.
*A61G 5/04* (2013.01)
*A61G 5/10* (2006.01)

(52) U.S. Cl.
CPC .............. *A61G 5/047* (2013.01); *A61G 5/043* (2013.01); *A61G 5/1054* (2016.11)

(58) Field of Classification Search
CPC ....... A61G 5/043; A61G 5/047; A61G 5/1054
USPC ...................................... 280/304.1
See application file for complete search history.

(56) References Cited

U.S. PATENT DOCUMENTS

| 5,234,066 | A | * | 8/1993 | Ahsing | .................. | A61G 5/045 |
| | | | | | | 180/11 |
| 5,351,774 | A | | 10/1994 | Okamoto | | |
| 5,494,126 | A | | 2/1996 | Meeker | | |
| 5,495,904 | A | | 3/1996 | Zwaan et al. | | |
| 5,531,284 | A | | 7/1996 | Okamoto | | |
| 5,651,422 | A | | 7/1997 | Casali | | |
| 5,988,304 | A | | 11/1999 | Behrendts | | |
| 6,481,514 | B2 | | 11/2002 | Takada | | |
| 6,766,871 | B2 | | 7/2004 | Sawyer | | |
| 6,860,347 | B2 | | 3/2005 | Sinclair et al. | | |
| 6,896,079 | B1 | | 5/2005 | Axelsson | | |
| 8,430,189 | B2 | | 4/2013 | Tallino | | |
| 8,469,383 | B2 | | 6/2013 | Zhou et al. | | |
| 8,738,278 | B2 | | 5/2014 | Chen | | |
| 8,960,340 | B2 | | 2/2015 | Tallino | | |
| 9,050,227 | B1 | * | 6/2015 | Hargroder | .............. | A61G 5/047 |
| 9,688,340 | B1 | * | 6/2017 | Kroymann | .............. | B62K 13/04 |
| 2017/0203811 | A1 | * | 7/2017 | Germanovsky | ...... | B62K 27/003 |

* cited by examiner

*Primary Examiner* — Joseph M Rocca
*Assistant Examiner* — Felicia L. Brittman
(74) *Attorney, Agent, or Firm* — Richard A. Ryan

(57) ABSTRACT

A power assist apparatus that converts a hand-propelled wheelchair to a motorized wheelchair without the use of tools or mounting brackets. The apparatus has a motorized mechanism, a pair of outrigger assemblies, pivot mechanisms and position sensors. The motorized mechanism has a battery, a control mechanism and a pair of motorized sections that each have an electric motor and a wheel. The outrigger assemblies have arms that support the drive wheels of the wheelchair above the surface to be traversed. The position sensors determine movement of the outrigger assemblies or a wheel support mechanism attached thereto in response to rotation of the drive wheels by the occupant and transmit data to the control mechanism to operate the motors to move the wheelchair in the direction indicated by the drive wheels, thereby controlling movement of the apparatus in the same manner as the hand-propelled wheelchair.

27 Claims, 35 Drawing Sheets

POWER ASSIST APPARATUS FOR HAND-PROPELLED WHEELCHAIRS

CROSS-REFERENCE TO RELATED APPLICATIONS

This patent application claims priority to U.S. Provisional Patent Application Ser. No. 62/240,940 filed Oct. 13, 2015 and to U.S. Provisional Patent Application Ser. No. 62/339,020 filed May 19, 2016.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The field of the present invention relates generally to hand-propelled wheelchairs having a pair of large drive wheels. In particular, the present invention relates to power assist apparatuses that are configured for use with hand-propelled wheelchairs to electrically power the wheelchair. Even more particularly, the present invention relates to such apparatuses that are configured as an attachment that engages the drive wheels to lift and move the wheelchair.

B. Background

Many people, whether due to age, injury or birth defect, require use of an apparatus that can safely support him or her and allow the person to be mobile. The most common type of apparatus for support and mobility is a wheelchair. A typical wheelchair comprises a support frame, a pair of large drive wheels that are rotatably attached to the support frame, one or more front support wheels that project forward from the frame, an occupant seat supported by the frame between the drive wheels and a pair of rearward extending handles. Most wheelchairs are manually operated by the person sitting in the seat or by a person who uses the handles to push the wheelchair. With regard to being operated by a person sitting in the seat, the wheelchair is propelled and directed by the occupant using his or her hands to engage and turn the drive wheels. As well known by persons who are skilled in the art, the occupant rotates the drive wheels forward or rearward to move the wheelchair forward or rearward and applies a twisting motion to the drive wheels to move the wheelchair left or right. Such hand-propelled wheelchairs have been in use for many years and have been the subject of many improvements.

Despite the numerous improvements to hand-propelled wheelchairs, they still have the limitation that the person in the wheelchair or a person pushing the wheelchair with an occupant in the seat must exert sufficient force to move the occupied wheelchair along a surface, such as the floor, sidewalk, driveway, ground or other surface. Depending on the weight of the occupant, the strength of the person moving the wheelchair, the smoothness and/or texture of the surface and other factors, it can be somewhat difficult to move the occupied wheelchair across the surface. In particular, movement of a wheelchair across a carpeted surface can be very tiring for the occupant. In addition, moving the occupied wheelchair over long distances, uphill or across surface obstacles (such as sidewalk joints and the like) only increases the difficultly for the occupant and/or the person pushing the occupied wheelchair. These and other difficulties generally limit the mobility of a person in a wheelchair.

To address some of the limitations associated with hand-propelled wheelchairs, one development has been the availability of powered wheelchairs. One type of powered wheelchair utilizes a motor, typically an electric motor, that is fixedly attached to and fixedly engaged with the wheelchair such that it is always powered. This type of wheelchair is particularly beneficial for persons who have no or limited use of their arms or hands and, therefore, are unable to operate the drive wheels of the wheelchair to propel themselves. Full time powered wheelchairs are also particularly useful for persons who do not have anyone available to push the wheelchair, particularly over longer distances. Unfortunately, however, this type of wheelchair is usually quite expensive to purchase, heavy to load or otherwise move and they can be difficult to maintain. In addition to these limitations, under certain circumstances many people prefer the use of a hand-propelled wheelchair instead of the fixed powered wheelchairs. Financial and storage limitations generally prevent most people from having both a hand-propelled wheelchair and an electrically powered wheelchair.

An alternative to wheelchairs that are fixedly powered are power assist apparatuses that can be removably attached to a hand-propelled wheelchair to, at least temporarily, convert the hand-propelled wheelchair to a powered wheelchair. In general, most such power assist devices comprise an assembly that includes an electric motor that powers one or more wheels that either pushes or pulls the hand-propelled wheelchair across a surface. Examples of power assist apparatuses that attach to a hand-propelled wheelchair to, at least effectively, push a wheelchair across a surface are described in U.S. Pat. No. 9,050,227 to Hargroder, U.S. Pat. No. 6,860,347 to Sinclair, et al., U.S. Pat. No. 6,481,514 to Takada, U.S. Pat. No. 5,988,304 to Behrendts, U.S. Pat. No. 5,531,284 to Okamoto and U.S. Pat. No. 5,351,774 to Okamoto. Generally, these patents describe power assist apparatuses that attach to a portion of the wheelchair frame in a manner which positions one or more electrically powered wheels behind the wheelchair. Examples of power assist apparatuses that attach to a hand-propelled wheelchair to, at least effectively, pull a wheelchair across a surface are described in U.S. Pat. No. 6,766,871 to Sawyer, U.S. Pat. No. 5,651,422 to Casali and U.S. Pat. No. 5,494,126 to Meeker. Generally, these patents describe power assist apparatuses that attach to a front portion of the wheelchair frame or the front wheels of the wheelchair so as to position one or more electrically powered wheels forward of the front wheels of the wheelchair.

Another type of power assist apparatus that is configured for use with a hand-propelled wheelchair engages the wheelchair toward the center portion of the wheelchair to lift part of the wheelchair off of the surface so the apparatus can move the wheelchair across the surface. An example of such a power assist apparatus is described in U.S. Pat. No. 6,896,079 to Axelson. This patent describes an apparatus that utilizes a small electric scooter that is removably connected to a hand-propelled wheelchair with the frame of the scooter disposed under the wheelchair and between the drive wheels in a manner that generally lifts the front wheels of the wheelchair slightly off of the ground. U.S. Pat. Nos. 8,960,340 and 8,430,189 to Tallino describe a power assist apparatus that has a pair of electric motors that each turn a wheel of the apparatus, a latching mechanism that secures the apparatus to the wheelchair and a controller that allows the user to control the apparatus. When the apparatus is attached to the wheelchair, the drive wheels of the wheelchair are lifted off of the surface and the user controls the directional movement of the powered wheelchair with the controller. U.S. Pat. No. 5,234,066 to Ahsing, et al. describes a power assist apparatus that is positioned between the drive wheels of the wheelchair having a pair of motors that each, independently, drive one of the wheelchair drive wheels to propel the wheelchair. Movement of the drive wheels by the user applying force to the rims thereof initiate operation of the electric motors. U.S. Pat. No. 5,350,032 to Smith describes a power conversion kit that has one or more power hubs that are integrated into the rear drive wheels of the wheelchair using the same holes that are provided for mounting the rear wheels of the wheelchair.

Despite the general availability and advantages of the above and other power assist apparatuses for electrically powering a hand-propelled wheelchair, at least relative to hand-propelled wheelchairs and wheelchairs that are fixedly provided with electrical power, there are problems or other limitations that generally reduce the effectiveness and ease of using these apparatuses. What is needed, therefore, is an improved power assist apparatus for use with hand-propelled wheelchairs that can be easily and removably attached to such wheelchairs to electrically power the wheelchair. The new power assist apparatus should be configured to engage and moveably support a hand-propelled wheelchair to assist the user thereof, whether the occupant or someone pushing the wheelchair, with moving the wheelchair across a surface. The power assist apparatus should be adaptable for use with a wide variety of hand-propelled wheelchairs without requiring modifications to the wheelchair and without the need for tools to secure the apparatus to the wheelchair. Preferably, the new power assist apparatus will allow the occupant thereof to control the directional movement of the wheelchair in at least substantially the same manner as he or she would without the apparatus. The new power assist apparatus should be easy to use, lightweight and relatively inexpensive to manufacture.

SUMMARY OF THE INVENTION

The power assist apparatus of the present invention provides the benefits and solves the problems identified above. That is to say, the power assist apparatus of the present invention is configured to be utilized with a hand-propelled wheelchair to electrically power the wheelchair. The new power assist apparatus is structured and arranged to be easily, quickly and removably attached to a hand-propelled wheelchair to assist the occupant or a person pushing the wheelchair with moving the wheelchair across a surface. The power assist apparatus of the present invention removably engages and moveably supports the drive wheels of a hand-propelled wheelchair in a manner that allows the occupant to control the movement of the wheelchair in substantially the same manner as he or she would the non-assisted hand-propelled wheelchair. More specifically, the new power assist apparatus allows the occupant to use the wheelchair hand rim drive wheels as the control mechanism of the new apparatus. The new power assist apparatus can be utilized with a wide variety of hand-propelled wheelchairs, including folding and rigid wheelchairs, without requiring modifications to the wheelchair and without the need for tools to secure the new apparatus to the wheelchair. One particular feature of the power assist apparatus of the present invention is that it utilizes a pair of outrigger assemblies that support the wheelchair hand rims in a manner that allows the occupant to utilize the power-assisted wheelchair in the same manner as he or she would utilize the manual wheelchair, but without having to push the manual drive wheels in full rotation. This feature is particularly important for wheelchair users that are suffering from shoulder injuries caused by continued manual wheelchair usage. In the preferred configurations, the power assist apparatus of the present invention is easy to use, lightweight and relatively inexpensive to manufacture.

In one embodiment of the present invention, the new power assist apparatus for manual or hand-propelled wheelchairs generally comprises a motorized mechanism, a pair of outrigger assemblies, a pivot mechanism, a pair of position sensor mechanisms and one or more outrigger support assemblies. In this embodiment, the motorized mechanism is structured and arranged to be at least substantially positioned between the first drive wheel and the second drive wheel of the wheelchair, under the seat area thereof, so as to move the wheelchair across the surface. The motorized mechanism has a first motorized section that positioned generally toward or at the first drive wheel and a second motorized section that is positioned generally at or toward the second drive wheel when the apparatus is in use with the wheelchair. The motorized mechanism has a motor at each of the first motorized section and the second motorized section, a control mechanism operatively connected to each of the motors so as to control the operation of the motors, a battery electrically connected to each of the motors and the control mechanism to provide power to the motors and the control mechanism, a first wheel operatively connected to the motor of the first motorized section and a second wheel operatively connected to the motor of the second motorized section. One outrigger assembly is associated with the first motorized section and the other outrigger assembly is associated with the second motorized section of the motorized mechanism. Each outrigger assembly has one or more support arms that are attached to and support a wheel support mechanism. In one embodiment, each outrigger assembly has a forward arm, a front wheel catch at a distal end of the forward arm, a rearward arm and a back wheel catch at a distal end of the rearward arm. Depending on which side of the apparatus the outrigger assembly is located, each front catch is structured and arranged to engage and support a forward side of either the first drive wheel or the second drive wheel and each back catch is structured and arranged to support a rearward side of either the first drive wheel or the second drive wheel when the wheelchair is utilized with the power assist apparatus. In an alternative embodiment, each outrigger assembly has a curved, elongated wheel catch that is generally configured in the shape of an inverted bicycle wheel fender that receives the entire lower portion of either the first drive wheel or the second drive wheel, depending which side of the apparatus the outrigger assembly is located, to support the wheelchair on the apparatus when the wheelchair is utilized with the apparatus. In use, the two elongated wheel catches also protect the manual drive wheels from ever touching the ground when the power assist apparatus is moving the wheelchair.

The pivot mechanism is operatively associated with each outrigger assembly and is structured and arranged to allow the outrigger assembly associated with the first motorized section to pivot independent of the outrigger assembly associated with the second motorized section. A position sensor mechanism is operatively associated with each of the outrigger assemblies to determine the respective movement of each of the outrigger assemblies. Each of the position sensor mechanisms are electrically connected to the battery and electronically connected to the control mechanism to transmit position information of the outrigger assemblies to the control mechanism. The position sensor mechanisms are used to provide self-balancing operation for the power assist apparatus. Each of the outrigger support assemblies pivotally support one outrigger assembly at the first motorized section and the other of the outrigger assemblies at the second motorized section. The support arm or arms of the outrigger assemblies are structured and arranged to extend outward from the support assemblies to support, using a respective wheel support mechanism, each of the first drive wheel and the second drive wheel of the wheelchair in spaced apart relation to the surface on which the wheelchair is to be moved. In use, rotational movement of one or more of the drive wheels of the wheelchair, typically by the occupant of the wheelchair, will pivot one or more of the outrigger assemblies and cause positional information to be transmitted to the control mechanism and then operational control information to be transmitted to the motors of at least one of the first motorized section and the second motorized section to move the wheelchair in the direction desired by movement of the one or more of the drive wheels. As such, the apparatus powered wheelchair is controlled in the same manner as the wheelchair would be controlled without the apparatus.

Preferably, the apparatus has one or more front wheels and one or more back wheels, with each of the front wheels being rotatably attached to a front wheel bracket that is attached to or integral with either the outrigger assembly or the support assembly and each of the back wheels being rotatably attached to a back wheel bracket that is attached to or integral with either the outrigger assembly or the support assembly. In the preferred configuration, each of the back wheels are configured to be angularly positioned relative to the front wheels so as to provide braking action for the power assist apparatus when the occupant pulls back on both of the manual drive wheels of the wheelchair. In addition to providing braking action, one of the angled back wheels will make contact with the floor or other surface while turning in the direction of the back wheel to help turn the power assist apparatus. In the preferred configuration, the back wheels are angled so as to follow the direction of rotation of the apparatus. In the preferred embodiments, the motorized mechanism comprises a wheelmotor at each of the first motorized section and the second motorized section that is sized and configured to power the new apparatus.

In some embodiments of the new power assist apparatus, each of the first motorized section and the second motorized section has a support assembly and the pivot mechanism is operatively positioned between and interconnecting the first motorized section and the second motorized section so as to allow the first motorized section and the second motorized to pivot relative to each other upon movement of the respective outrigger assemblies by rotational movement of one or more of the drive wheels of the wheelchair. In one configuration, the pivot mechanism comprises a pivot bearing that is associated with each of the first motorized section and the second motorized section. In another configuration, the apparatus has an extender positioned between the first motorized section and the second motorized section and a pivot tube disposed through a tube opening in the extender. The extender is sized and configured to position the first motorized section in spaced apart relation to the second motorized section to reduce some manufacturing costs and provide improved operational performance of the new apparatus. The pivot tube interconnects and rotationally engages the pivot bearing associated with the first motorized section and the pivot bearing associated with the second motorized section to allow the first motorized section to pivot relative to the second motorized section. Each of the support assemblies can comprise a support frame, with each of the outrigger assemblies attached to or integral with the support frame at the first motorized section and the second motorized section. Typically, the battery and the control mechanism will be supported by at least one of the support frames. In an embodiment where the motorized mechanism is a prior art "hoverboard" having a pair of pressure sensitive foot placement areas, the support assembly can comprises a transverse member that interconnects the forward and rearward arms of each of the outrigger assemblies. The transverse member can have one or more contact members attached thereto or integral therewith, with the contact members being sized and configured to engage the foot placement areas of the motorized mechanism upon movement of the outrigger assemblies in response to rotational movement of the drive wheels of the wheelchair. This engagement of the foot placement areas will direct positional information from the position sensor mechanism to the control mechanism and operatively control movement of the power assist apparatus.

In another, likely preferred, embodiment, the support assembly is a support frame that is disposed between and interconnects the first motorized section and the second motorized section and which allows each of the outrigger assemblies to pivot relative to the support frame and to the motorized mechanism at each of the first motorized section and the second motorized section upon rotational movement of one or more of the drive wheels of the wheelchair. Typically, the battery and the control mechanism will be supported by the support frame. The pivot mechanism of this embodiment is structured and arranged to allow each of the outrigger assemblies to pivot relative to the support frame and to each of the first motorized section and the second motorized section. In one configuration, the pivot mechanism comprises a pivot block that is attached to or integral with each of the outrigger assemblies and one or more enlarged sections that are attached to or integral with opposing sides of the support frame. The enlarged sections are sized and configured to be received in a pivot aperture of the pivot block so as to allow the pivot blocks and the outrigger assemblies to pivot relative to the support frame and to the respective motorized sections. In another embodiment, likely the most preferred, the pivot mechanism is positioned above the support frame and secured thereto in a manner that allows the pivot block to pivot relative to (and above) the support frame when the respective outrigger assembly is pivoted by movement of the respective wheelchair drive wheel by the user of the power assist apparatus. The pivot mechanism of this embodiment includes a pair of bearing blocks, for each support assembly, that are mounted to the support frame and configured to support the pivot block thereof above the support frame. The pivot block is shaped and configured to pivot between the pair of bearing blocks. Mounted to the support arm of the outrigger assembly are pivot wheels that are shaped and configured to rotatably engage the pivot block in a manner that allows the support arm of the outrigger assembly to slide relative to the pivot block to allow the apparatus to be utilized with both the rigid and folding types of wheelchairs.

In any of these embodiments, the apparatus will typically include one or more shrouds and one or more lower housings, with each of the shrouds and the lower housings being configured to engage the support assembly so as to cover and protect the battery and control mechanism. In one of the preferred embodiments, each of the outrigger assemblies has an elongated member, a forward adjustable member and a rearward adjustable member, with each of the front wheel catches attached to or integral with a forward adjustable member and each of the back wheel catches attached to or integral with a rearward adjustable member. In this embodiment, the forward adjustable member and rearward adjustable member are structured and arranged to move the forward wheel catches and the rearward wheel catches inward or outward (i.e., toward or away from the center of the apparatus) to allow the user to adjust the width between the pair of forward wheel catches and between the pair of rearward wheel catches to correspond to the width between the first drive wheel and the second drive wheel of the wheelchair. In the embodiment utilizing the single curved, elongated wheel catch at each of the outrigger assemblies, each of the forward adjustable member and the rearward adjustable member are attached to the elongated wheel catch to move the elongated wheel catch inward or outward. In either configuration, use of the adjustable members allows the apparatus to fit wheelchairs having different spacing between the two drive wheels thereof.

Accordingly, the primary object of the present invention is to provide a new power assist apparatus for use with hand-propelled wheelchairs that has the advantages discussed above and which overcomes the various disadvantages and limitations that are associated with presently available power assist apparatuses.

It is an important object of the present invention to provide a power assist apparatus for use with a hand-propelled wheelchair that removably engages the wheelchair to electrically power the wheelchair to make it much easier for the occupant of the wheelchair or a person pushing the wheelchair to move the wheelchair across a surface.

An important aspect of the present invention is that it provides a new power assist apparatus for use with a hand-propelled wheelchair that accomplishes the objectives set forth above and elsewhere in the present disclosure.

Another important aspect of the present invention is that it provides a new power assist apparatus for use with a hand-propelled wheelchair that is structured and arranged to be easily, quickly and removably attached to a hand-propelled wheelchair.

Another important aspect of the present invention is that it provides a new power assist apparatus for use with a hand-propelled wheelchair that removably engages and moveably supports the rear drive wheels of the wheelchair in a manner that allows the occupant to control the movement of the wheelchair in substantially the same manner, by grasping and directing the hand rims of the drive wheels, as he or she would to move the non-power assisted hand-propelled wheelchair.

Another important aspect of the present invention is that it provides a new power assist apparatus for use with a hand-propelled wheelchair that has a wheeled motorized mechanism and a support assembly which cradles each of the rear drive wheels of the wheelchair to lift the drive wheels off of the ground, with the motorized mechanism providing motion to the wheelchair as directed by input from the user through the hand rim drive wheels of the wheelchair.

Another important aspect of the present invention is that it provides a new power assist apparatus for use with a hand-propelled wheelchair that, in one of the preferred configurations, utilizes a two-wheeled, gyroscopic self-balancing vehicle (commonly referred to as a "hoverboard") as the motorized mechanism of the power assist apparatus to drive the wheelchair.

Another important aspect of the present invention is that it provides a new power assist apparatus for use with a hand-propelled wheelchair that, in a preferred configuration, can be utilized with a wide variety of different styles of hand-propelled wheelchairs, including folding and rigid wheelchairs, without requiring modifications to the wheelchair and without the need for tools to secure the new apparatus to the wheelchair.

Another important aspect of the present invention is that it provides a new power assist apparatus for use with a hand-propelled wheelchair that is easy to use and lightweight.

Another important aspect of the present invention is that it provides a new power assist apparatus that is structured and arranged to allow a person who uses a manual wheelchair to simply back up onto the power assist apparatus, turn the power on and instantly have an electrically powered wheelchair and, when the power assist is not needed, to simply turn off the power and roll out of the power assist apparatus to manually use the wheelchair, all without tools, mounting brackets or assistance by another person.

Yet another important aspect of the present invention is that it provides a new power assist apparatus for use with a hand-propelled wheelchair that is relatively inexpensive to manufacture.

As will be explained in greater detail by reference to the attached figures and the description of the preferred embodiments that follows, the above and other objects and aspects are accomplished or provided for by the present invention. As set forth herein and will be readily appreciated by those skilled in the art, the present invention resides in the novel features of form, construction, mode of operation and combination of processes presently described and understood by the claims. The description of the invention is presented for purposes of illustrating one or more of the preferred embodiments of the present invention and is not intended to be exhaustive or limiting of the invention. The scope of the invention is only limited by the claims which follow after the discussion.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

Figure 1:
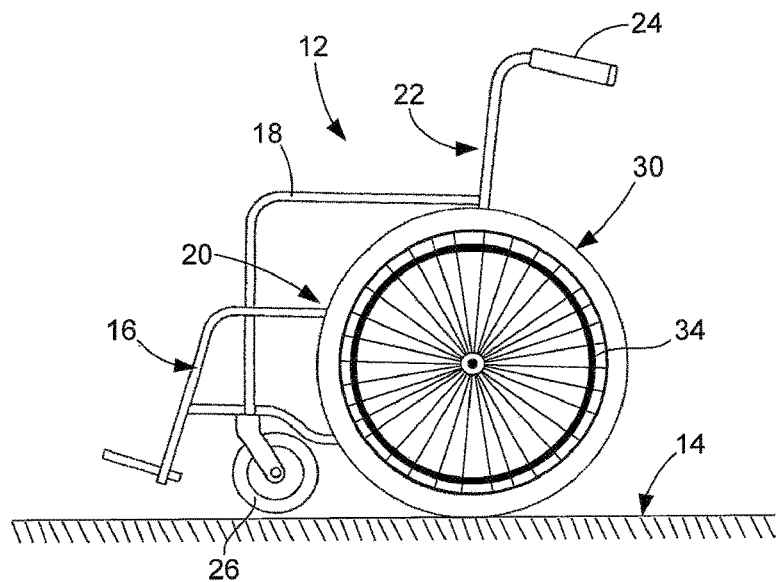
FIG. 1 is a side view of a prior art manual or hand-propelled wheelchair that can be utilized with the power assist apparatus of the present invention.

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular materials, shapes and configurations for the various components of the new power assist apparatus of the present invention, as well as an example wheelchair with which the power assist apparatus can be utilized, those skilled in the art will readily appreciate that the present invention is not so limited. In addition, the exemplary embodiment of the present apparatus is shown and described herein with only those components that are required to disclose the present invention. As such, many of the necessary mechanical elements for attaching and using the present invention are not shown or necessarily described below, but which are well known to persons skilled in the relevant art. As will be readily appreciated by such persons, the various elements of the present invention that are described below may take on any form consistent with forms that are readily realized by a person of ordinary skill in the art having general knowledge of wheelchairs and power assist apparatuses that are removably attached to wheelchairs.

A power assist apparatus that is configured pursuant to the various embodiments of the present invention is referred to generally as 10 in FIGS. 2-6, 23, 29-30, 53-54 and 63-70. As set forth in more detail below, the new power assist apparatus 10 is structured and arranged to be utilized with a hand-propelled wheelchair 12 to electrically power the wheelchair 12 to allow the user of the wheelchair 12 to move across a surface 14, such as a floor, sidewalk, driveway, street or the like, without having to manually propel the wheelchair 12. A typical hand-propelled wheelchair 12 has a frame 16 made up of a plurality of frame members 18, a seat 20 on which the occupant sits, a back support 22 against which the occupant leans against or which otherwise supports his or her back, a pair of rearwardly disposed handles 24 that are utilized by a person to push the wheelchair 12 across the surface 14, a pair of front wheels 26 rotatably attached to the frame 16, a pair of rear drive wheels (shown as left or first drive wheel 28 and right or second drive wheel 30—left/right from the perspective of an occupant sitting in the seat 20 of the wheelchair 12) and an axle 32 which interconnects the two drive wheels 28/30, as best shown in FIGS. 1-5. As well known in the art, the drive wheels 28/30 are rotatably mounted on opposite sides of the wheelchair 12 and each wheel 28/30 has a hand rim 34 that is sized and configured to be grasped by, respectively, the left or right hand of the occupant of the wheelchair 12. The hand rims 34 of the wheelchair's drive wheels 28/30 are utilized by the occupant of the wheelchair 12 to propel himself or herself across the surface 14. As well known to persons skilled in the art, the occupant moves the wheelchair 12 forward or rearward by rotating the drive wheels 28/30 in the desired forward or rearward direction and moves the wheelchair 12 right or left by moving one of the drive wheels 28/30 relative to the other drive wheel 28/30. When moving in a forward or rearward direction, the occupant rotates the drive wheels 28/30 in the opposite direction (i.e., rearward or forward) to slow or stop, respectively, the forward or rearward movement of the wheelchair 12. As explained in more detail below, the power assist apparatus 10 of the present invention is structured and arranged to be removably attached to or engaged with the wheelchair 12 in a manner that allows the occupant of the wheelchair 12 to control the movement of the now powered wheelchair 12 in substantially the same manner as he or she would without the power assist apparatus 10.

The new power assist apparatus 10 of the present invention generally comprises a specially configured electrically powered motorized mechanism 36 that moves the wheelchair 12, a support assembly 38 associated with each of the drive wheels 28/30 of the wheelchair 12 and a shroud 40 that covers, depending on the embodiment, all or part of the support assemblies 38 and/or the motorized mechanism 36. As set forth in more detail below, the power assist apparatus 10 is structured and arranged such that the two drive wheels 28/30 of the wheelchair 12 will moveably engage and be supported by the support assembly 38 in spaced apart relation above the surface 14, creating a gap 42 (which, in a preferred configuration, will be a relatively small gap 42) between the wheels 28/30 and the surface 14, across which wheelchair 12 is moved using power assist apparatus 10, as best shown in FIGS. 3-5, whether by the occupant of wheelchair 12 himself or herself or by being pushed across the surface 14 by a person using the rearwardly disposed handles 24.

Figure 2:
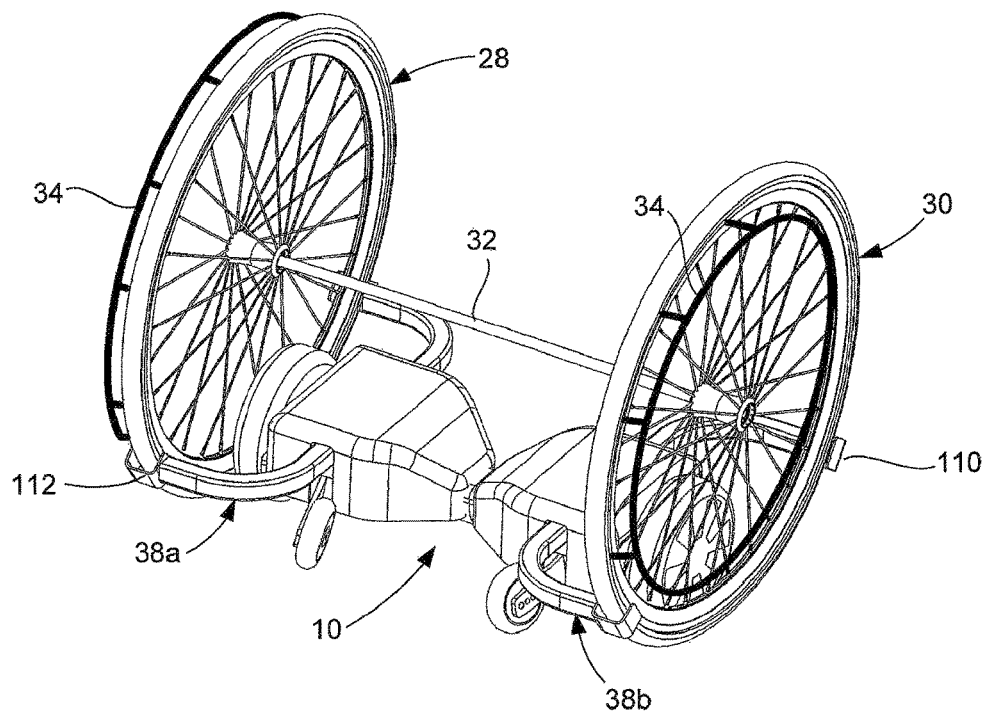
FIG. 2 is a back perspective view of a power assist apparatus that is configured according to a first embodiment of the present invention shown supporting the rear drive wheels and rear axle of a hand-propelled wheelchair.
Figure 3:
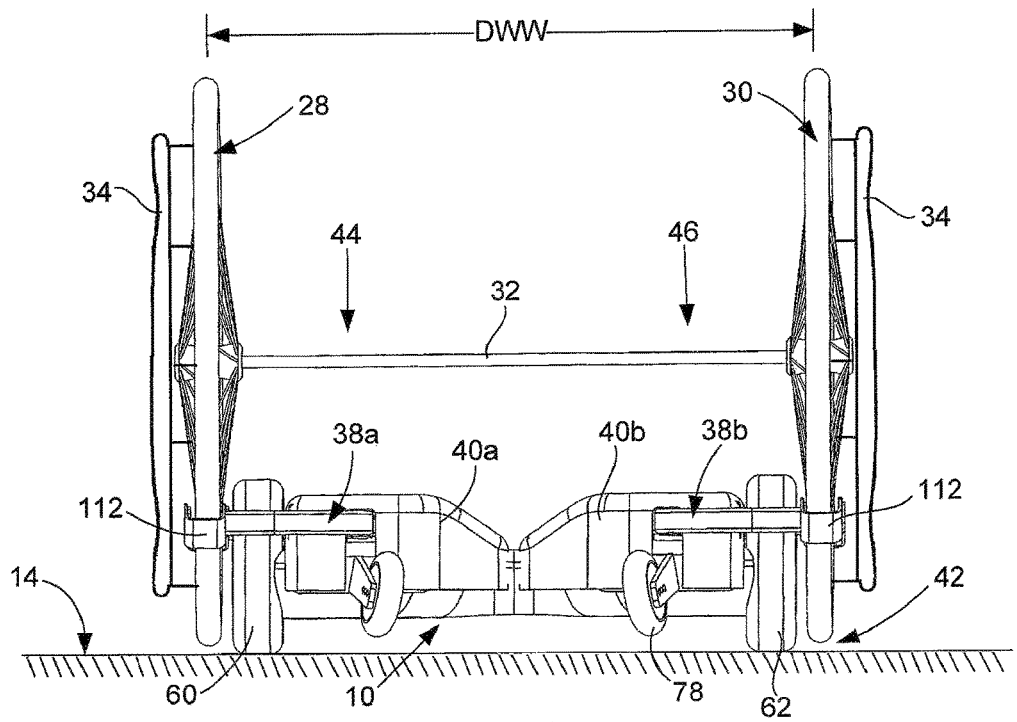
FIG. 3 is a back view of the power assist apparatus and wheelchair components of FIG. 2.
Figure 4:
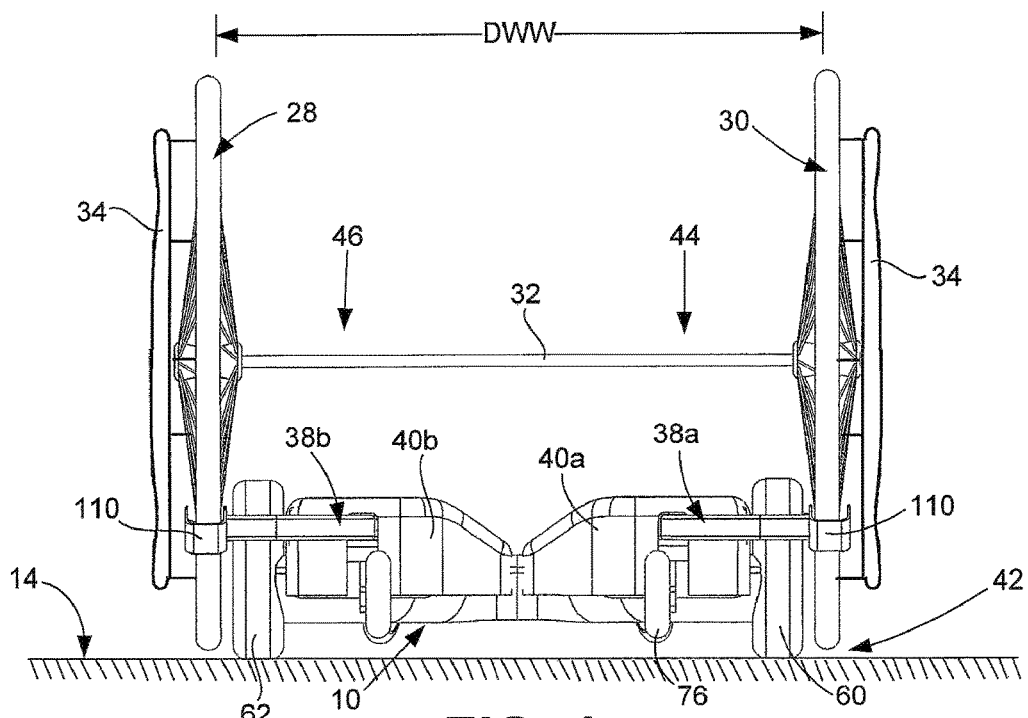
FIG. 4 is a front view of the power assist apparatus and wheelchair components of FIG. 2.
Figure 5:
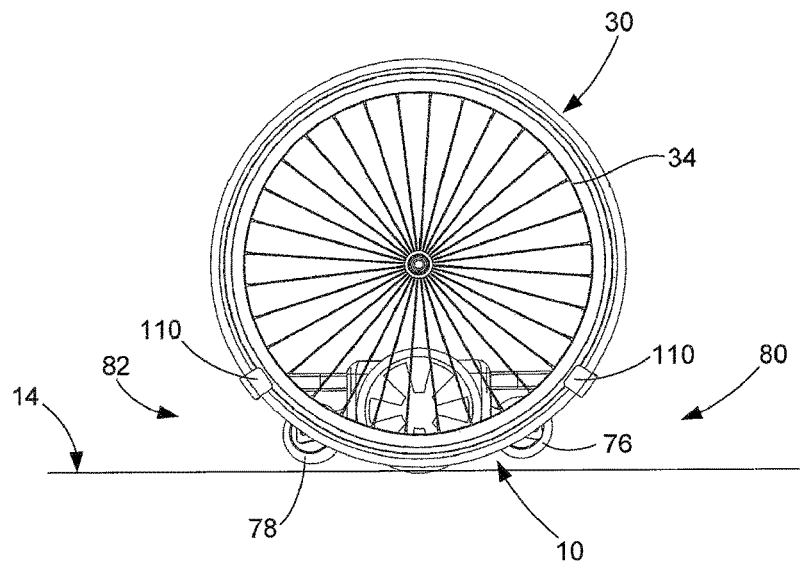
FIG. 5 is a right side view of the power assist apparatus and wheelchair components of FIG. 2.
Figure 6:
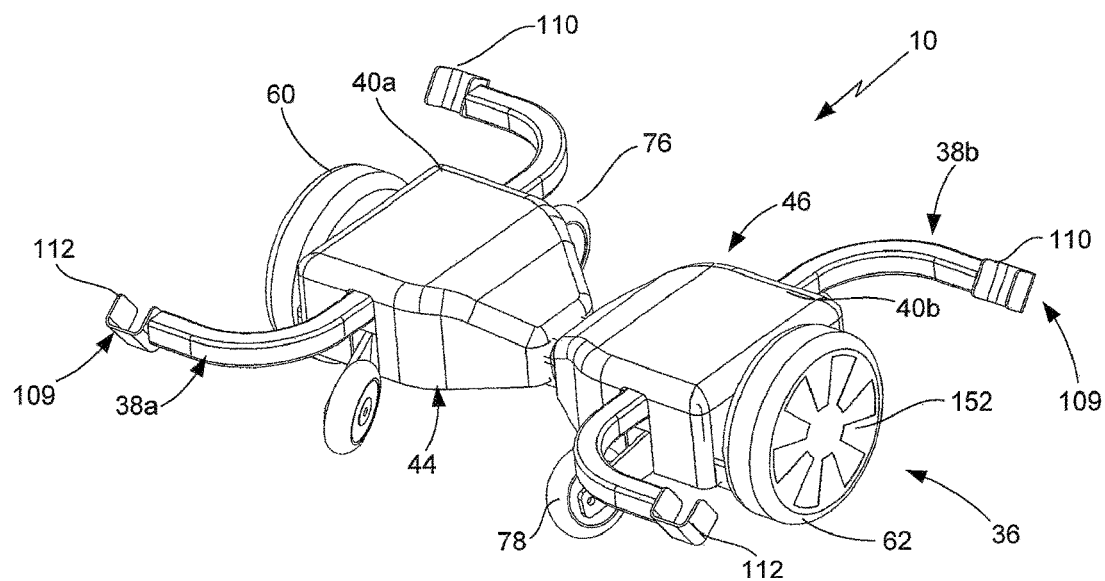
FIG. 6 is a back perspective view of the power assist apparatus of FIG. 2 shown without the wheelchair components.
Figure 7:
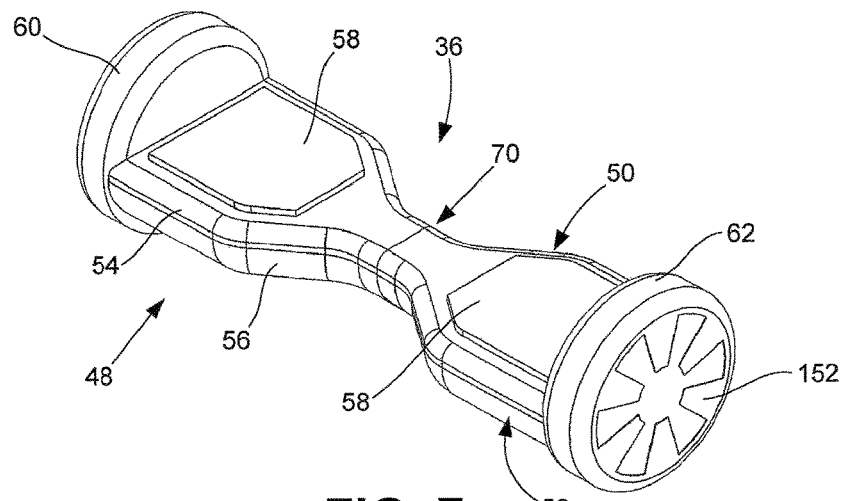
FIG. 7 is a back perspective view of a prior art motorized mechanism that is utilized with the power assist apparatus of FIG. 6.
Figure 8:
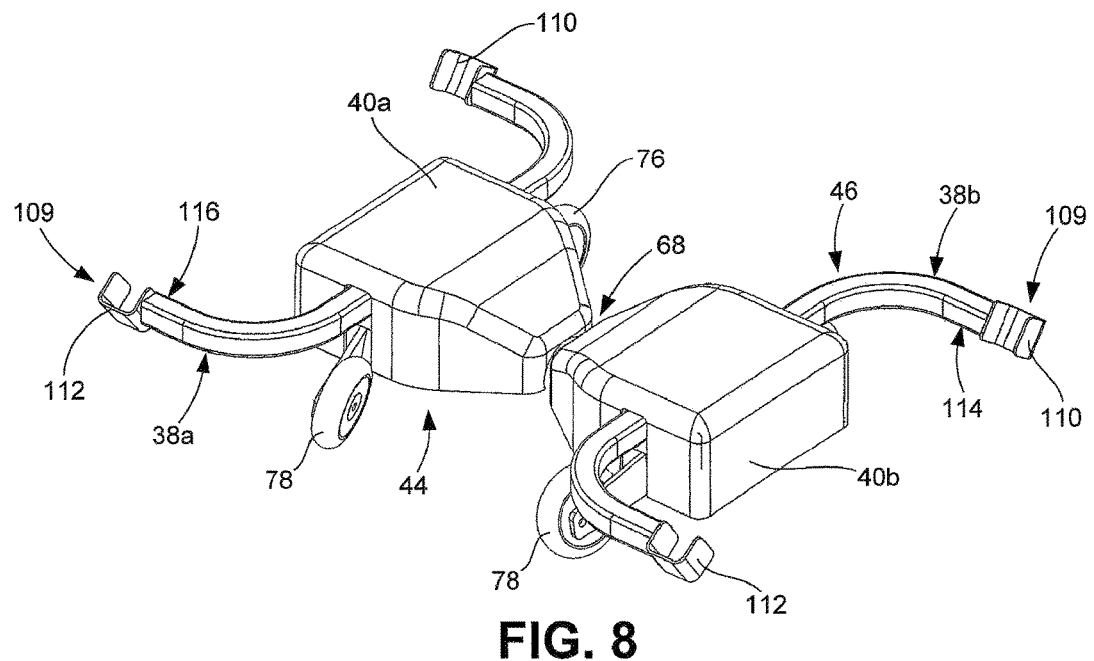
FIG. 8 is a back perspective view of the power assist apparatus of FIG. 6 shown without the motorized mechanism of FIG. 7.
Figure 9:
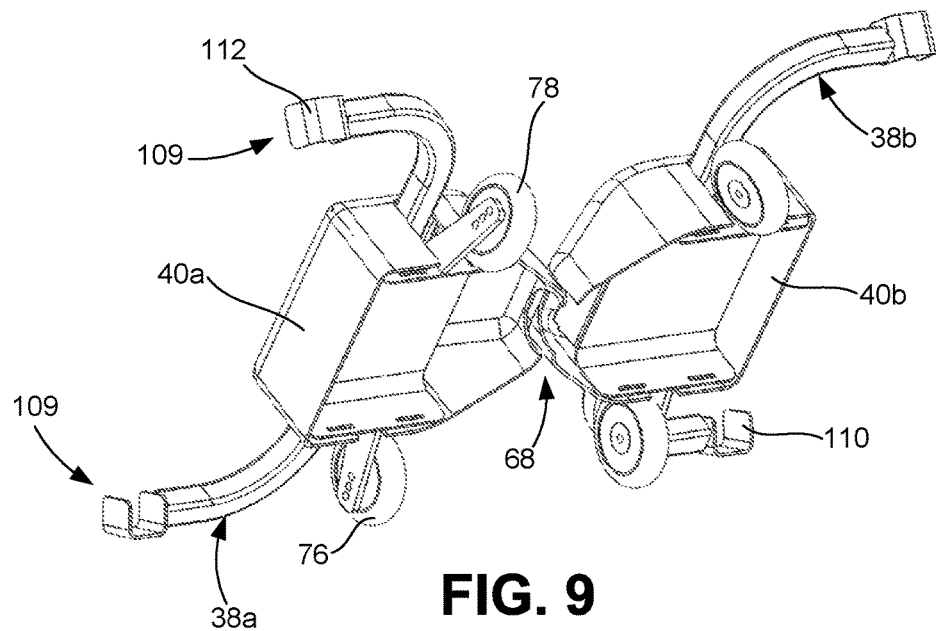
FIG. 9 is a bottom perspective view of the power assist apparatus of FIG. 8.
Figure 10:
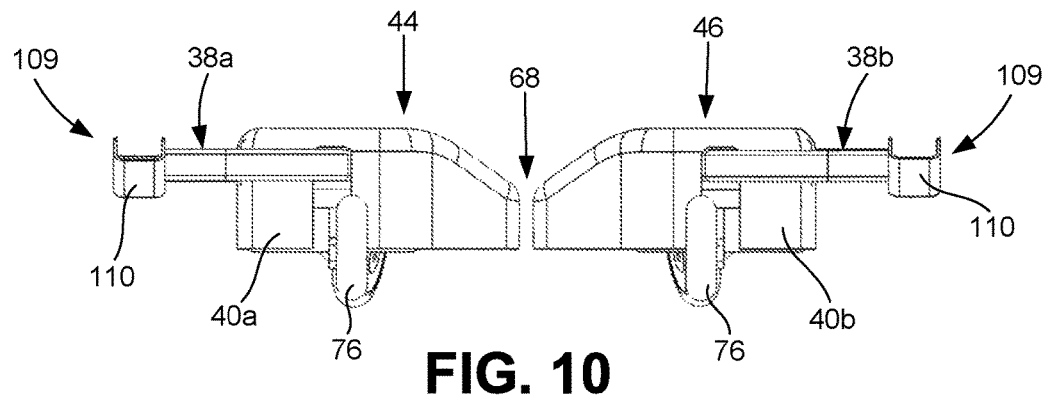
FIG. 10 is a front view of the power assist apparatus of FIG. 8.
Figure 11:
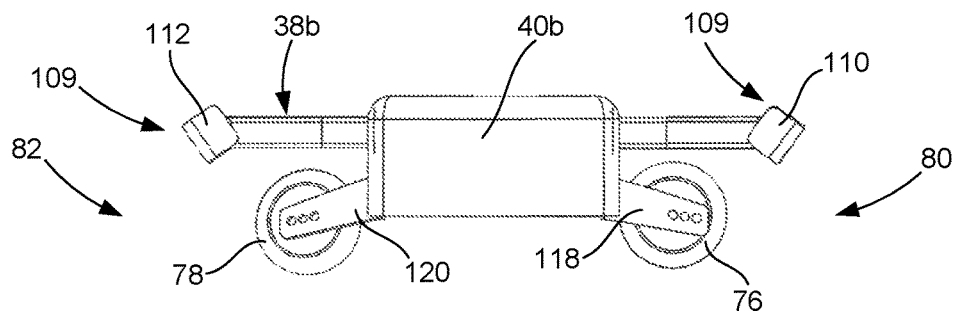
FIG. 11 is a right side view of the power assist apparatus of FIG. 8.
Figure 12:
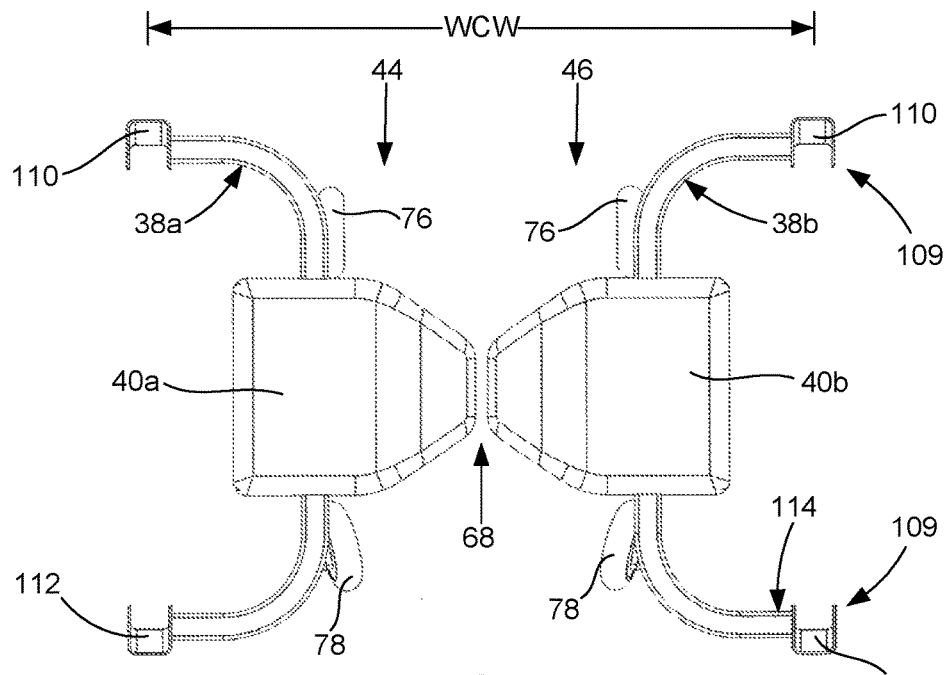
FIG. 12 is a top view of the power assist apparatus of FIG. 8.
Figure 13:
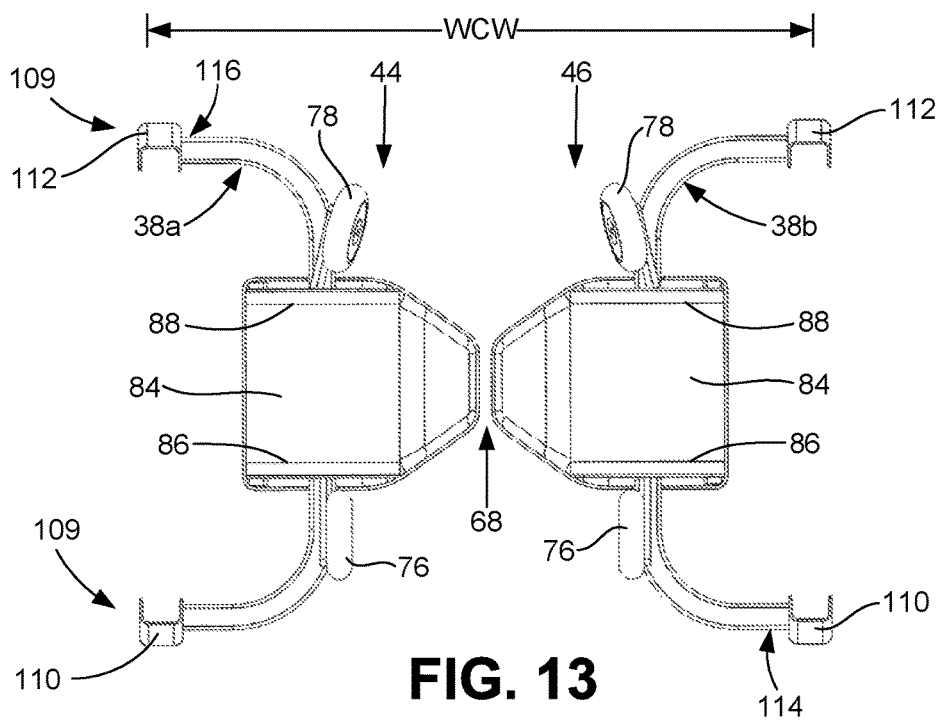
FIG. 13 is a bottom view of the power assist apparatus of FIG. 8.

In the preferred embodiments of the present invention, the new power assist apparatus 10 is configured with two substantially mirrored sides, shown as first side 44 and second side 46 in, for example, FIGS. 3-4, 6, 8, 10 and 12-14, that each have a section of the motorized mechanism 36, (shown as first motorized section 48 and second motorized section 50), a support assembly (shown as first support assembly 38a and second support assembly 38b) and a shroud (shown as first shroud 40a and second shroud 40b), as best shown in FIGS. 3, 4 and 7. The first support assembly 38a engages and supports the left drive wheel 28 of the wheelchair 12 and the second support assembly 38b engages and supports the right drive wheel 30 of wheelchair 12, as shown in FIGS. 2-4. As also shown in these figures, the first shroud 40a is associated with the first motorized section 48 of the motorized mechanism 36 and the first support assembly 38a and the second shroud 40b is associated with the second motorized section 50 of the motorized mechanism 36 and the second support assembly 38b.

In the embodiment of the power assist apparatus shown in FIGS. 2-6, the motorized mechanism 36 comprises a two-wheeled, gyroscopic self-balancing vehicle (commonly referred to as a "hoverboard"—though somewhat improperly as it does not actually hover), which is shown separately in FIG. 7. An example of this type of mechanism is the subject of U.S. Pat. No. 8,378,278 to Chen. Each of the first motorized section 48 and second motorized section 50 have a housing 52 that is defined by a top housing member 54 and a bottom housing member 56, with the top housing members 54 having a foot placement area 58 for each of the motorized sections 48/50, as shown in FIG. 7. Enclosed in each housing 52 is a drive motor, position sensor and appropriate circuit board and controller, as described in U.S. Pat. No. 8,378,278 to Chen (the disclosure of which is incorporated herein by reference as though fully set forth in the present disclosure). Inside the housing 52 of at least one of the two motorized sections 48/50 is a battery that powers the motor and the various other electrically powered internal components of the motorized mechanism. The position sensors may be gyroscopic sensors that are mounted on the circuit boards that can be fixed to the bottom housing member 56. Each drive motor is operatively connected to one of the two wheels, shown as first wheel 60 and second wheel 62 in FIG. 7. As further set forth in the patent to Chen, the sensed position from the sensors is utilized to drive the corresponding drive motor and wheel 60/62, with the controller being configured to translate position data to a motor drive signal. The motorized sections 48/50 are movably coupled together so the two sections 48/50 may pivot relative to each other. In one embodiment, a shaft is disposed through the two sections 48/50 and connected to the motorized sections using appropriate brackets and/or flanges to allow two sections 48/50 to pivot together (i.e., in the same direction) or to pivot in opposite directions.

The pivoting action allows the two sections 48/50 to tilt forward and rearward and the coupling device allows one section 48/50 to tilt with respect to the other section 48/50. When a person is standing with his or her feet on the foot placement areas 58, movement is achieved by tilting the motorized sections 48/50. Tilting both motorized sections 48/50 forward will move the motorized mechanism 36 forward. Tilting both motorized sections 48/50 rearward will move the motorized mechanism 36 rearward. Tilting one motorized section 48/50 in an opposite direction relative to the other section 48/50 will cause the wheels 60/62 to move in opposite directions, causing the motorized mechanism 36 to turn to the left or right (depending on how the motorized sections 48/50 are tilted). As set forth in more detail below, this same operation is utilized with the power assist apparatus 10 of the present invention (though not with the user's feet) to allow the occupant of the hand-propelled wheelchair 12, or a person pushing the wheelchair 12, to move the wheelchair 12 when the apparatus 10 is attached thereto for motorized movement of the wheelchair 12.

In the embodiment of the power assist apparatus 10 shown in FIGS. 2-6, the support assemblies 38 and shrouds 40, which are best shown in FIGS. 8-21, are structured and arranged to be utilized with the above-described motorized mechanism 36, best shown in FIG. 7. More specifically, the support assembly 38a and shroud 40a are structured and arranged to be mounted onto the first motorized section 48 of the motorized mechanism 36 to engage and support the first drive wheel 28 of the wheelchair 12 and the support assembly 38b and shroud 40b are structured and arranged to be mounted onto the second motorized section 50 of the motorized mechanism 36 to engage and support the second drive wheel 30 of the wheelchair 12. The inward ends 64 of the shrouds 40a/40b (shown in FIG. 21), which are positioned opposite the outward ends 66 that are located generally at the wheels 60/62, are positioned in facing relation to each other at or near a center position 68, shown in FIGS. 8-10 and 12-13, that will correspond to the center of power assist apparatus 10, to allow the two sides 44/46 of the apparatus 10 to pivot relative to each other when mounted to wheelchair 12. The center position 68 between the sides 44/46 of the apparatus 10 will at least substantially correspond to the center position 70 of the motorized mechanism 36, which is where the two motorized sections 48/50 join or connect (as shown in FIG. 7) in a manner that allows the motorized sections 48/50 to pivot relative to each other to allow the desired operation, as set forth above, of the motorized mechanism 36. As set forth in more detail below, the support assemblies 38a/38b and shrouds 40a/40b are sized and configured to be secured to the motorized mechanism 36 and still allow the motorized mechanism 36 to function in its intended manner.

The support assembly 38 associated with each side 44/46 of the new power assist apparatus 10 of the present invention, identified separately as first support assembly 38a and second support assembly 38b, are utilized to engage the two motorized sections 48/50 of the motorized mechanism 36 and to engage and support the wheels 28/30 of the hand-propelled wheelchair 12. In effect, the support assemblies 38a/38b interconnect the wheelchair 12 with the motorized mechanism 26 to "create" a motorized wheelchair 12 that is easy and quick to assemble and disassemble and that is easy to use. As will be readily understood by persons skilled in the art from the description below, when the power assist apparatus 12 is connected to wheelchair 12, the support assembly 38 allows a person sitting in the wheelchair 12 to control the movement of the now-powered wheelchair 12 by moving the hand rims 34 in the same manner as he or she would when having to hand propel the wheelchair 12, except without the effort that would otherwise be required (i.e., without the apparatus 10) by the occupant or an assistance to move the wheelchair across the surface 14. As set forth in the Background, some surfaces (such as carpeted surfaces) can be somewhat difficult for the occupant or assistant to move the wheelchair 12 across.

Each support assembly 38a/38b of the power assist apparatus 10 of the present invention shown in the embodiment of FIGS. 2-5 is structured and arranged to securely engage the motorized mechanism 36 in a manner that transfers impact force from movement of the drive wheels 28/30 of the wheelchair 12 to the foot placement areas 58 to impart the same type of directional motion as would be imparted by a person's feet on the foot placement areas 58 to operate the motorized mechanism 36 in the same manner as a person who would be standing directly on the motorized mechanism 36. Each support assembly 38 has an outrigger support assembly 72 that securely engages the motorized mechanism 36, an outrigger assembly 74 that is attached to or integral with the outrigger support assembly 72 so as to extend generally outward therefrom and removably engage the wheels 28/30 of the wheelchair 12, a forward wheel 76 that is attached to the outrigger support assembly 72 and a rearward wheel 78 that is attached to the outrigger support assembly 72, as best shown in FIGS. 14-20. The forward wheel 76 extends outward from apparatus 10 toward the forward side 80 of the power assist apparatus 10 and the rearward wheel 78 extends outward from apparatus 10 toward the rearward side 82 of the apparatus 10, as shown in FIG. 5. The terms "forward" and "front" (or like designations) are utilized herein to refer to the direction that corresponds to the forward end or front of the wheelchair 12, which is the direction the occupant of the wheelchair 12 faces when he or she is sitting on the seat 20 of the wheelchair 12 with his or her back at or near the back support 22 of the wheelchair 12. The terms "rearward" and "back" (or like designations) are utilized herein to refer to the direction that corresponds to the rearward end or back of the wheelchair 12, which is the direction the handles 24 of the wheelchair 12 are typically directed (as shown in FIG. 1) and where a non-occupant person stands when he or she is pushing the wheelchair 12.

Figure 14:
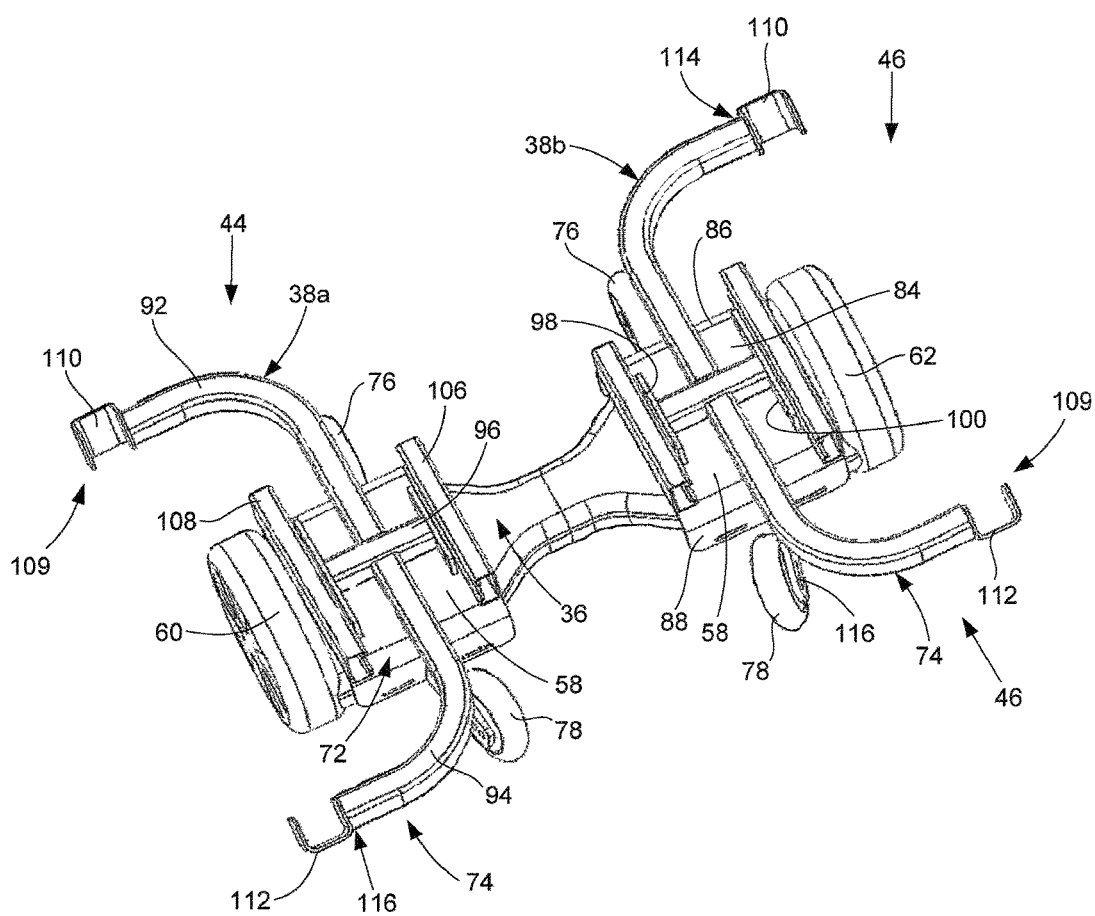
FIG. 14 is a top perspective view of the power assist apparatus of FIG. 6 shown without the shrouds.
Figure 15:
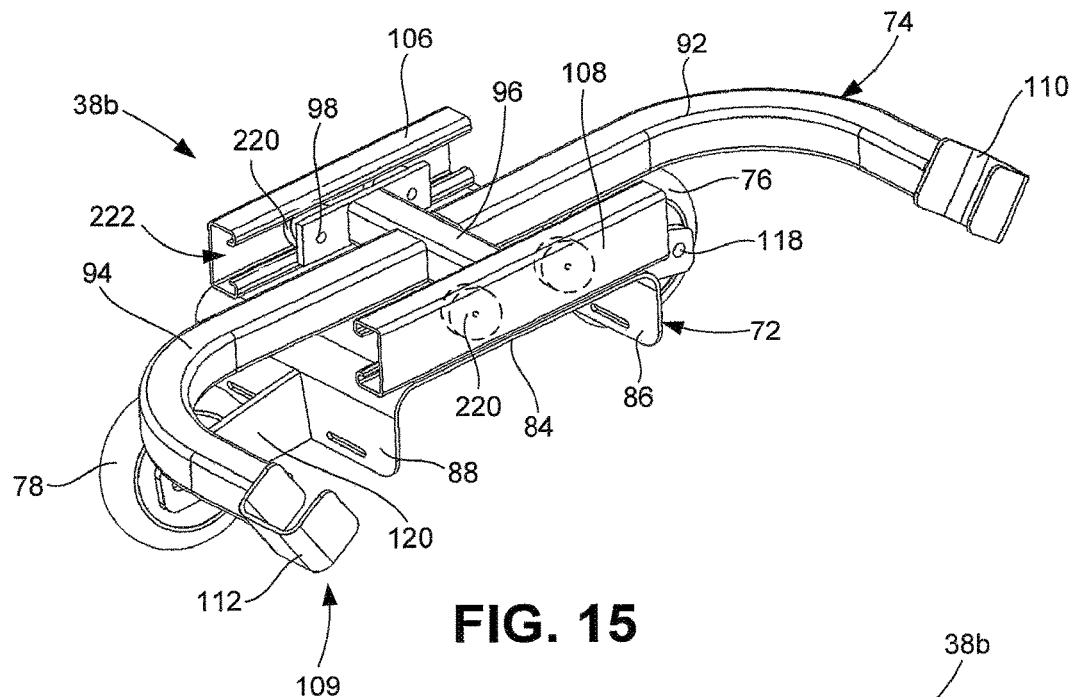
FIG. 15 is a top/back perspective view of the right side support assembly of the power assist apparatus of FIG. 14 shown without the motorized mechanism.
Figure 16:
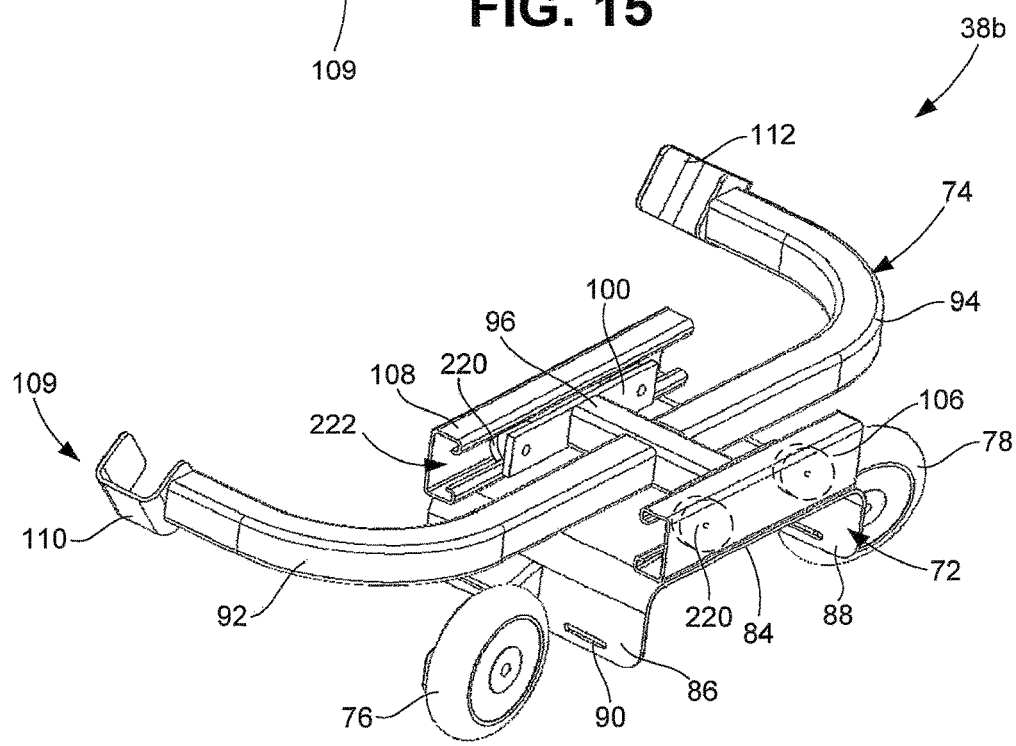
FIG. 16 is a top/front perspective view of the right side support assembly of FIG. 15.
Figure 17:
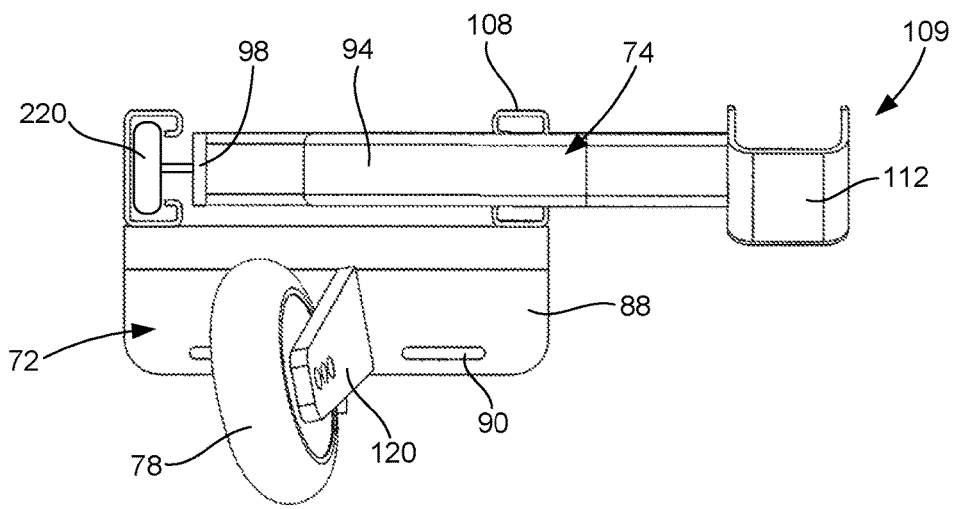
FIG. 17 is a back view of the right side support assembly of FIG. 15.
Figure 18:
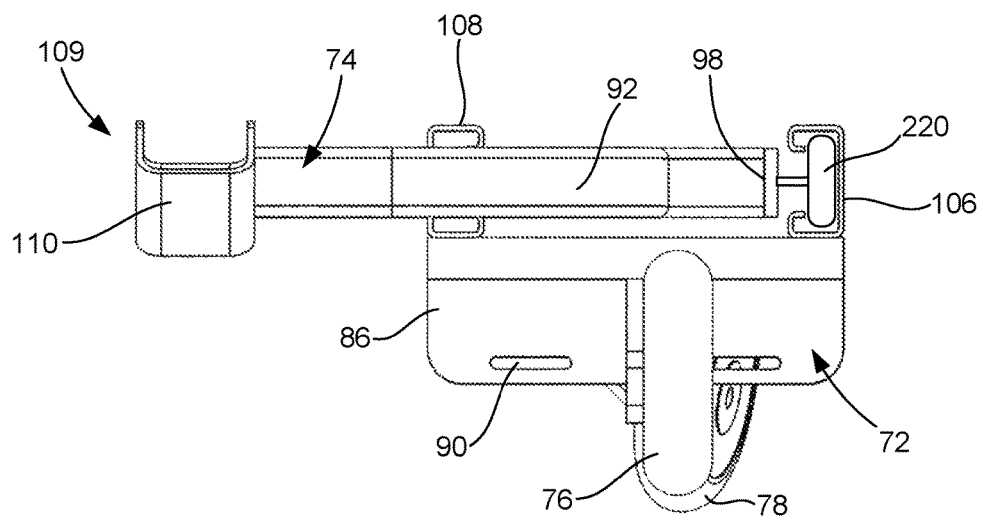
FIG. 18 is a front view of the right side support assembly of FIG. 15.
Figure 19:
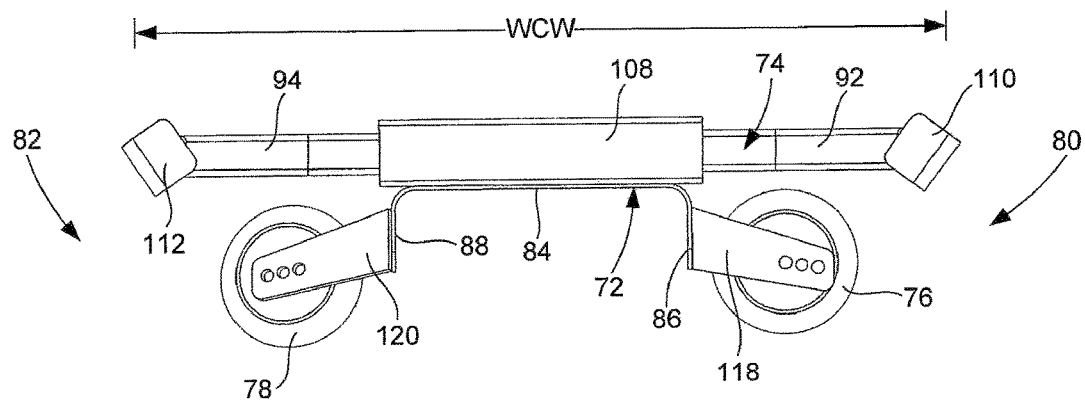
FIG. 19 is a right or outside side view of the right side support assembly of FIG. 15.

As set forth above, the outrigger support assembly 72 removably connects or attaches the support assembly 38 to the motorized mechanism 36. In the embodiment of FIGS. 14-20, the outrigger support assembly 72 comprises a footplate 84, a forward edge plate 86 and a rearward edge plate 88. The footplate 84 is sized and configured to extend across the foot placement area 58 of the motorized mechanism 36 (best shown in FIG. 7) and position the forward edge plate 86 at the forward side of the housing 52 and the rearward edge plate 88 at the rearward side of the housing 52, as best shown in FIG. 14. As best shown in FIGS. 15-16 and 19, these plates 84/86/88 are formed in a generally upside down U-shape, or the like, to engage the housing 52 of the motorized mechanism 36. As will be readily appreciated by persons skilled in the art, the edge plates 86/88 may be attached to or integral with the footplate 84. In one embodiment, the edge plates 86/88 have openings 90 that allow a connector, such as a screw, bolt or the like, to be inserted into the housing 52 of motorized mechanism 36 to securely attach the outrigger support assembly 72 to the motorized mechanism 36. As well known by persons skilled in the art, a variety of other devices or processes, including rivets, adhesives, welding and the like can be utilized to secure the outrigger support assembly 72 to the motorized mechanism 36.

The outrigger assembly 74, which is connected to or integral with the outrigger support assembly 72 on each side 44/46 of the power assist apparatus 10, is structured and arranged to releasably engage and support the respective wheel 28/30 of the wheelchair 12 in a manner that allows the occupant of the wheelchair 12 or a person pushing the wheelchair 12 to control the forward, rearward, leftward or rightward movement of the powered wheelchair 12 (i.e., the hand-propelled wheelchair 12 using the power assist apparatus 10). In one embodiment, the outrigger assembly 74 comprises a first or forward support arm 92 that extends generally forward of motorized mechanism 36, a second or rearward support arm 94 that extends generally rearward of motorized mechanism 36, a spanner or transverse member 96 that connects the two support arms 92/94 above the footplate 84, a first contact member 98 that is attached to or integral with the transverse member 96 and a second contact member 100 that is attached to or integral with the transverse member 96, as best shown in FIGS. 14-16 and 20. In the embodiment shown in the figures, the first contact member 98 is attached to or integral with an inner or first end 102 of the transverse member 96 and the second contact member 100 is attached to or integral with an outer or second end 104 of the transverse member 96. The outrigger assembly 74 also has a pair of support rails, identified as inner or first support rail 106 and outer or second support rail 108, as best shown in FIGS. 14-16. The support rails 106/108 are placed on top of the footplate 84 and are utilized to support the shrouds 40a/40b in spaced apart relation with the footplate 84 and are sized and configured to allow the support arms 92/94 to pivot with the movement of the drive wheels 28/30 of the wheelchair 12 by the occupant of the wheelchair 12. The transverse member 96, contact members 98/100 and support rails 106/108 are cooperatively structured and arranged such that each of the outrigger assemblies 74 will slide forward or rearward in response to the corresponding movement of the drive wheels 28/30 being supported by the support arms 92/94 of the respective outrigger assemblies 74 and then pivot so the contact members 98/100 will selectively, as controlled by the movement of the drive wheels 28/30 by the occupant of the wheelchair 12, contact the footplate 84 and apply pressure that causes the motorized mechanism 36 to move in the desired direction (which is similar to the pressure from a person's foot when he or she is standing on the foot placement area 58 of the motorized mechanism 36). The contact members 98/100 need to slide forward and backward to accommodate the rotation or twist of the drive wheels 28/30 of the wheelchair 12. To achieve the necessary sliding action, the contact members 98/100 have one or more (two shown) roller bearings, track wheels or like devices (collectively, referred to as "track wheels 220") that are sized and configured to move within the track 222 defined by the support rails 106/108, as best shown in FIGS. 15-18 and 20. Stop members (not shown) are utilized at the ends of the support rails 106/108 to prevent the track wheels 220 from exiting the support rails 106/108. The ability of the outrigger assemblies 74 to slide keeps the whole unit centered and aligned in position under the wheelchair 12. Because the manual drive wheels 28/30 have a much larger radius and center pivot different than the wheels 60/62, the outrigger assemblies 74 have to translate forward and rearward ad the wheelchair 12 is maneuvered.

Figure 20:
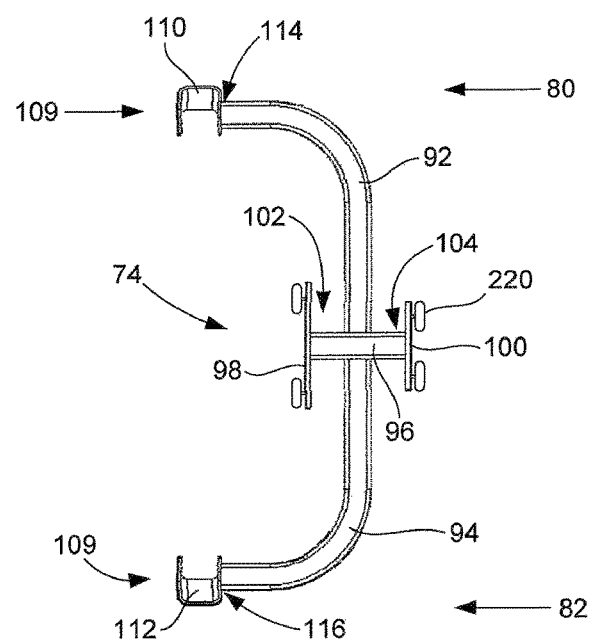
FIG. 20 is a top view of the outrigger assembly of the right side support assembly of FIG. 19.

As stated above, the forward support arm 92 and rearward support arm 94 of each outrigger assembly 74 are sized and configured to engage and support the drive wheels 28/30 of the hand-propelled wheelchair 12. To facilitate placement of the drive wheels 28/30 on the support arms 92/94 of the outrigger assembly 74 of the support assemblies 38a/38b, the apparatus 10 has a wheel support mechanism 109 that is structured and arranged to receive and engage the drive wheels 28/30 of the wheelchair 12. In one of the preferred embodiments, the wheel support mechanism comprises a front wheel catch 110 attached to or integral with the forward support arms 92 and a back wheel catch 112 attached to or integral with the rearward support arms 94. Each of the wheel catches 110/112 are structured and arranged to engage and support the drive wheels 28/30 at the distal ends 114/116, respectively, of the support arms 92/94, as best shown in FIGS. 14 and 20. In the embodiments, shown in the figures, the wheel catches 110/112 have a generally U-shaped configuration, as best shown in FIGS. 14-18 and 20. The wheel catches 110/112 are sized and configured to receive the drive wheels 28/30 in the U-shaped wheel catches 110/112 and support the wheelchair 12 above the surface 14, as shown in FIGS. 2-5, so the wheelchair 12 can be moved across the surface 14 with the power assist apparatus 10 of the present invention.

To position the wheel catches 110/112 where they can engage and support the drive wheels 28/30 of the wheelchair 12, the two support arms 92/94 extend, respectively, generally forwardly or rearwardly from the transverse member 96 and then generally outwardly (meaning away from the motorized mechanism 36, which is positioned generally below the seat 20 of the wheelchair 12). To achieve the desired positioning of the wheel support mechanism 109, comprising of the wheel catches 110/112 in certain embodiments, the support arms 92/94 are generally L-shaped and the wheel catches 110/112 are attached to or integral with the distal end 114/116 of each of the support arms 92/94, as best shown in FIGS. 6, 8-9, 14-16 and 20. The support arms 92/94 are sized and configured to position the wheel catches 110/112 in corresponding relation to the width, shown as DWW in FIGS. 3 and 4, between the two drive wheels 28/30. Specifically, the width between the forward wheel catches 110 of the first support assembly 38a and the second support assembly 38b and between the rearward wheel catches 112 of the first support assembly 38a and the second support assembly 38b (this width is shown as WCW in FIGS. 12 and 13) must be in, or be able to be placed in, corresponding relation to the width DWW between the drive wheels 28/30 of the wheelchair 12. In one embodiment, the forward support arms 92 and rearward support arms 94 extend the same distance forward/rearward. In another embodiment, the forward support arms 92 and rearward support arms 94 are offset biased to one side or the other (i.e., either the forward side 80/rearward side 82).

The front wheels 76 of the support assemblies 38a/38b of the power assist apparatus 10 are attached to the outrigger support assembly 72 utilizing a front wheel bracket 118 that positions the front wheels 76 forward of the shrouds 40a/40b, as shown in FIGS. 4, 9-13. The front wheels 76 can be caster wheels or the like that are rotatably attached to the front wheel brackets 118 utilizing axle bolts or the like. In the embodiment shown in the figures, the front wheel brackets 118 are attached to or integral with the forward edge plate 86 of the outrigger support assembly 72. Preferably, the front wheel brackets 118 are configured so as to dispose the front wheels 76 substantially straight, in the forward/rearward direction, relative to the wheelchair 12, as best shown in FIGS. 4, 10 and 12-13. The rear wheels 78 of the support assemblies 38a/38b of the power assist apparatus 10 are attached to the outrigger support assembly 72 utilizing a back wheel bracket 110 that positions the back wheels 78 rearward of the shrouds 40a/40b, as shown in FIGS. 2-3, 6, 8-9 and 11-13. The back wheels 78 can be caster wheels or the like that are rotatably attached to the back wheel brackets 120 utilizing axle bolts or the like. In the embodiment shown in the figures, the back wheel brackets 120 are attached to or integral with the rearward edge plate 88 of the outrigger support assembly 72 and are sized and configured to dispose the back wheels 78 at an angle (as opposed to the straight, forward/rearward direction of front wheels 76) relative to the wheelchair 12. The back wheels 78 are configured to be angularly positioned relative to the front wheels 76 so as to provide braking action for the power assist apparatus 10 when the occupant pulls back on both of the manual drive wheels 28/30 of the wheelchair 12. In addition to providing braking action, one of the angled back wheels 78 will make contact with the floor or other surface 14 while turning in the direction of the back wheel 78 to help turn the apparatus 10. In a preferred configuration, the back wheels 78 are angled so as to follow the direction of rotation of the apparatus 10.

Figure 21:
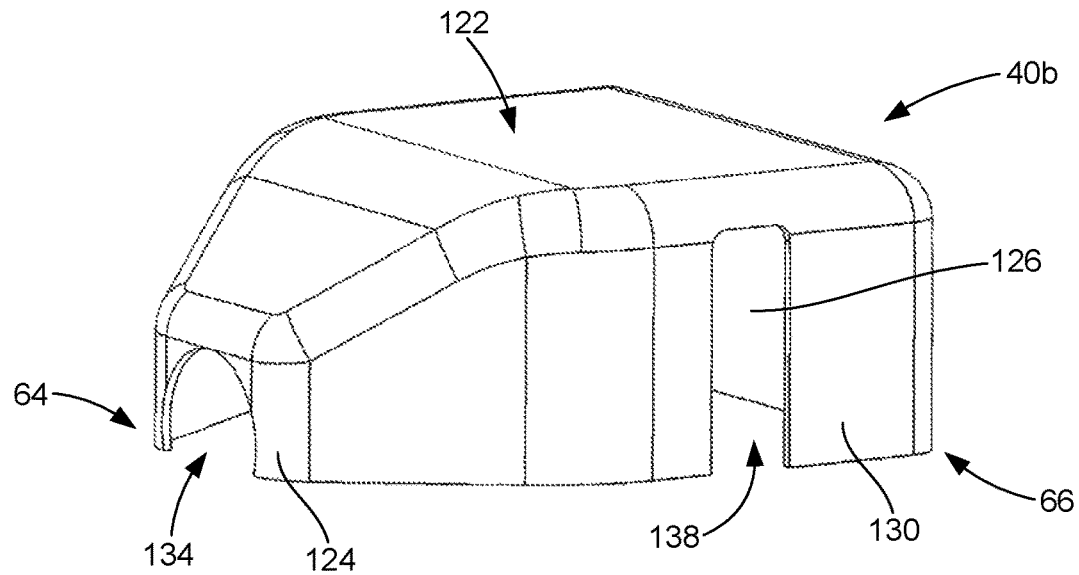
FIG. 21 is a side perspective view of the right side shroud utilized with the power assist apparatus of FIG. 8.
Figure 22:
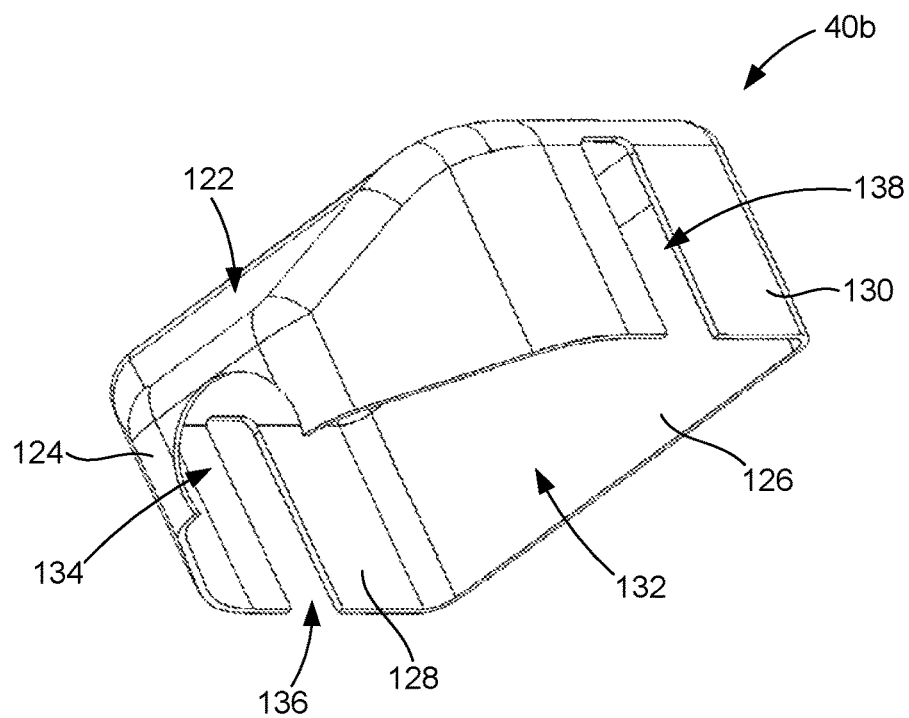
FIG. 22 is a bottom perspective view of the right side shroud of FIG. 21.

The shrouds 40a/40b of the power assist apparatus 10 of the present invention are utilized to at least substantially cover the outrigger support assembly 72, the transverse member 96 of the outrigger assembly 74, the portions of the arms 92/94 at the transverse member 96 and the upper or first housing member 54 of the housing 52 of the motorized mechanism 36, as shown in FIGS. 2-6. The purpose of the shrouds 40a/40b is to protect the various enclosed components of the power assist apparatus 10 and to protect the occupant or others from inadvertent contact with those components, particularly while the power assist apparatus 10 is in use. The shrouds 40a/40b each have a shroud body 122 with an inward end 64 and an outward end 66, with the terms "inward" and "outward" referring to the being inward toward the center position 68 of the apparatus 10 (and center position 70 of the motorized mechanism 36) or outward away from the center positions 68/70 and toward the wheels 60/62 of the apparatus 10. The shroud body 122 comprises an inward end wall 124, an outward end wall 126, a pair of sidewalls, shown as first sidewall 128 and second sidewall 130, between the end walls 124/126, as best shown in FIGS. 21 and 22. The walls 124/126/128/130 of the shroud body 122 define a shroud chamber 132, as shown in FIG. 22. The inward end 64 of the shrouds 40a/40b has an end opening 134, as shown in FIGS. 21-22, that is sized and configured to be placed over the motorized mechanism 36 at or near the center position 76 thereof, as best shown in FIGS. 3 and 4. Each of the sidewalls 128/130 have a sidewall opening, respectively shown as 136 and 138, that are sized and configured to allow the support arms 92/94 of the outrigger assembly 74 to pass therethrough, as best shown in FIGS. 6-10. In one embodiment of the apparatus 10 of the present invention, the shrouds 40a/40b are sized and configured to snugly fit over the edges of the housing 52 of the motorized mechanism 36 and snap or otherwise engage the housing 52. In other embodiments, the shrouds 40a/40b can be attached using removable connectors, such as bolts, screws and the like, or other connecting mechanisms, including such fixed or substantially fixed mechanisms as adhesives, welding and the like.

In a preferred configuration, when the power assist apparatus 10 is off and the wheelchair 12 is not mounted thereon, the first/forward support arms 92 will tilt forward such that the forward portion of the wheel support mechanism 109 will be on the surface 14. In many of the embodiments shown in the figures, this will place the front wheel catches 110 generally on the surface 14. Preferably, the front wheel catches 110 are shaped and configured to allow the occupant of the wheelchair 12 to back the drive wheels 28/30 of the wheelchair 12 onto the front wheel catches 110 along the surface 14. Once the drive wheels 28/30 are on the front wheel catches 110, a further slight rearward movement of the wheelchair 12 will result in the back/second wheel catches 112 engaging (i.e., capturing) the drive wheels 28/30, as shown in FIGS. 2-3, to position wheelchair 12 on the apparatus 10 with the drive wheels 28/30 thereof slightly off of the surface 14, as shown in FIGS. 3-5, so the drive wheels 28/30 no longer rest on or engage the surface 14. In the preferred configuration, the capture/engagement of the wheelchair 12 by the power assist apparatus 10 is achieved without requiring any modification of the wheelchair 12 or the use of any tools to mount or attach the power assist apparatus 10 to the wheelchair 12 (whether the folding or rigid type of wheelchair 12). Once engaged, the vast majority of the power assist apparatus 10 (except the catches 110/112) is located between the drive wheels 28/30 of the wheelchair 12. A control switch, button or other remote device, which will be positioned on or next to the wheelchair 12 so as to be reachable and operatively controlled by the occupant, is in operative connection with motorized mechanism 36 to allow the occupant to turn the motors thereof on or off. Once the motors of the power assist apparatus 10 are powered on, the apparatus 10 of the present invention is ready to provide power to move the wheelchair 12, thereby requiring less effort by the occupant of the wheelchair 12 or a person pushing the wheelchair 12 to move wheelchair 12 across the surface 14.

As described above, the movement of the combined power assist apparatus 10 and wheelchair 12 is achieved and directly controlled by the occupant manipulating the hand rim 34 of the drive wheels 28/30 of the hand-propelled wheelchair 12 in substantially the same manner as the occupant would do if he or she were to manually move the wheelchair 12 across the surface 14. Input from the motion of the drive wheels 28/30 by the occupant is directed through the support arms 92/94, transverse member 96 and contact members 98/100 of the outrigger assembly 74 to the foot placement areas 58 of the motorized mechanism 36 to operate the motorized mechanism 36 in the same manner as if a person's feet were standing on the two foot placement areas 58.

Figure 23:
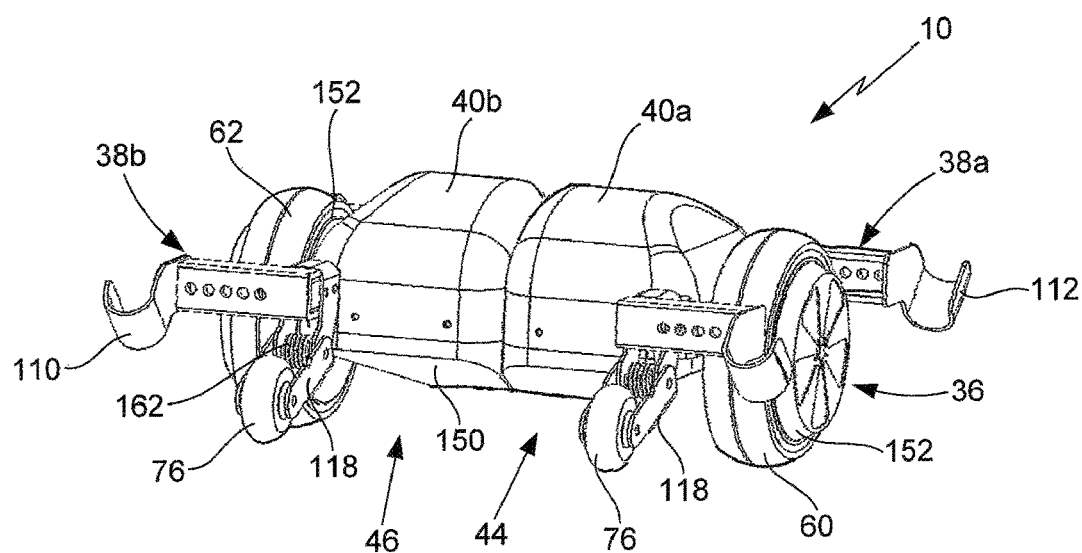
FIG. 23 is a front perspective view of a power assist apparatus that is configured according to a second embodiment of the present invention
Figure 24:
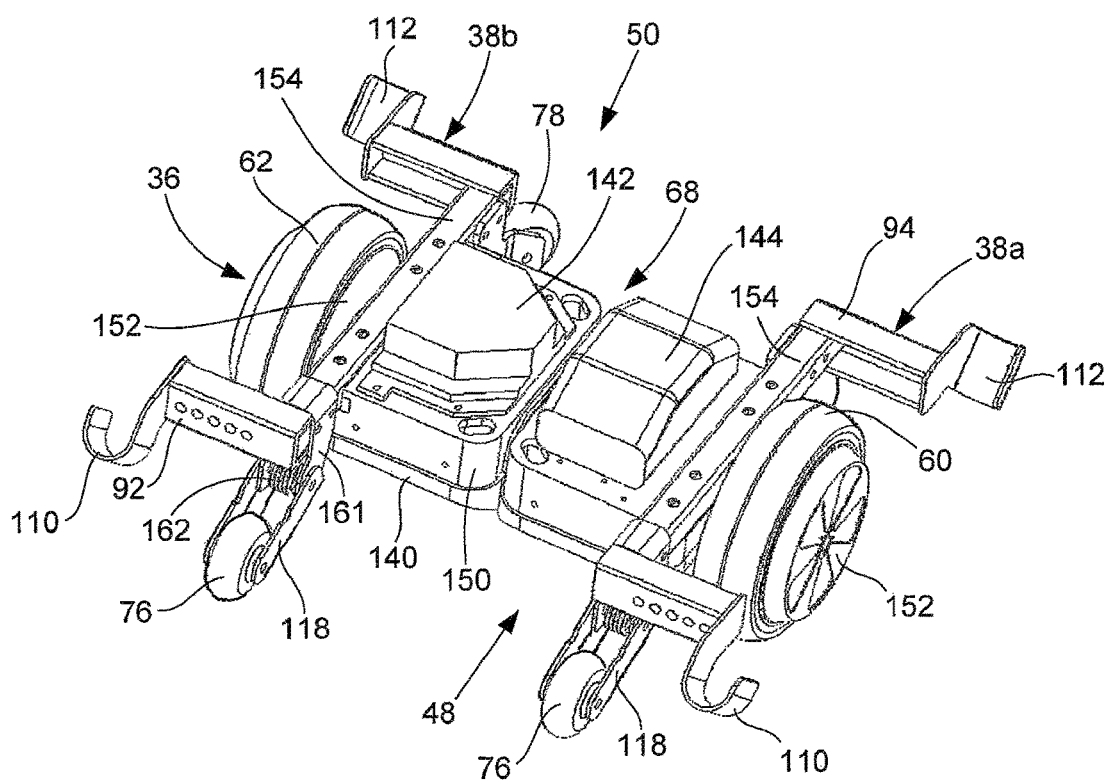
FIG. 24 is a top/front perspective view of the power assist apparatus of FIG. 23 shown without the shrouds.
Figure 25:
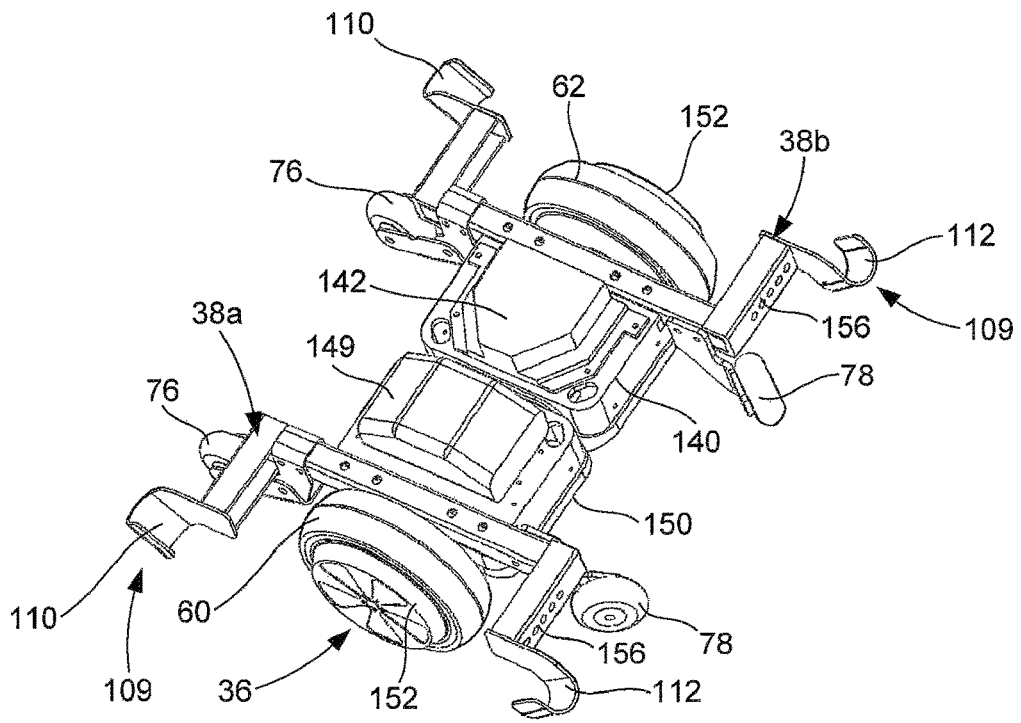
FIG. 25 is a top/back perspective view of the power assist apparatus of FIG. 24.
Figure 26:
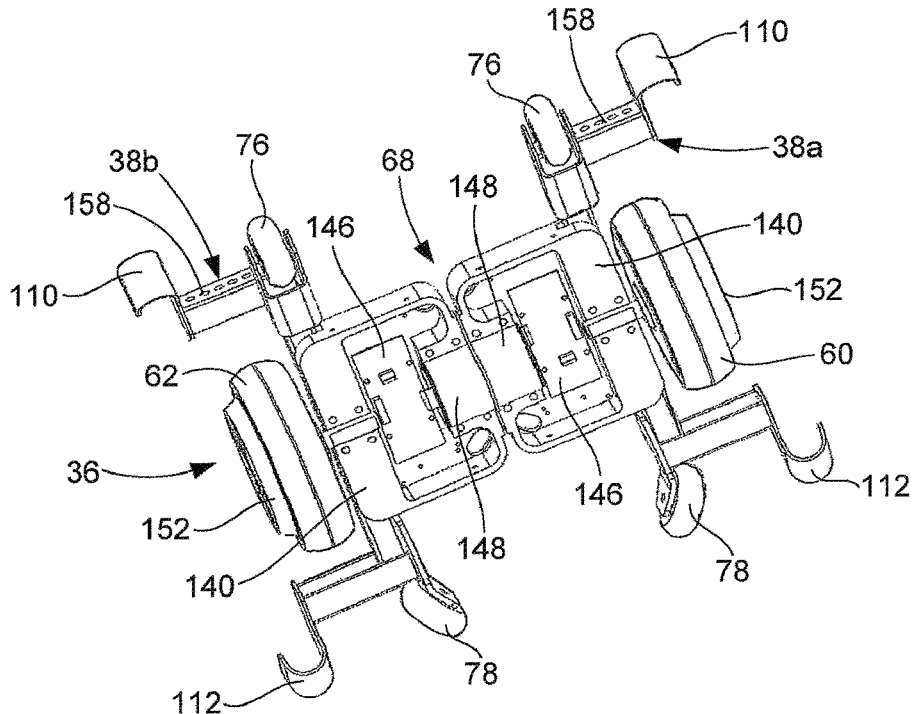
FIG. 26 is a bottom perspective view of the power assist apparatus of FIG. 25 with the lower housing removed to show the position sensor mechanism and pivot bearings.

A second embodiment of the power assist apparatus 10 of the present invention is shown in FIGS. 23-28. In this embodiment, the motorized mechanism 36 is not the device set forth in U.S. Pat. No. 8,378,278 to Chen (i.e., not the so called "hoverboard"). Instead, the motorized mechanism 36 of the embodiment shown in FIGS. 23-28 is a separately configured mechanism for providing power to the power assist apparatus 10 that is, otherwise, generally utilized in the manner set forth for the embodiment described above to move the hand-propelled wheelchair 12 across surface 14. In this embodiment, each of the first motorized section 48 and the second motorized section 50 of the motorized mechanism 36 comprise a support frame 140 that is structured and arranged to support the control mechanism 142, one or more batteries 144, position sensor mechanism 146 and pivot bearing 148, as shown in FIGS. 23-26. In the embodiment shown, the control mechanism 142 and batteries 144 are on the upper side of the support frame 140 and are enclosed by the shrouds 40a/40b and the position sensor mechanism 146 and pivot bearing 148 are on the lower side of the support frame 140 and enclosed by a lower housing 150, as best shown in FIGS. 24-26. To provide power to move the wheelchair 12, the power assist apparatus 10 comprises a wheelmotor 152 associated with each of the first wheel 60 and second wheel 62 on each side 44/46 of apparatus 10, as shown in FIGS. 23-26.

In the embodiment shown in FIGS. 23-28, the first motorized section 48 comprises a wheelmotor 152, the first wheel 60 operatively connected to the wheelmotor 152, a support frame 140 to which the wheelmotor 152 connects, a position sensor mechanism 146 having gyroscopic self-balancing circuit board technology to measure the angle position of the wheelmotor 152, a pivot bearing 148 that is operatively connected to the wheelmotor 152, the shroud 40a that covers the upper portion of the first motorized section 48 and the lower housing 150 that covers the lower portion of the first motorized section 48. The second motorized section 50 comprises a wheelmotor 152, the second wheel 62 that is operatively connected to the wheelmotor 152, a support frame 140 to which the wheelmotor 152 connects, a position sensor mechanism 146 having gyroscopic self-balancing circuit board technology to measure the angle position of the wheelmotor 152, a pivot bearing 148 that is operatively connected to the wheelmotor 152, the shroud 40b that covers the upper portion of the second motorized section 50 and the lower housing 150 that covers the lower portion of the second motorized section 50. As best shown in FIG. 26, the opposing motorized sections 48/50 are pivotally connected by the two adjacent pivot bearings 148 that are generally at the center position 70 of the motorized mechanism 36 (as well as the center position 68 of the apparatus 10 itself) and positioned along the axis of the two wheelmotors 152. The control mechanism 142 and batteries 144, which are electrically connected to the position sensor mechanisms 146 and wheelmotors 152, are shared by the two motorized sections 48/50.

The control mechanism 142 comprises the controller and other computer components, typically on a circuit board or the like, that monitor, operate, receive information from and/or adjust the performance of the control mechanism 142, battery 144, position sensor mechanisms 146 and wheelmotors 152. In one embodiment of the present invention, the new power assist apparatus 10 utilizes a single, rechargeable lithium-ion polymer battery that is sized and configured sufficient electrical power to operate the power assist apparatus 10 to move the wheelchair 12 for a reasonable or generally sufficient amount of time/distance and still be able to fit within the desired size and configuration of the motorized mechanism 36 (i.e., fit within the desired size of the shroud 40a). The position sensor mechanism 146, which may also be on a circuit board or the like, utilizes the self-balancing technology that is found in devices such as the "hoverboard" of U.S. Pat. No. 8,378,278 to Chen and other types of self-balancing devices. The wheelmotors 152 are selected to be electrically operated by the battery 144 and to have sufficient work output to drive the wheels 60/62 to move the apparatus 10 and wheelchair 12 in the desired directions. The configuration, use and operation of control mechanism 142, battery 144, position sensor mechanisms 146 and wheelmotors 152 are generally well known to persons skilled in the relevant art. As also well known to such persons, various alternatively configured devices can be utilized. For instance, there are a variety of angle position measurement devices that can be utilized for apparatus 10 and the apparatus 10 could be configured to be non-pivoting if microswitches or other sensors are utilized to take motion input from the drive wheels 28/30 of a hand-propelled wheelchair 12. For instance, the drive wheels 28/30 could be engaged by rollers at the distal ends 114/116 of the arms 92/94, with the rollers being encoded to provide position information that is then converted to drive the two wheelmotors 152 to move the wheelchair 12 across the surface 14.

Figure 27:
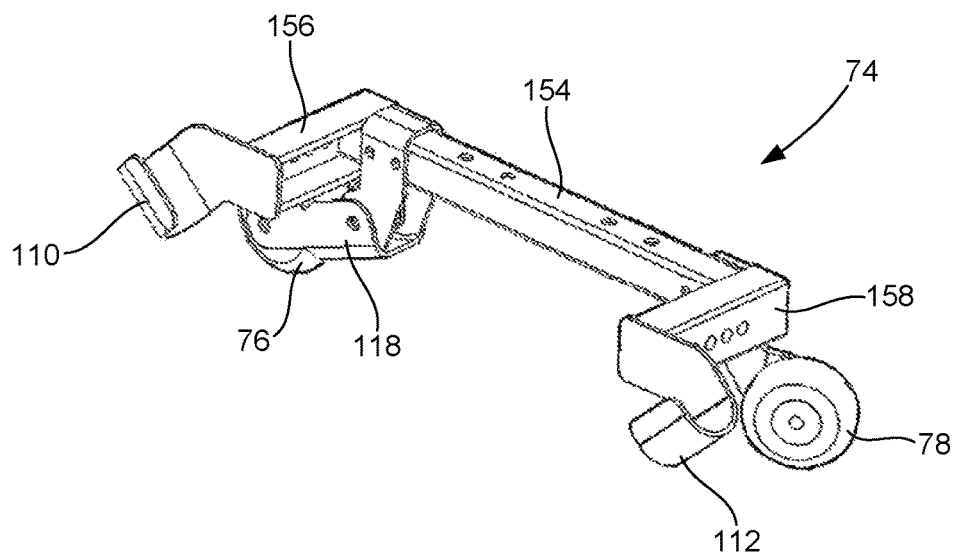
FIG. 27 is a back perspective view of the left outrigger assembly of the power assist apparatus of FIG. 23.
Figure 28:
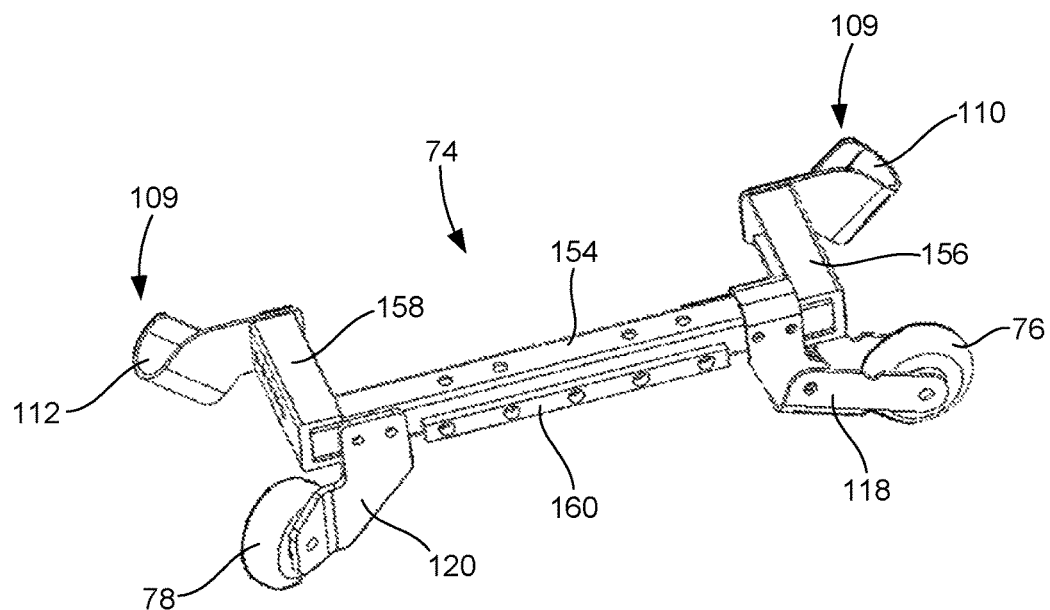
FIG. 28 is a side perspective view of the outrigger assembly of FIG. 27.
Figure 29:
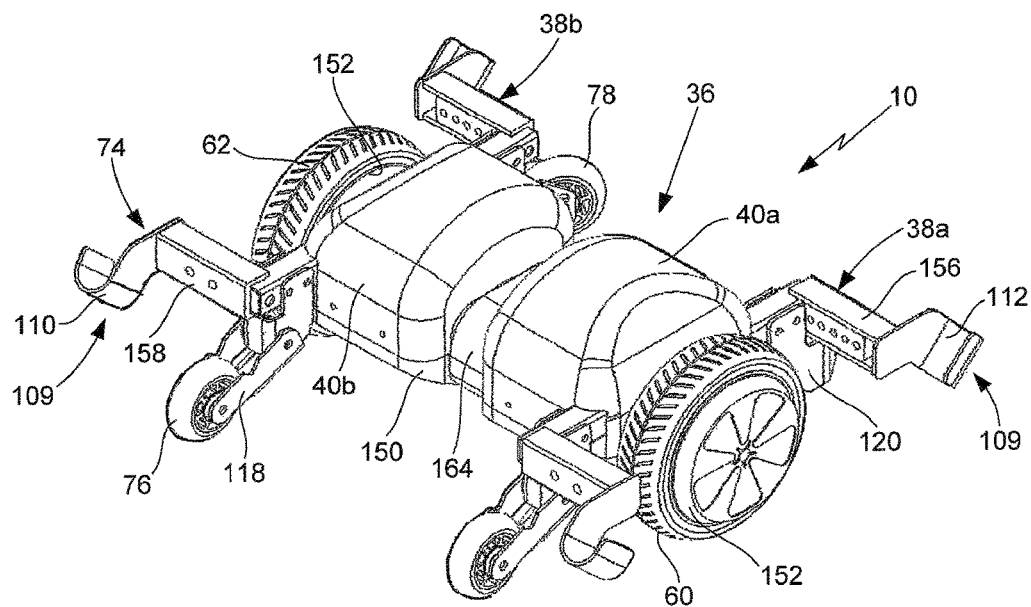
FIG. 29 is a front perspective view of a power assist apparatus that is configured according to a third embodiment of the present invention.

In the embodiment of FIGS. 23-28, the power assist apparatus 10 has a modified outrigger assembly 74, best shown in FIGS. 27 and 28, associated with each of the two motorized sections 48/50. In one embodiment, the first/forward arm 92 and second/rearward arm 94 are a single, integrally formed support arm component that extends to both the forward side 80 and rearward side 82 of the apparatus 10 to support the wheel catches 110/112 at the respective distal ends 114/116 of the arms 92/94. In the embodiment of FIGS. 23-28, the outrigger assembly comprises a single elongated support member 154, which may be a tubular member (as shown), and a pair of perpendicularly disposed adjustable members, shown as the forward adjustable member 156 and rearward adjustable member 158 moveably attach to the outwardly disposed members 159 (best shown in FIG. 60) of the support arm 154, that form the L-shape configurations shown in FIGS. 27-28. As shown, the first wheel catch 110 is attached to or integral with the forward adjustable member 156 and the second wheel catch 112 is attached to or integral with the rearward adjustable member 158. The two adjustable members 156/158 are structured and arranged to move inward and outward relative to the outwardly disposed members 159 at the forward and rearward ends (shown as outwardly disposed member 159*a* at the forward end and outwardly disposed member 159*b* at the rearward end) of the support member 154 to allow the user to adjust the width WCW between the two wheel catches 110 at the forward side 80 of apparatus 10 or between the two wheel catches 112 at the rearward side 82 of apparatus 10 to compensate for wheelchairs 12 having a different width DWW between the drive wheels 28/30. In the embodiment shown in FIGS. 23-28, a connector member 160, attached to or integral with the inside surface of the elongated member 154, connects the outrigger assembly 74 to the support frame 140 in a manner that transmits the movement of the wheels 28/30 of wheelchair 12, as controlled by the occupant, to the respective position sensor mechanisms 146. Data from the position sensor mechanisms 146 is transmitted to the control mechanism 142 and utilized to control the two wheelmotors 152 in a manner that moves the power assist apparatus 10 and the wheelchair 12 mounted thereon forward, rearward, left or right (as controlled by the occupant utilizing the drive wheels 28/30, as set forth above).

In the embodiment of the outrigger assembly 74 in FIGS. 23-28, the front wheel bracket 118 comprises a pair of spaced apart, fork-like shaped, bracket members with the front wheel 76 positioned between the two distal ends of the bracket members of the front wheel bracket 118, as best shown in FIGS. 23 and 24. As also shown in these figures, the front wheel bracket 118 has a bracket support 161 that extends generally upward to engage the forward end of the elongated member 154, where it is connected thereto, as best shown in FIGS. 27 and 28. The back wheel bracket 120 also connects to the elongated member 154, as best shown in FIG. 28. The apparatus 10 also has a torsion spring 162, positioned between the two bracket members at the proximal end of the bracket members (as best shown in FIGS. 23 and 24). The torsion spring 162 is provided to reduce impact forces that may occur when the occupant tilts the forward side 80 of the apparatus 10 to the surface 14 to allow him or her to move (i.e., roll) the wheelchair 12 off of the apparatus 10. Because the embodiment of FIGS. 23-28 does not include the ability for the outrigger assemblies 74 to slide forward and rearward relative to the outrigger support assembly 72, the apparatus 10 of this configuration will only be able to operate with the folding type of wheelchairs 12. The front/back sliding is necessary to provide flexibility to the apparatus 10 that is required for the apparatus 10 to operate with rigid wheelchairs 12.

Figure 30:
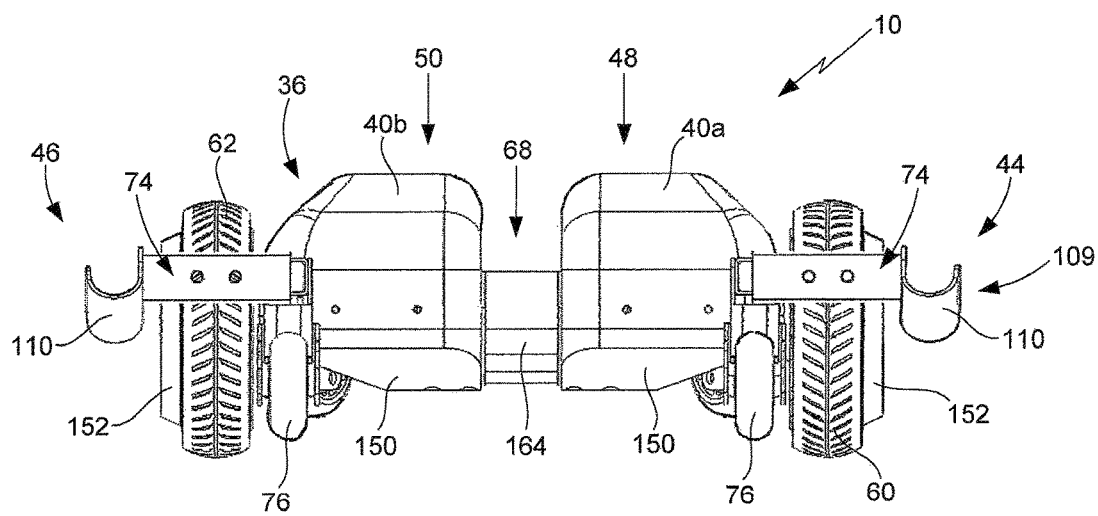
FIG. 30 is a front view of the power assist apparatus of FIG. 29.

A third embodiment of the power assist apparatus 10 of the present invention is shown in FIGS. 29-35. Although this embodiment incorporates or uses many of the same components of the previously described embodiments, in this embodiment the first motorized section 48 and second motorized section 50 of the motorized mechanism 36 are more fully separated than in the previous two embodiments, as best shown in FIG. 30. Separating the two motorized sections 48/50 provides certain benefits with regard to manufacturing the apparatus 10 and the operation of the apparatus 10. Specifically, moving the pivot point away from the center positions 68/70 of the apparatus 10 and motorized mechanism 36 allows use of less components and a simplified manufacturing process and results in a stronger assembly (i.e., by reducing the lever arm relative to the pivot point). With the pivot points moved toward alignment with the location of the drive wheels 28/30 of the wheelchair 12, the power assist apparatus 10 will be much more responsive to the movement of the drive wheels 28/30 by the occupant of the wheelchair 12, providing a joystick-type of operation. This will make the combined apparatus 10 and wheelchair 12 much easier to turn. In addition, it will be much easier for a person pushing the combined apparatus 10 and wheelchair 12, such as a relative or medical assistant using the rearwardly disposed handles 24, to be assisted by the power from apparatus 10.

Figure 31:
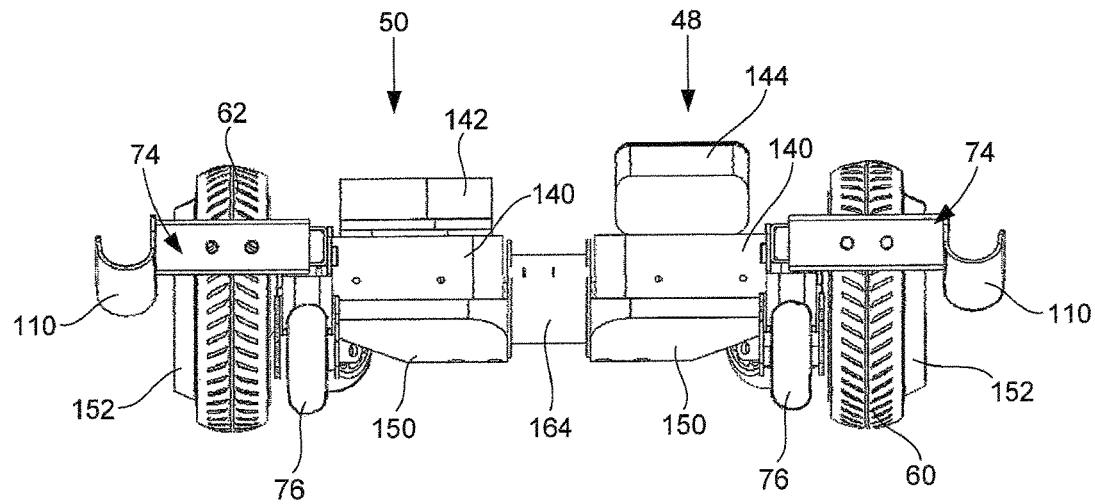
FIG. 31 is a front view of the power assist apparatus of FIG. 30 with the shrouds removed therefrom to show the battery and control mechanism.
Figure 32:
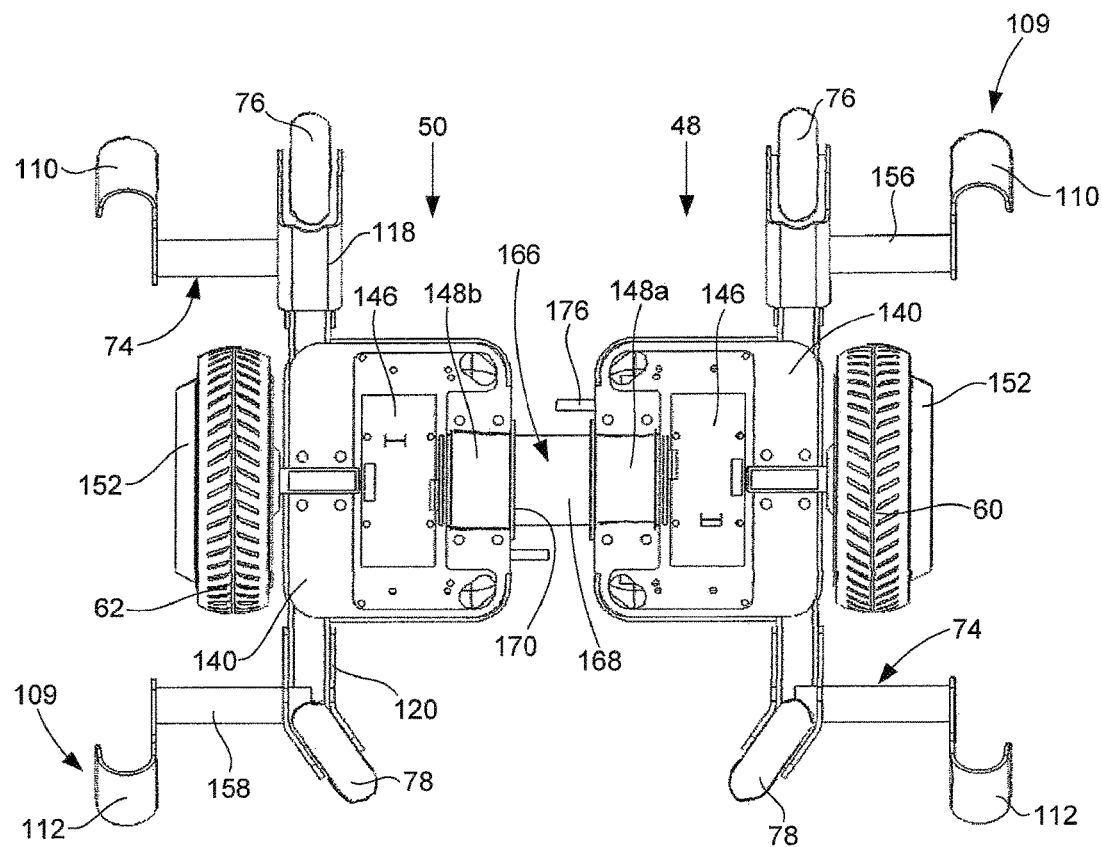
FIG. 32 is a bottom view of the power assist apparatus of FIG. 31 with the lower housing removed to show the position sensor mechanism, pivot bearings and limit pins.
Figure 33:
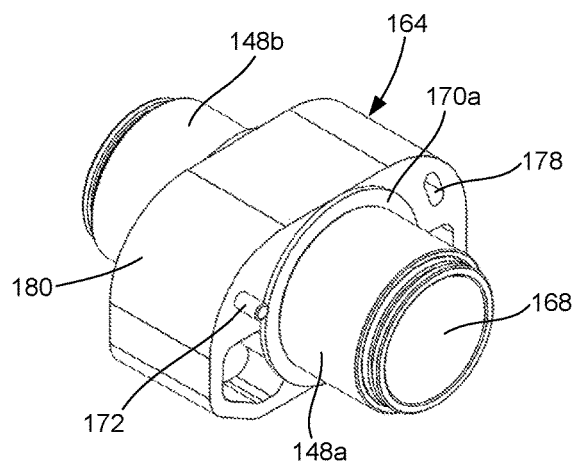
FIG. 33 is a front perspective view of the extender and pivot mechanism of the power assist apparatus of FIG. 29.

In the third embodiment, the apparatus 10 has an extender 164 at the center position 68 of the apparatus 10 (corresponding to the center section 70 of the motorized mechanism 36) that interconnects the support frames 140 of the first motorized section 48 and the second motorized section 50 of the motorized mechanism 36, as best shown in FIGS. 30 and 31. The extender 164, which is shown separately in FIG. 34, receives and supports a pivot mechanism 166 that is positioned at or near the center position 68 between the two motorized sections 48/50, as shown in FIG. 33. The pivot mechanism 166, which is shown without the extender 164 in FIG. 32, comprises the two pivot bearings 148 (one associated with each of the motorized sections 48/50), a pivot tube 168 that interconnects the two pivot bearings 148 and a pair of spacer washers 170 (shown as first spacer washer 170*a* and second spacer washer 170*b*), as shown in FIGS. 32-33 and 35. The pivot mechanism 166 allows the two motorized sections 48/50 to pivot independent of each other. As described above, the pivoting movement of the pivot mechanism 166 is moved away from the center position 68 of the apparatus 10 toward the position of the drive wheels 28/30.

Figure 34:
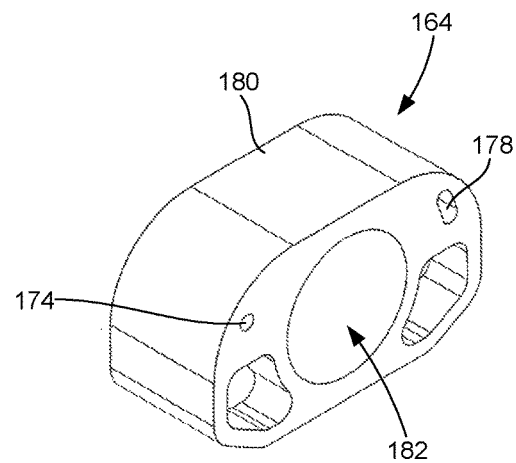
FIG. 34 is a front perspective view of the extender of FIG. 33.
Figure 35:
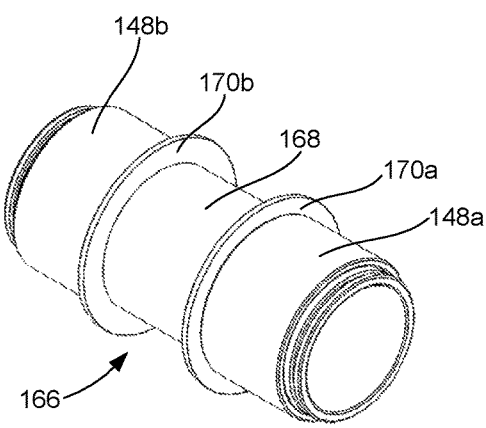
FIG. 35 is a front perspective view of the pivot mechanism of FIG. 33.
Figure 36:
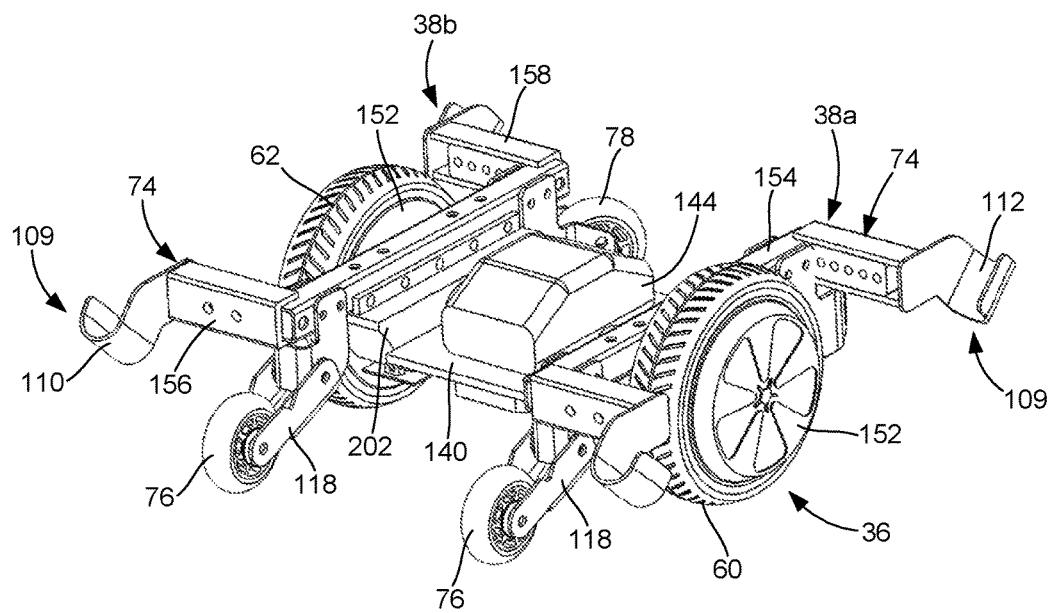
FIG. 36 is a front perspective view of a power assist apparatus that is configured according to a fourth embodiment of the present invention, with the apparatus shown without its shroud and lower housing.

To limit the amount of pivoting movement that will occur between the two sections 48/50, the apparatus 10 also includes a pair of first limit pins 172 that extend outward from an aperture 174 in each side of the extender 164, as shown with regard to the first or left side of the extender 164 shown in FIGS. 33 and 34, that are received in a limit aperture (not shown) that is associated with each of the support frames 140 of the motorized sections 48/50. The pivoting movement is also limited by a pair of second limit pins 176 that extend outward from the support frames 140 to engage a limit aperture 178 on each side of the extender 164, as shown with regard to the first/left side of the extender 164 in FIGS. 33 and 34. The body 180 of the extender 164 has a tube opening 182 that is sized and configured to receive and support the pivot tube 168 of the pivot assembly 166. The configuration and use of pivot bearings 148, pivot tube 168 and limit pins are generally well known in the art.

The embodiment of the outrigger assembly 74 in FIGS. 29-32, the back wheel bracket 120 comprises a pair of spaced apart, fork-like shaped, bracket members with the back wheel 76 positioned between the two distal ends of the bracket members of the back wheel bracket 120, as best shown in FIG. 32. This bracket 120 extends upward to attach and engage the rearward end of elongated member 154, where it is connected thereto. As will be readily appreciated by those skilled in the art, the back wheel bracket 120 functions as the brake bracket that holds the back caster wheels 78 in place in a position that allows the occupant of wheelchair 12 to use these wheels 78 to help provide braking action and to assist with turning the wheelchair 12 having apparatus 10 utilized therewith.

Figure 37:
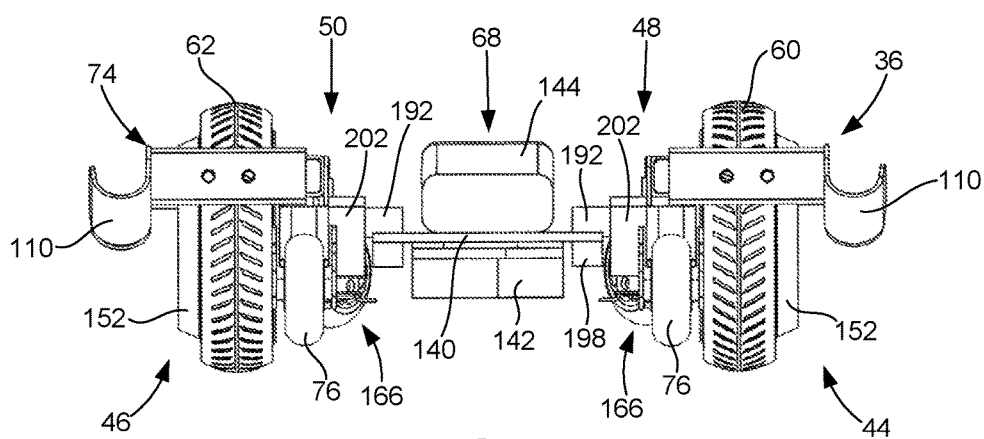
FIG. 37 is a front view of the power assist apparatus of FIG. 36.
Figure 38:
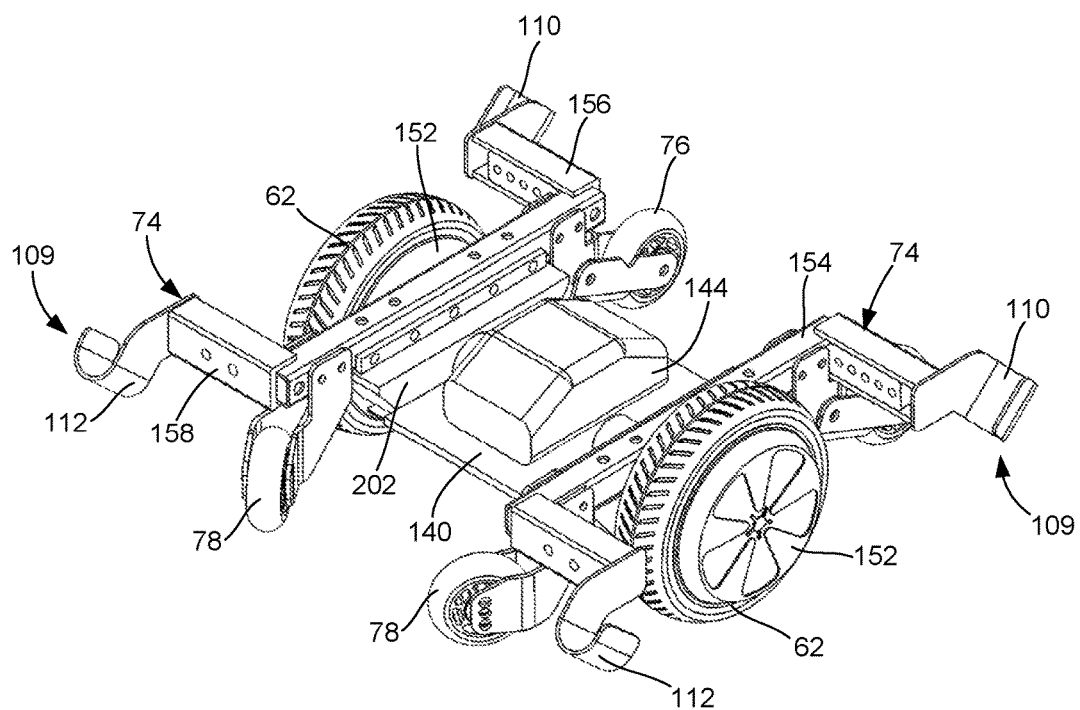
FIG. 38 is a back perspective view of the power assist apparatus of FIG. 36.
Figure 39:
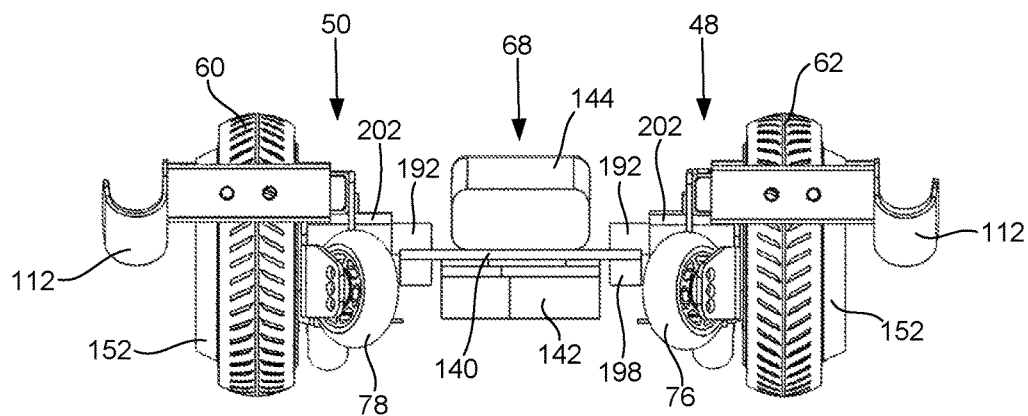
FIG. 39 is a back view of the power assist apparatus of FIG. 36.
Figure 40:
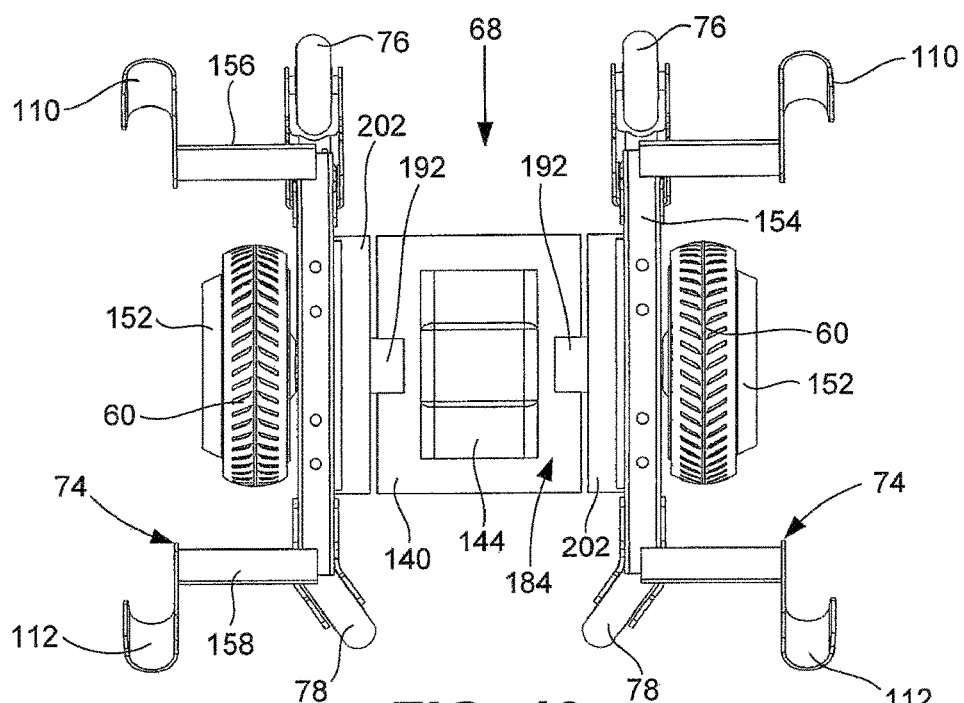
FIG. 40 is a top view of the power assist apparatus of FIG. 36.

A fourth embodiment of the power assist apparatus 10 of the present invention is shown in FIGS. 36-50. Although this embodiment incorporates or uses many of the same components of the previously described embodiments, in this embodiment the first motorized section 48 and second motorized section 50 of the motorized mechanism 36 are more fully separated than in the previous three embodiments, as best shown in FIG. 37. As a result, the apparatus 10 of the fourth embodiment better achieves the various benefits, including the reduced manufacturing costs and improved power assist operation, of moving the pivot point away from the center position 68 of the apparatus 10 described with regard to the third embodiment.

Figure 49:
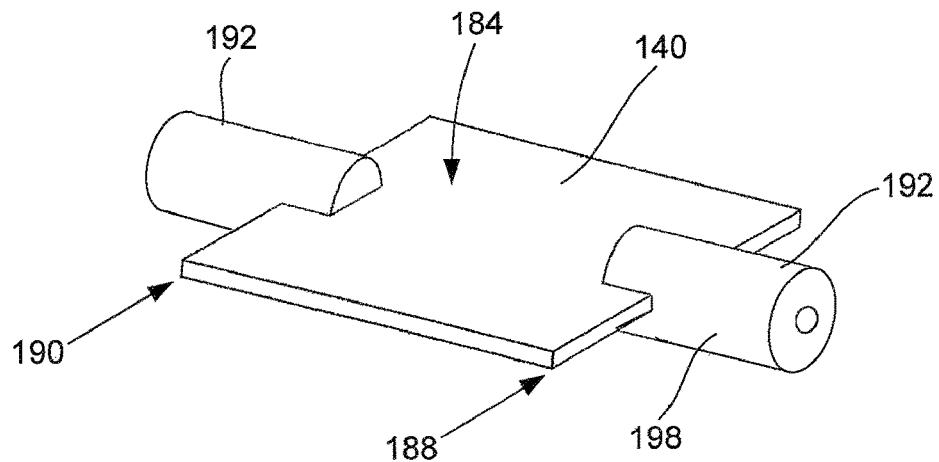
FIG. 49 is a front/top perspective view of the support frame of the power assist apparatus of FIG. 36.
Figure 50:
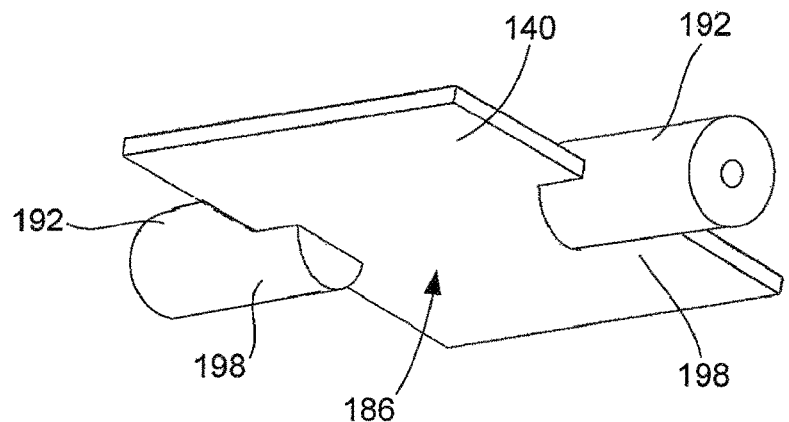
FIG. 50 is a front/bottom perspective view of the support frame of FIG. 49.

In the fourth embodiment, the apparatus 10 has a single support frame 140 positioned between the two motorized sections 48/50, as best shown in FIGS. 37 and 39-41, in contrast to the two support frames 140 on either side 44/46 of the center position 68 of the apparatus 10 of the third embodiment, as best shown in FIG. 32. The single support frame 140 connects the two motorized sections 48/50, which are located on opposite sides 44/46 of the apparatus 10, in a manner that allows the two motorized sections 48/50 to pivot independent of the support frame 140 and each other. As shown in FIGS. 49 and 50, the support frame 140 has an upper surface 184, a lower surface 186, a first or left side 188 and a second or right side 190. A modified pivot mechanism 166 interconnects the first motorized section 48 with the first side 188 of the support frame 140. As similarly configured pivot mechanism 166 interconnects the second motorized section 50 with the second side 190 of support frame 140. In the figures for the fourth embodiment, the battery 144 is supported on the upper surface 184 and the control mechanism 142 is attached to the lower surface 186, as best shown in FIGS. 36-41. As will be readily appreciated by persons skilled in the art, the location of the battery 144 and/or control mechanism 142 can be different than what is shown in the figures. Attached to or integral with the upper surface 184 of the support frame 140 and extending outward from each of the first 188 and second 190 sides thereof, as best shown in FIGS. 49-50, is a generally semi-circular shaped upper enlarged section 192 that, along with a lower enlarged section 198, which is also generally semi-circular shaped, forms a pivot bearing that is received in a pivot aperture 204 of a pivot block 202, to which the outrigger assembly 74 is mounted, to allow the outrigger assembly 74 on each side 44/46 of apparatus 10 to pivot independent of the support frame 140 and each other. The pivot block 202 has a generally tubular shaped opening 200 in which the axle 196 (shown in FIGS. 47 and 48) of the respective wheelmotor 152 is received to be engaged by lower motor mount 194 (best shown in FIGS. 42 and 45-46) associated with the pivot block 202.

Figure 41:
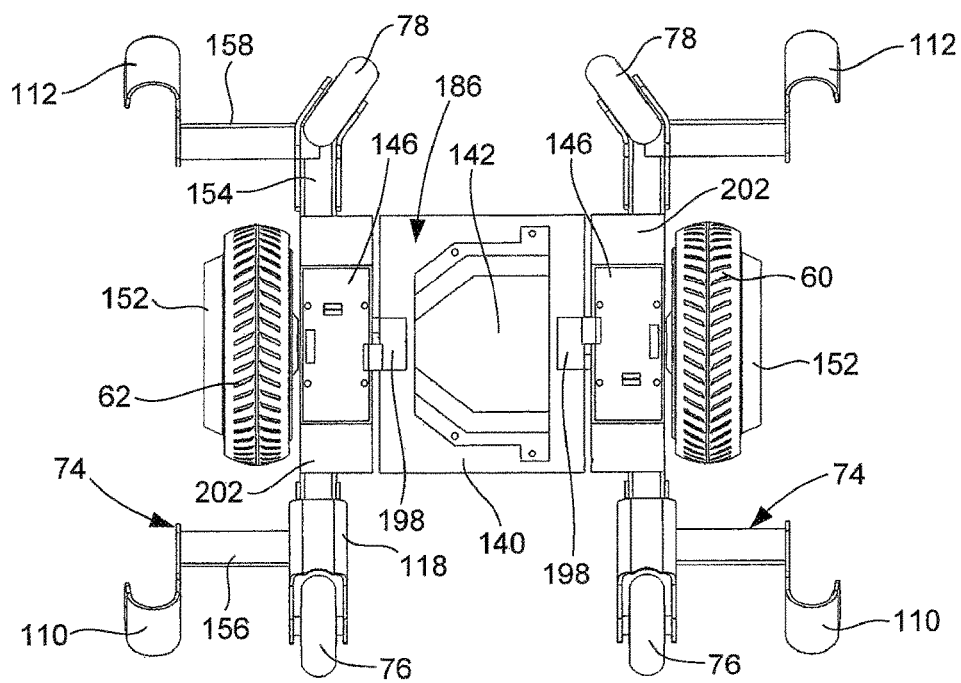
FIG. 41 is a bottom view of the power assist apparatus of FIG. 36.
Figure 42:
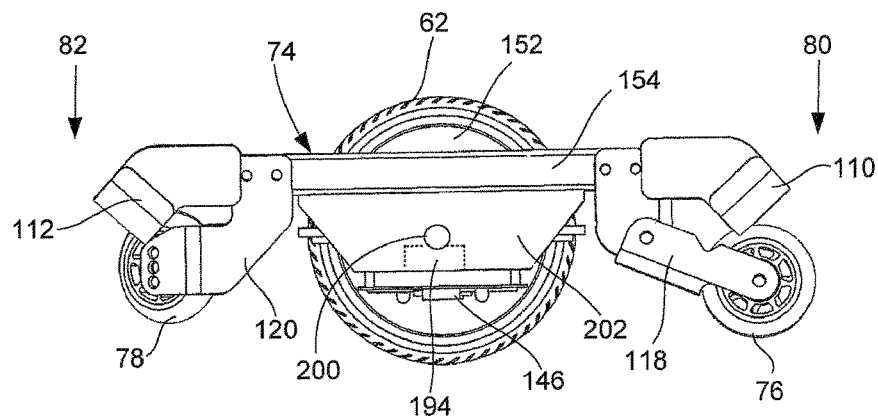
FIG. 42 is a right side view of the power assist apparatus of FIG. 36 shown without the right wheel, right wheelmotor and the battery.
Figure 43:
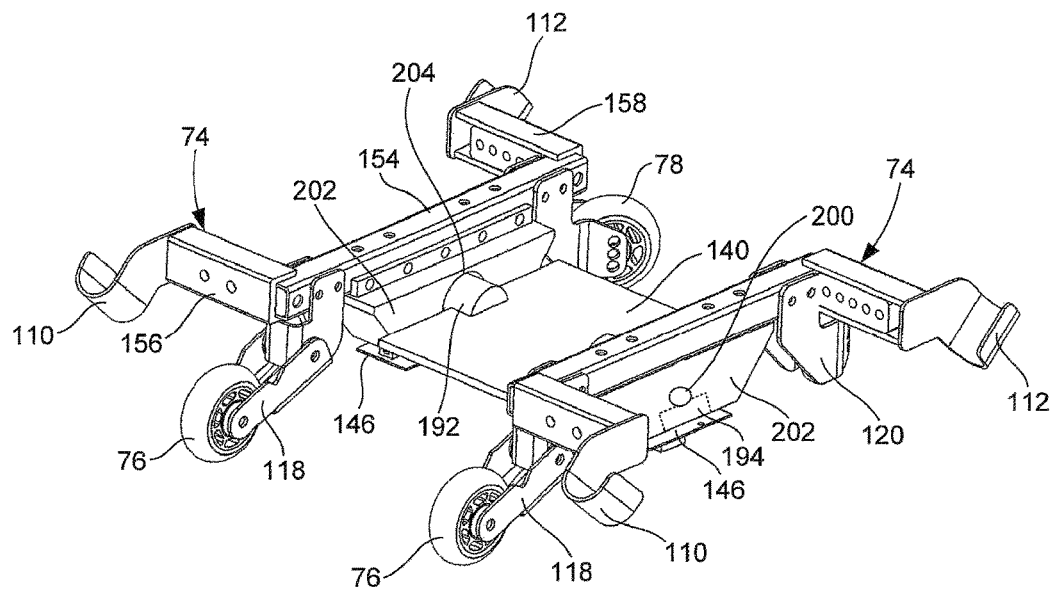
FIG. 43 is a front perspective view of the power assist apparatus of FIG. 36 shown without both wheels and wheelmotors and without the control mechanism and battery.
Figure 44:
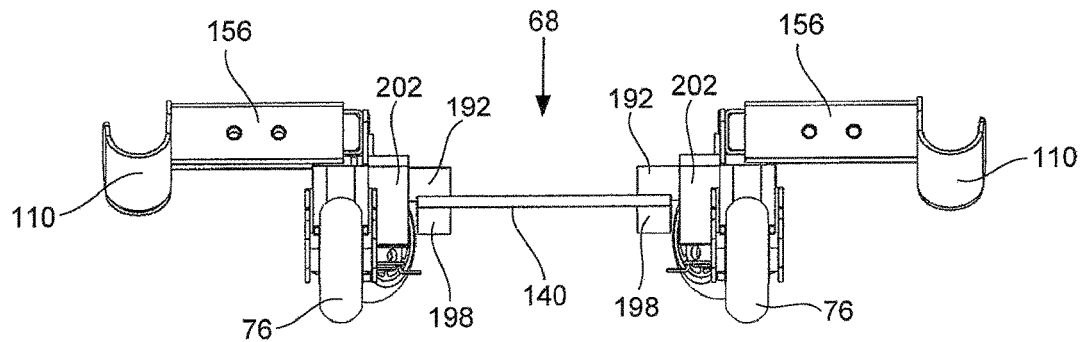
FIG. 44 is a front view of the power assist apparatus of FIG. 43.
Figure 45:
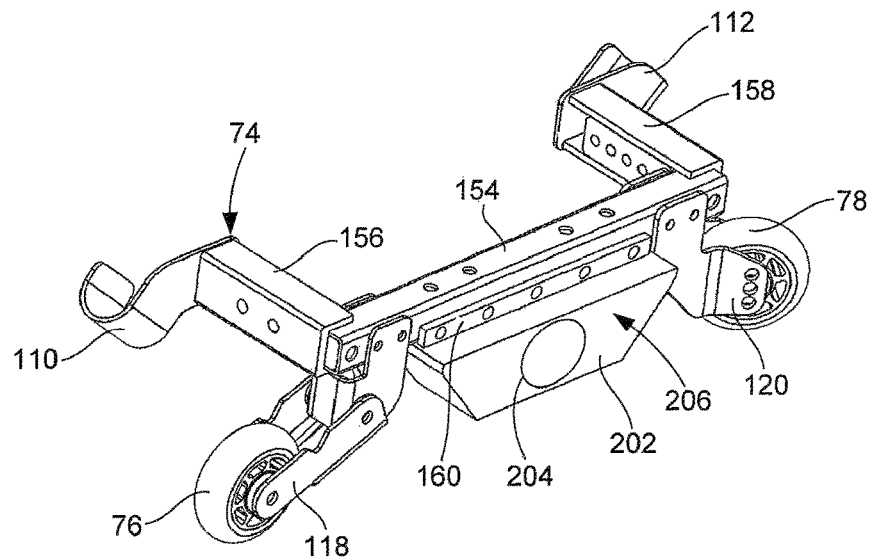
FIG. 45 is a front/left perspective view of the right outrigger assembly, front wheel, back wheel and the pivot mechanism (shown as a pivot arm) of the power assist apparatus of FIG. 44.
Figure 46:
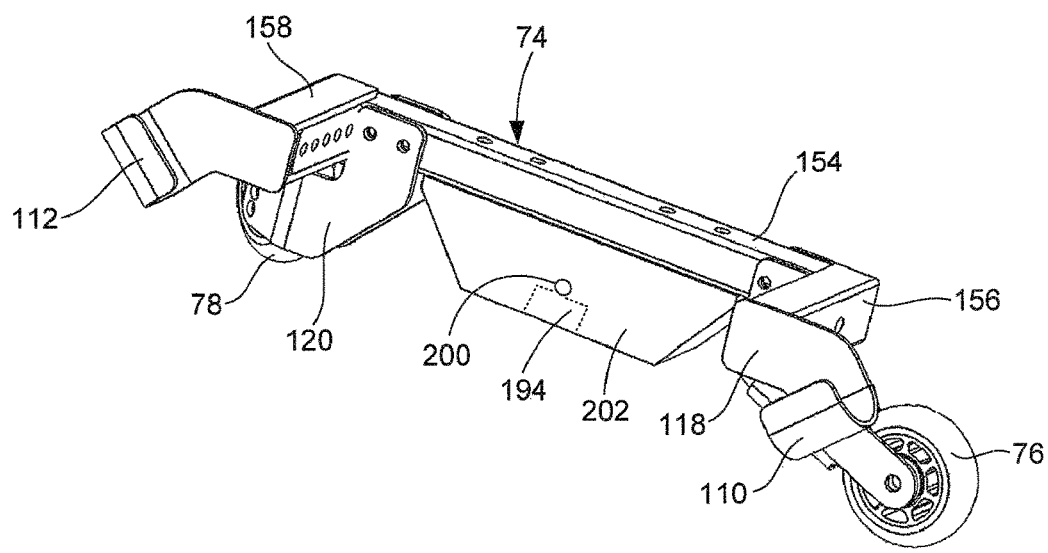
FIG. 46 is a front/right perspective view of the right outrigger assembly, front wheel, back wheel and pivot mechanism of FIG. 45.
Figure 47:
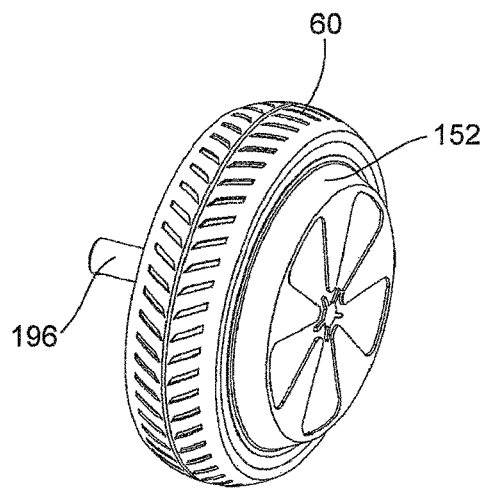
FIG. 47 is a front perspective view of the first/left wheel and wheelmotor of the power assist apparatus of FIG. 36.
Figure 48:
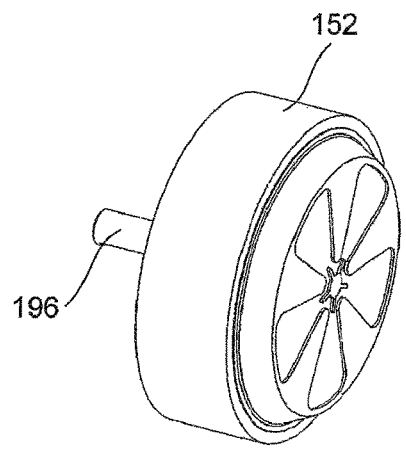
FIG. 48 is a front perspective view of the first/left wheelmotor, shown separate from the wheel, of FIG. 47.

As set forth above, the two wheelmotors 152 are controlled (i.e., the amount of power and the forward/rearward direction of the rotation) by the control mechanism 142 in response to the position signals that are received from the position sensor mechanisms 146 as a result of the movement of the outrigger assembly in response to the motion imparted to the drive wheels 28/30 of the wheelchair 12 by the occupant of the wheelchair 12. To transfer the movement of the drive wheels 28/30, which occur as a result of the occupant moving the hand rim 34 of the wheelchair 12 in substantially the same manner in which he or she would if the wheelchair 12 was manually moving across the surface 14, the pivot mechanism 166 comprises a pivot block 202 which is attached to or integral with each of the outrigger assemblies 74 and structured and arranged to pivot independently of the support frame 140 and the two wheelmotors 152, as best shown in FIGS. 36-40. Each pivot block 202 has a pivot aperture 204 through the pivot block 202 that receives the upper enlarged section 192 to engage the lower motor mount 194, disposed in the pivot aperture 204, to form the tubular shaped opening 200 for the axle 196 of the wheelmotor 152. The lower enlarged section 198, show in FIG. 44, is also received in the pivot aperture 204 on the inner side 206 (shown in FIG. 45) of the pivot block 202, where the upper enlarged section 192 and lower enlarged section 198 form a generally circular pivot member or bearing around which the pivot block 202 will pivot in response to movement of the drive wheels 28/30 of the wheelchair 12. The position sensor mechanisms 146 associated with each pivot block 202, as best shown in FIGS. 41 and 43, will transmit the position data to the control mechanism 142 for control of the wheelmotors 152.

Figure 51:
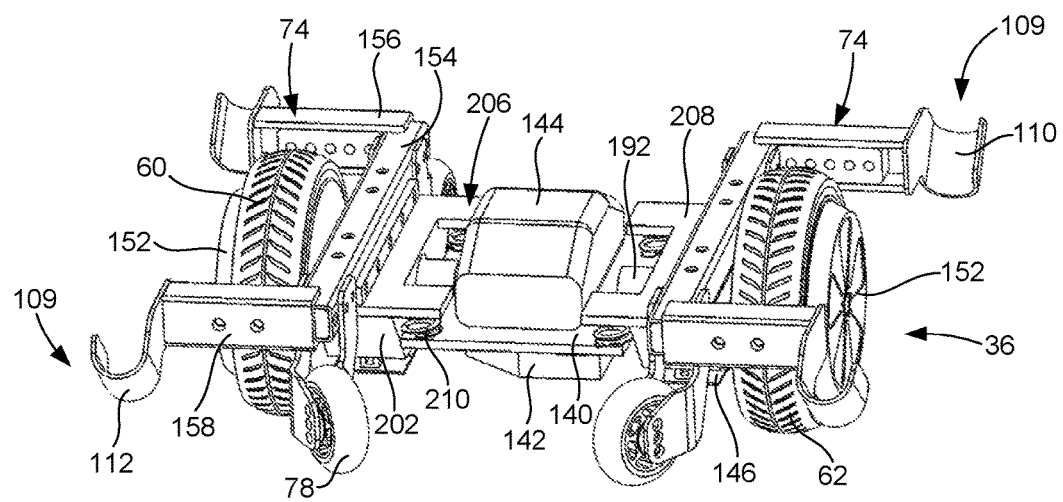
FIG. 51 is a front perspective view of an alternative configuration for the power assist apparatus of the fourth embodiment of the present invention showing use of a suspension system associated with each of the pivot mechanisms.
Figure 52:
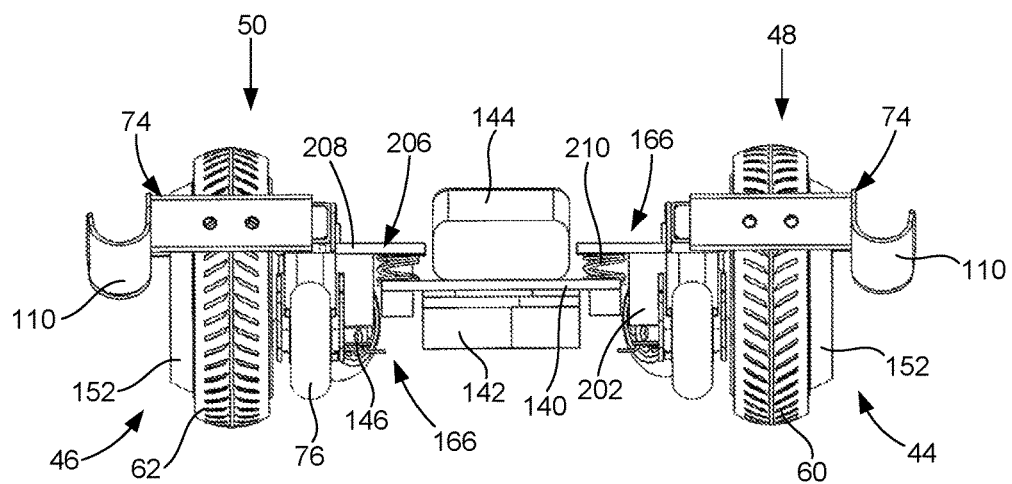
FIG. 52 is a front view of the power assist apparatus of FIG. 51.

An alternative configuration for the fourth embodiment of the power assist apparatus 10 of the present invention is shown in FIGS. 51 and 52. These figures show the use of a suspension system 206 comprising a suspension plate 208 and a pair of springs 210 associated with each of the pivot mechanisms 166. More specifically, each suspension system 206 has a suspension plate 208, which is attached to or integral with the upper surface of the pivot block 202, that is sized and configured to extend over the upper surface 184 of the support frame 140 and a pair of springs 210 disposed between the lower surface of the suspension plate 208 and the upper surface 184 of the support frame 140 on either side of the upper enlarged section 192, as shown in FIGS. 51 and 52. The suspension system 206 improves the performance of the power assist apparatus 10 when it is connected to the wheelchair 12, particularly when a person is pushing the wheelchair 12 with an occupant in the wheelchair 12. In a preferred configuration, the suspension system 206 is also configured to place the power assist apparatus 10 in a forward tilting position (i.e., tilting onto the front wheels 76) when it is not in use and to provide a forward tilt bias when the wheelchair 12 is attached to the apparatus 10 and is being utilized to provide power to the wheelchair 12 to keep the back wheels 78 off of the surface 14. In this configuration, however, the forward tilting bias should not be so strong as to make it too difficult for the occupant of the wheelchair 12 to apply a braking action by leaning rearward on the back support 22, which will place the back wheels 78 in contact with the surface 14 and slow or stop the forward motion of the powered wheelchair 12.

A fifth embodiment of the power assist apparatus 10 of the present invention is shown in FIGS. 53-66. Although this embodiment incorporates or uses many of the same components of the previously described embodiments, in this embodiment the support assembly 38, including the outrigger support assembly 72 and the outrigger assembly 74, and the pivot mechanism 166 are mounted to one of the upper surface 184 or the lower surface 186 of the support frame 140 that separates and interconnects the two wheelmotors 152 and wheels 60/62 at the left 44 and right 46 sides of the apparatus 10, as best shown in FIGS. 53-56. With regard to the configurations shown in these figures, the outrigger support assembly 72 and pivot mechanism 166 (as well as the battery 144 and position sensor mechanism 146) are mounted to the upper surface 184 of the support frame 140, the control mechanism 142 (inside the lower housing 150) is mounted to the lower surface 186 of the support frame 140, the first wheel 60 and its associated wheel motor 152 are rotatably mounted to the outrigger support assembly 72 at the first/left side 188 of the support frame 140 and the second wheel 62 and its associated wheel motor 152 are rotatably mounted to the outrigger support assembly 72 at the second/right side 190 of the support frame 140. This configuration of apparatus 10 also achieves the benefits of reduced manufacturing costs and improved power assist operation that results from moving the pivot point away from the center position 68 of the apparatus 10 that are described with regard to the third and fourth embodiments. In addition, the configuration of the fifth embodiment of apparatus 10 also achieves the following benefits: (1) narrower overall width of the apparatus 10; (2) better ground clearance; (3) ability to propel the wheelchair 12 and apparatus 10 forward by using only one of the drive wheels 28/30 of the wheelchair 12 (turns are accomplished by one forward and one back); (4) reduced cost to manufacture; (5) easier to assemble; and (6) stronger apparatus 10.

Figure 53:
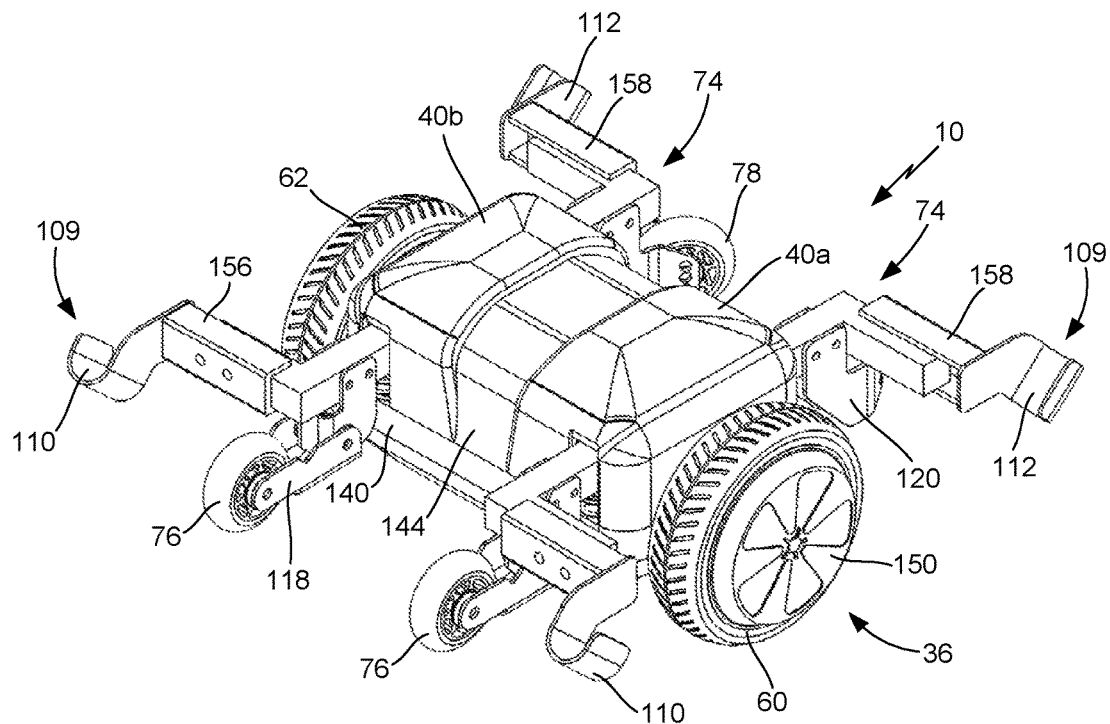
FIG. 53 is a side perspective view of a power assist apparatus that is configured according to a fifth embodiment of the present invention showing each of the outrigger support assemblies mounted on top of a support frame using a pivot block pivotally disposed between a pair of bearing blocks that are mounted on the support frame.
Figure 54:
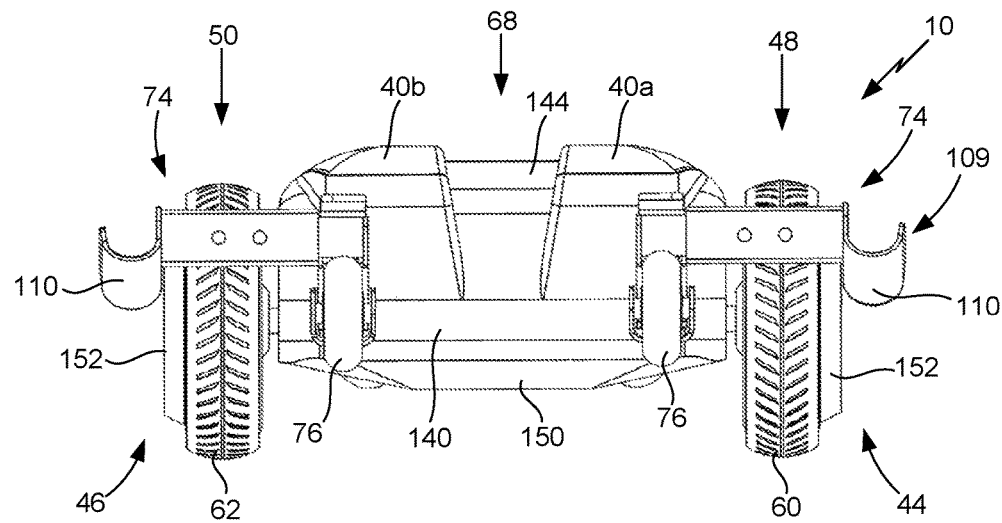
FIG. 54 is a front view of the power assist apparatus of FIG. 53.
Figure 55:
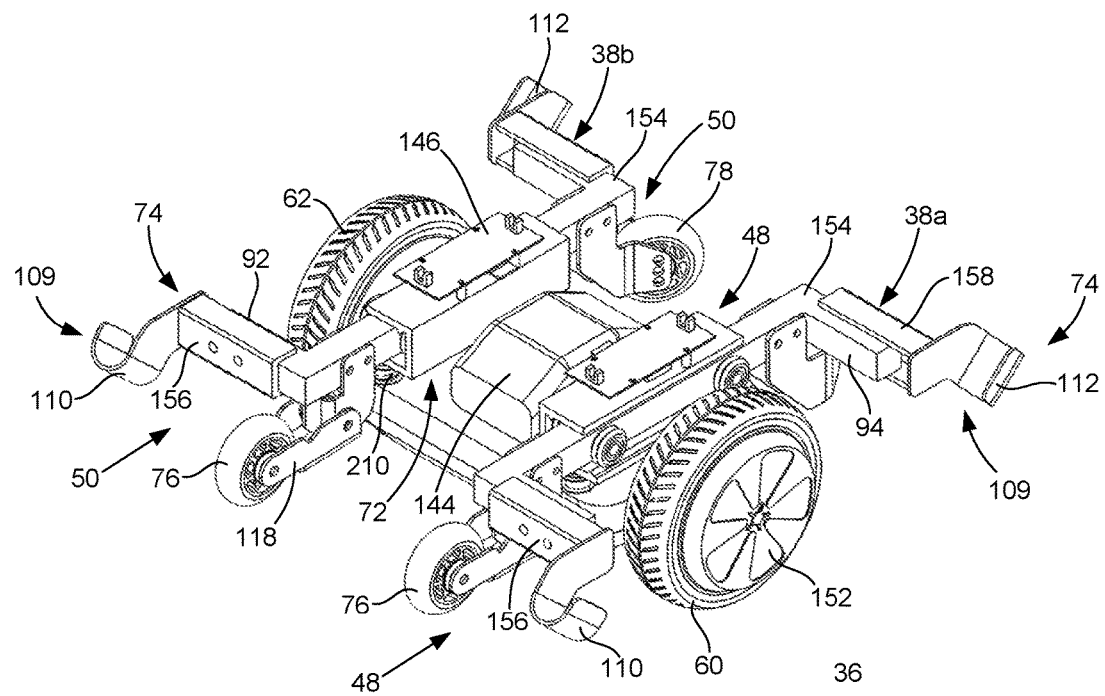
FIG. 55 is a side perspective view of the power assist apparatus of FIG. 54 with the shroud removed to better illustrate the internal components of the apparatus.

In the fifth embodiment, the apparatus 10 has a single support frame 140 that is positioned between the two motorized sections 48/50, as best shown in FIGS. 53-56, in contrast to the two support frames 140 on either side 44/46 of the center position 68 of the apparatus 10 of the third embodiment (i.e., FIG. 32). The single support frame 140 connects the two motorized sections 48/50, which are located on opposite sides 44/46 of the apparatus 10, and supports the support assemblies 38 and pivot mechanism 166 in a manner that allows the two motorized sections 48/50 to pivot independent of the support frame 140 and each other. As best shown in FIGS. 55-58, a modified pivot mechanism 166 is mounted onto the upper surface 184 of the support frame 140 (towards the first/left side 188 thereof) and configured to interconnect the first motorized section 48 with the first side 188 of the single piece support frame 140. As similarly configured pivot mechanism 166 is mounted onto the upper surface 184 of the support frame 140 (towards the second/right side 190 thereof) and configured to interconnect the second motorized section 50 with the second side 190 of support frame 140. As set forth above, in the figures for the fifth embodiment, the battery 144 is supported on the upper surface 184 and the control mechanism 142 (inside the lower housing 150) is mounted to or otherwise attached to the lower surface 186 of the support frame 140, as best shown in FIGS. 53-55. As will be readily appreciated by persons skilled in the art, the location of the battery 144 and/or control mechanism 142 can be different than what is shown in the figures.

Figure 56:
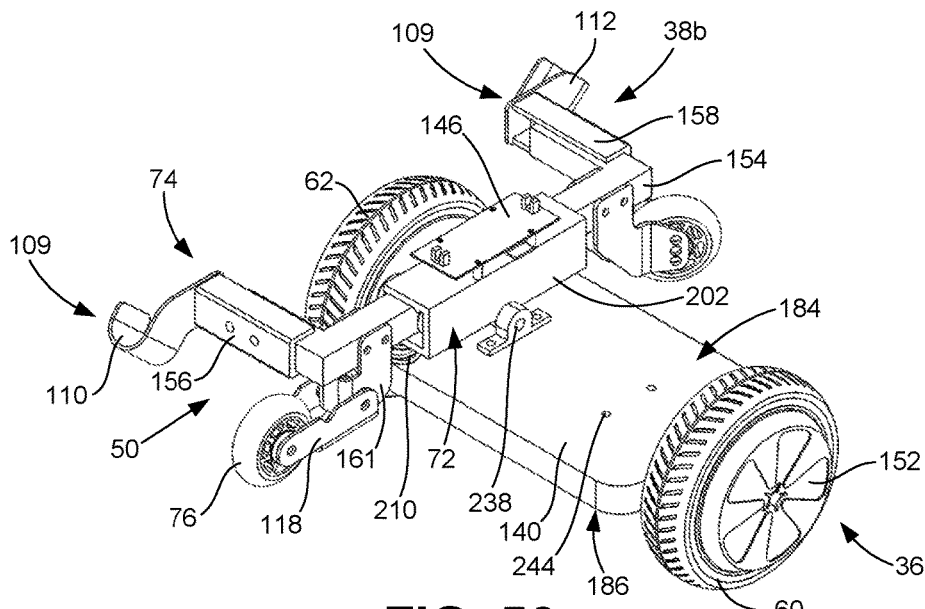
FIG. 56 is a side perspective view of the power assist apparatus of FIG. 55 with the battery and first support assembly removed therefrom.
Figure 57:
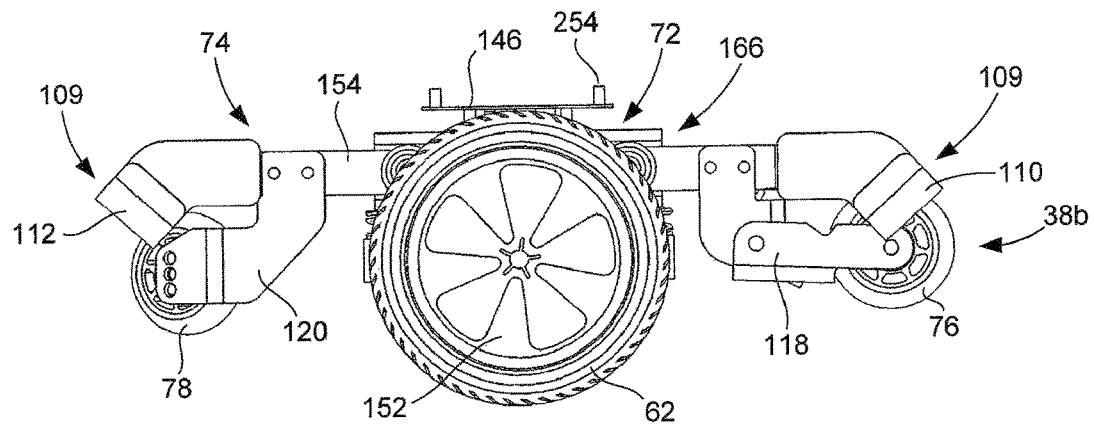
FIG. 57 is a right side view of the power assist apparatus of FIG. 56.
Figure 58:
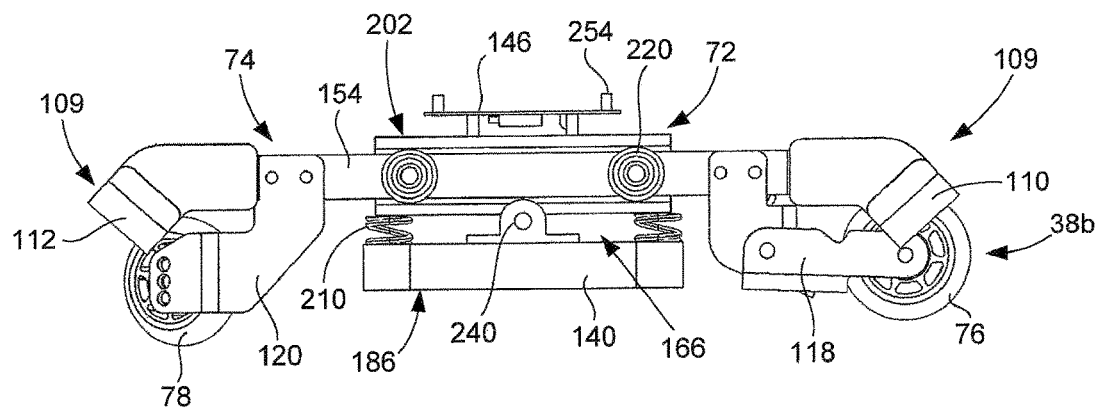
FIG. 58 is a right side view of the power assist apparatus of FIG. 57 with the motorized mechanism removed therefrom.
Figure 60:
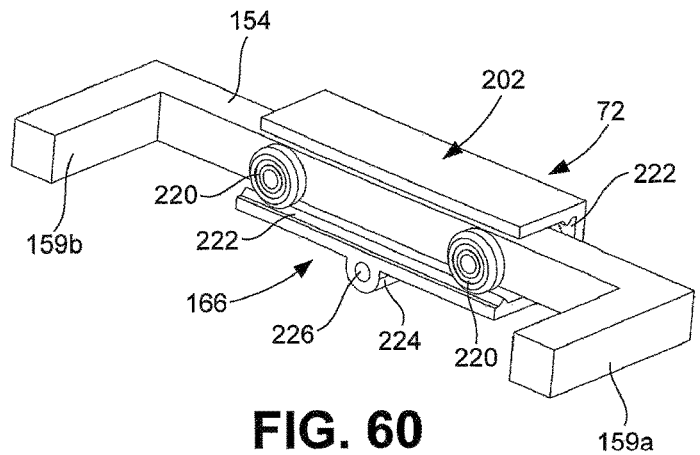
FIG. 60 is a side perspective view of the components of the power assist apparatus of FIG. 59 shown without the position sensor mechanism and bearing blocks.
Figure 61:
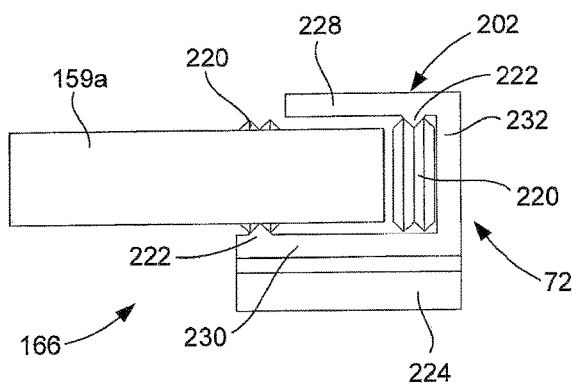
FIG. 61 is a front view of the components of the power assist apparatus of FIG. 60.
Figure 62:
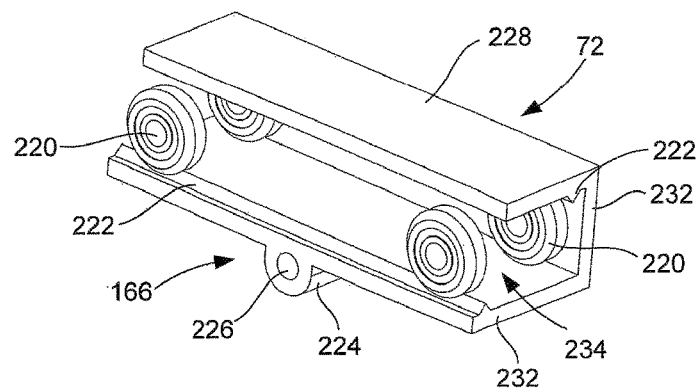
FIG. 62 is a side perspective view of the components of the power assist apparatus of FIG. 61 without the support arm to better show the pivot block and pivot wheels.

In the fifth embodiment of the apparatus 10 of the present invention, each of the outrigger support assemblies 72 have a C-shaped pivot block 202 that is configured to slidably support the elongated support arm 154 of the outrigger assembly 74 and, by way of the pivot mechanism 166, is structured and arranged to pivot independently of the support frame 140 and the two wheelmotors 152, as best shown in FIGS. 56-59. Each pivot block 202 has a pivot bearing 224 with an pivot pin aperture 226 therethrough, as best shown in FIGS. 60-62, that allows the pivot block 202 to pivot relative to the support frame 140 on which the pivot blocks 202 are mounted, as best shown in FIGS. 56 and 58. In the figures for this embodiment, the pivot block 202 (which functions as the support rails 106/108 of the outrigger support assembly 72) is in a generally C-shaped configuration, with an upper block member 228, a lower block member 230 and a side block member 232 interconnecting the upper 228 and lower 230 block members to form a track channel 234 in the pivot block 202, as best shown in FIGS. 60-63. In another embodiment, the pivot block 202 will be tubular shaped for increased strength. To achieve the desired forward/rearward movement of the outrigger assemblies 74, the apparatus 10 includes a moving mechanism 236 that allows each outrigger assembly 74 to independently move forward/rearward relative to their respective outrigger support assembly 72. In the fifth embodiment, the moving mechanism 236 comprises the track wheels 220 that move along the track 222 disposed inside the track channel 234, as best shown in FIGS. 58-63. In this embodiment the elongated support arm 154 of the outrigger assembly 74 is moveably supported in the track channel 234 by the one or more track wheels 220 that are rotatably attached to the inner and outer sides of the support arm 154 (the embodiment in the figures has two track wheels 220 on each side of the support arm 154). The track wheels 220 are sized and configured to rotatably move along the track 222, thereby allowing the support arm 154 of the outrigger assembly 74, which is disposed inside the track channel 234 formed by the pivot block 202, to move forward and rearward.

Allowing the outrigger assembly 74 to move forward and rearward (i.e., toward the forward side 80 or toward the rearward side 82 of the apparatus 10) solves the problems with regard to the lack of forward/rearward movement set forth above with regard to the second embodiment (i.e., FIGS. 23-28). Because this embodiment allows the outrigger assemblies 74 to slide forward and rearward relative to the outrigger support assembly 72, the apparatus 10 of this configuration will be able to be utilized with both the rigid and folding types of wheelchairs 12. As set forth above, the front and back movement (whether sliding, rolling or the like) of the outrigger assemblies 74 is necessary to provide flexibility to the apparatus 10 that is required for the apparatus 10 to operate with rigid wheelchairs 12. Although the fifth embodiment of the apparatus 10 of the present invention is shown utilizing a moving mechanism 236 comprising track wheels 220 that roll along the track 222 inside the C-shaped pivot block 202, persons who are skilled in the art will readily appreciate that the present invention is not so limited. For instance, the moving mechanism 236 can comprise roller bearings, roller blocks and the like, the wheels, bearings, rollers and the like can be mounted to the top, bottom and/or sides of the support arm 154, the pivot block 202 (i.e., support rails 106/108) can be round, square, rectangular or other shapes of tubular members and like modifications which allow the outrigger assemblies 74 to move forward and rearward.

Figure 59:
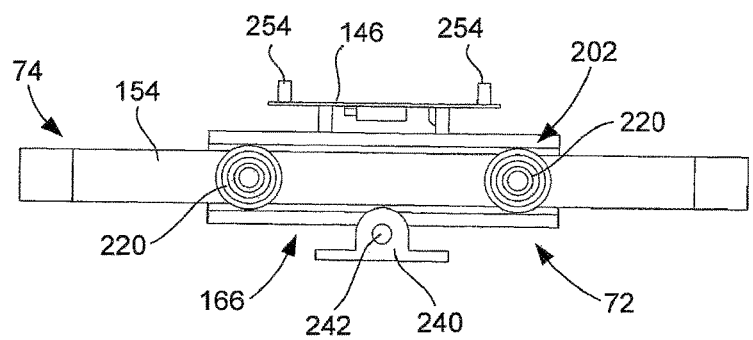
FIG. 59 is a right side view of the components of the power assist apparatus of FIG. 58 without the support frame, springs and wheel support mechanisms.

The pivot block 202 is mounted to the support frame 140 (the upper surface 184 thereof in the figures) utilizing a pair of spaced apart bearing blocks 238 and 240 (bearing block 238 being the inside block and bearing block 240 being the outside block) that are mounted onto the support frame 140, as best shown in FIGS. 56 and 58-59. A pivot pin, not shown in the figures, extends in through the pivot pin aperture 226 of the pivot bearing 224 attached to or integral with the bottom (i.e., bottom member 232) of the pivot block 202 into the pivot pin aperture 242 of the pivot blocks 238/240. The pivot blocks 240 are mounted onto the support frame 140 in spaced apart relation to each other so the pivot block 202 will be allowed to pivot therebetween. In the embodiment shown in the figures, the bearing blocks 238/240 are mounted to the upper surface 184 of the support frame at the pivot bearing mounting holes 244 using screws, bolts or other connectors. When the bearing blocks 238/240 are mounted to the support frame 140 and the pivot block 202 positioned therebetween, with the pivot pin passing through the pivot pin apertures 226/242, the pivot block 202 will be in spaced apart relation to the surface (i.e., the upper surface 184 of the support frame 140) a sufficient distance so the pivot block 202, and the outrigger assembly 74 supported thereby, will be allowed to pivot relative to the upper surface 184 of the support frame 140 and the motorized mechanism 36 (i.e., the wheel 60/62 and wheelmotor 152) an amount that reflects the distance above the upper surface 184 of the support frame 140. In one embodiment, the pivot block 202 (and the pivot bearing 224 that is associated therewith) and bearing blocks 238/240 are structured and arranged to allow the outrigger assembly 74 to pivot approximately ten degrees.

In the configuration of the fifth embodiment shown in FIGS. 53-58, the outrigger assembly 74 comprises support arm 154, which may be a tubular member (as shown), a pair of perpendicularly disposed adjustable members, shown as the forward adjustable member 156 and rearward adjustable member 158, that are slidably disposed over the outwardly disposed members 159 of the support arm 154 and the wheel support mechanism 109, which comprises the wheel catches 110/112, attached to or integral with the outer end of the adjustable members 156/158. The first wheel catch 110 is attached to or integral with the forward adjustable member 156 and the second wheel catch 112 is attached to or integral with the rearward adjustable member 158. The adjustable members 156/158 are structured and arranged to inward and outward to allow the user to adjust the width WCW between the pair of front wheel catches 110 and between the pair of back wheel catches 112 to compensate for wheelchairs 12 having a different widths DWW between the drive wheels 28/30.

Figure 63:
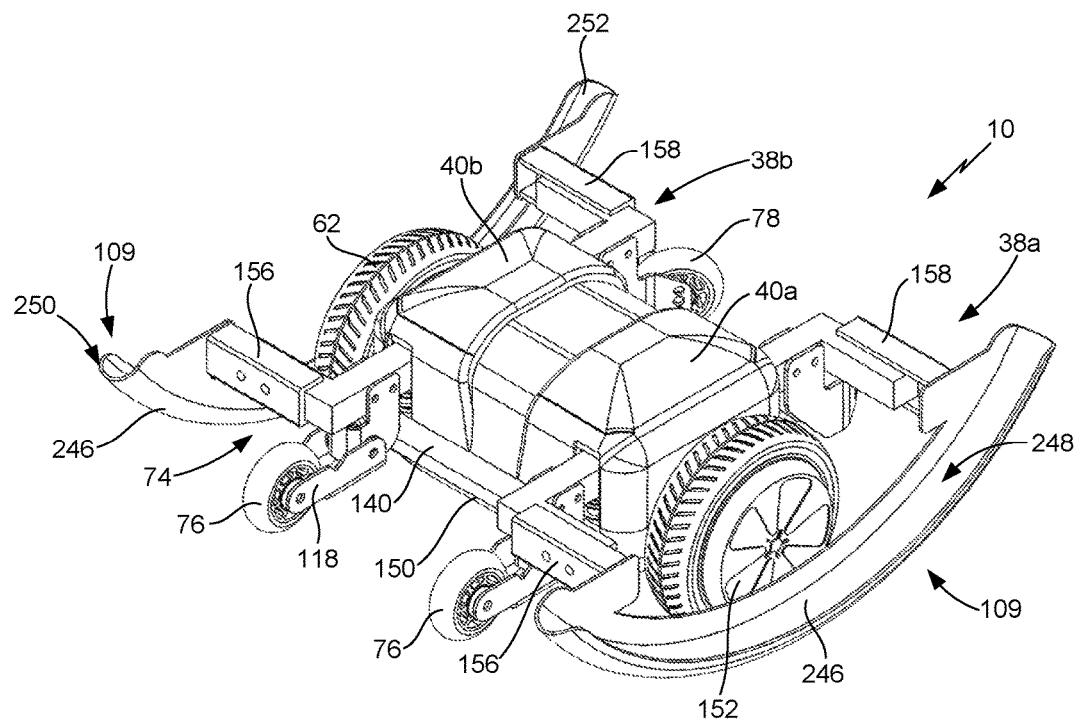
FIG. 63 is a side perspective view of the power assist apparatus of FIG. 53 showing use of a single curved, elongated wheel catch for the wheel support mechanisms.
Figure 64:
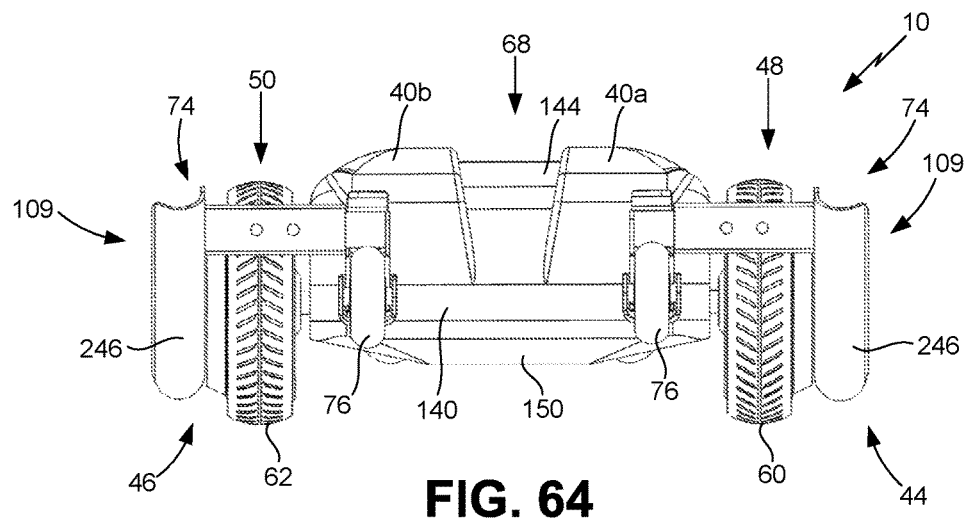
FIG. 64 is a front view of the power assist apparatus of FIG. 63.
Figure 65:
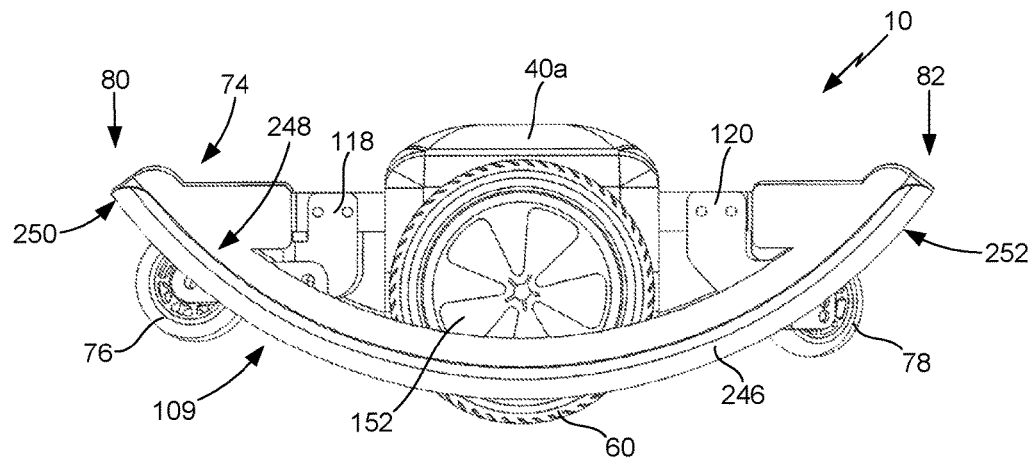
FIG. 65 is a left side view of the power assist apparatus of FIG. 63.
Figure 66:
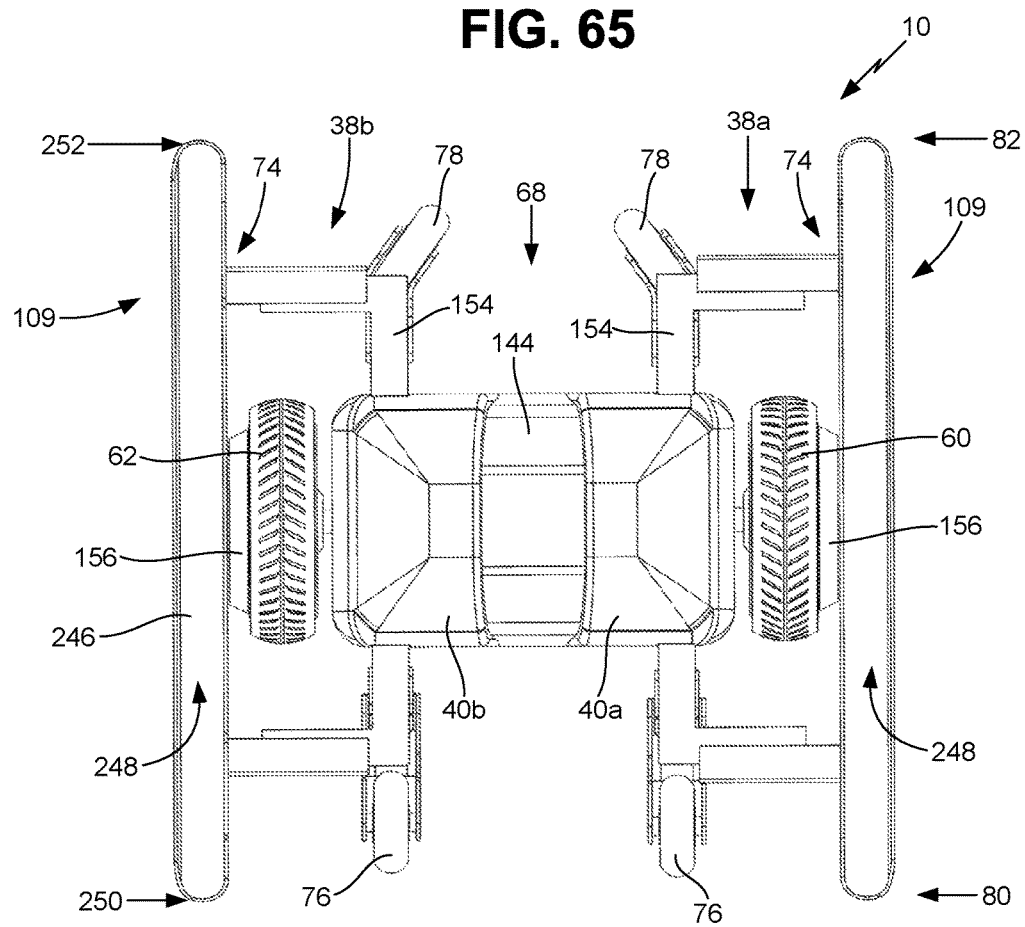
FIG. 66 is a top view of the power assist apparatus of FIG. 63.
Figure 67:
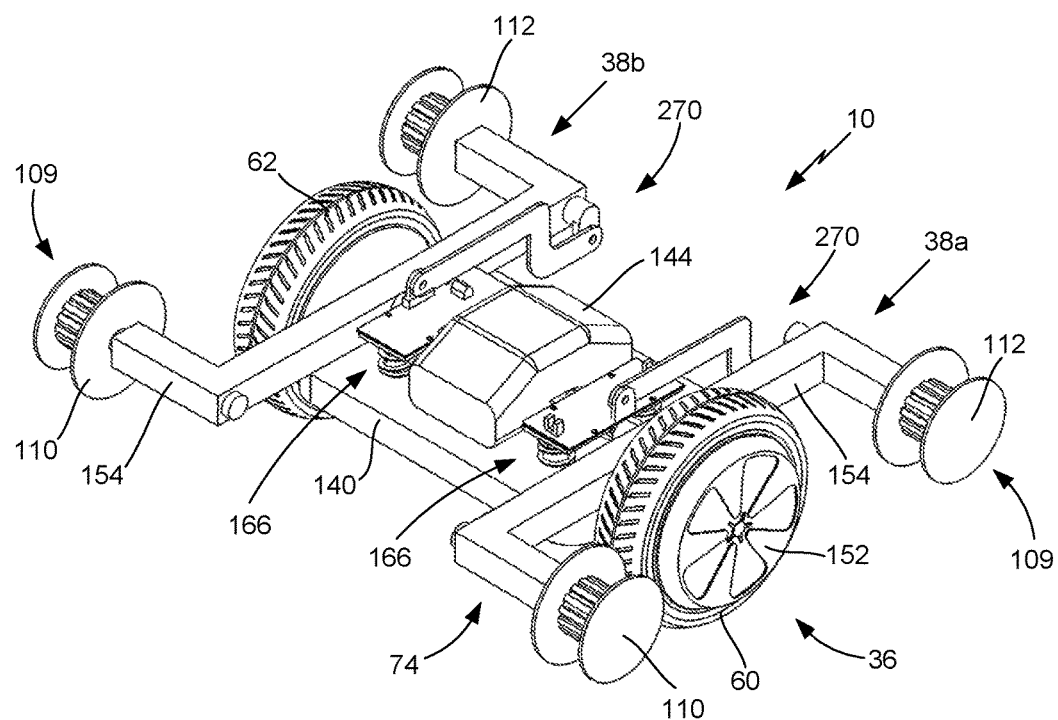
FIG. 67 is a side perspective view of a power assist apparatus that is configured according to a sixth embodiment of the present invention showing each of the outrigger support assemblies fixedly mounted on top of a support frame and use of a pivot mechanism comprising a roller and a pivot assembly interconnecting the roller and the position sensor mechanism.

The configuration of the fifth embodiment shown in FIGS. 63-66, the apparatus 10 utilizes an alternative configuration for the wheel support mechanism 109. In this configuration, the wheel support mechanism 109 comprises a single, curved elongated wheel catch 246 each side 44/46 of the apparatus 10. Each of the elongated wheel catches 246 are generally in the shape of an upside down bicycle fender that are structured and arranged to receive and support one of the drive wheels 28/30 of the wheelchair 12 therein. More specifically, each of the elongated wheel catches 246 are curved in the general shape of the drive wheels 28/30 and sized and configured to form a trough or wheel-receiving area 248, as best shown in FIGS. 63 and 65-66, that extends at least generally between the forward end 80 and the rearward end 82 of the apparatus 10. In one embodiment, the elongated wheel catch 246 has a first or front end 250 that is generally at or near the forward side 80 and a second or back end 252 that is generally at or near the rearward side 82, as best shown in FIGS. 65-66. In another embodiment, the elongated wheel catch 246 can be somewhat shorter, such as one-half the length or the like, and still be utilized to receive and support the hand wheels 28/30 of the wheelchair 12. As will be readily appreciated by persons who are skilled in the relevant arts, a wide variety of different sizes and configurations can be utilized for the wheel catches 110/112 and/or the elongated wheel catch 246 for the power assist apparatus 10.

A wide variety of enhancements or optional equipment can be utilized with the apparatus 10 of the present invention. For instance, the embodiment of FIGS. 53-62 shows the use of one or more pressure sensors 254 associated with each of the support assemblies 38a/38b, as best shown in FIGS. 57-59. As shown in these figures, the pressure sensors 254 can be mounted on the plate or board that supports the position sensor mechanism 146. The pressure sensors 254 are operatively connected to the control mechanism 142. In one embodiment, the pressure sensors 254 are utilized to detect if any weight is on the apparatus 10. If there is no weight on the apparatus 10, as determined by the pressure sensors 254, then the apparatus will not be able to power on (i.e., the control mechanism 142 is configured to interrupt the circuit between the source of power (battery 144) and the wheelmotors 156). If the pressure sensors 254 determine that there is pressure on only one of the support assemblies 38a/38b, the control mechanism 142 will prevent powering on the apparatus 10 and sound an alarm. If the pressure sensors 254 determine that there is weight on both support assemblies 38a/38b, then the control mechanism 142 will allow the user to power on the apparatus 10. Generally, the control mechanism 142 will be set to only allow powering on the apparatus 10 when a minimum amount of weight is detected at the pressure sensors 254, such as the weight of the wheelchair 12 and a minimum amount for the intended occupant of the wheelchair 12. Instead of pressure sensors, various optical, magnetic or other devices can be utilized with apparatus 10 to determine if a person is in the wheelchair 12.

In a preferred configuration, the wheel support mechanisms 109 are structured and arranged to allow the occupant of a wheelchair 12 to easily move the wheelchair 12 on and off of the apparatus 10 by himself or herself by simply rolling the drive wheels 28/30 of the wheelchair on and off of the wheel support mechanisms 109. More specifically, with regard to the embodiments shown in the figures, when the power assist apparatus 10 is off and the wheelchair 12 is not mounted thereon, the front support arms 94 or the forward side 80 of the elongated support arm 154 will tilt forward such that the front wheel catches 110 or the front end 250 of the elongated wheel catch 246, which are attached thereto or integral therewith, will be on or very near the surface 14. Preferably, the wheel catches 110 or the front end 250 of the elongated wheel catch 246 will be shaped and configured to allow the occupant of the wheelchair 12 to easily move the drive wheels 28/30 of the wheelchair 12 onto the wheel catches 110 or elongated wheel catch 246 by simply rolling backwards along the surface 14.

A sixth embodiment of the power assist apparatus 10 of the present invention is shown in FIGS. 67-73. As with the fifth embodiment, this embodiment incorporates or uses many of the same components of the previously described embodiments, including having the outrigger assembly 74 and pivot mechanism 166 mounted to one of the upper surface 184 or the lower surface 186 of the support frame 140 that separates and interconnects the two wheelmotors 152 and wheels 60/62 at the left 44 and right 46 sides of the apparatus 10, as best shown in FIGS. 67-70. With regard to the configurations shown in these figures, the outrigger assembly 74 and pivot mechanism 166 (as well as the battery 144 and position sensor mechanism 146) are mounted to the upper surface 184 of the support frame 140 and the control mechanism 142 is mounted to the lower surface 186 of the support frame 140, the first wheel 60 and its associated wheel motor 152 are rotatably mounted to the first/left side 188 of the support frame 140 and the second wheel 62 and its associated wheel motor 152 are rotatably mounted to the second/right side 190 of the support frame 140. This configuration of apparatus 10 also achieves the benefits of reduced manufacturing costs and improved power assist operation that results from moving the pivot point away from the center position 68 of the apparatus 10 that are described with regard to the third, fourth and fifth embodiments.

Figure 68:
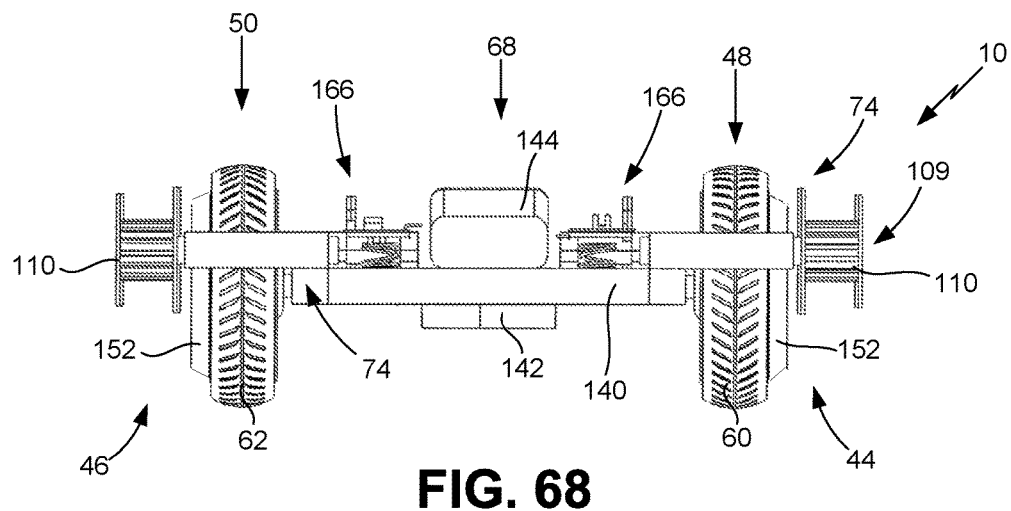
FIG. 68 is a front view of the power assist apparatus of FIG. 67.
Figure 69:
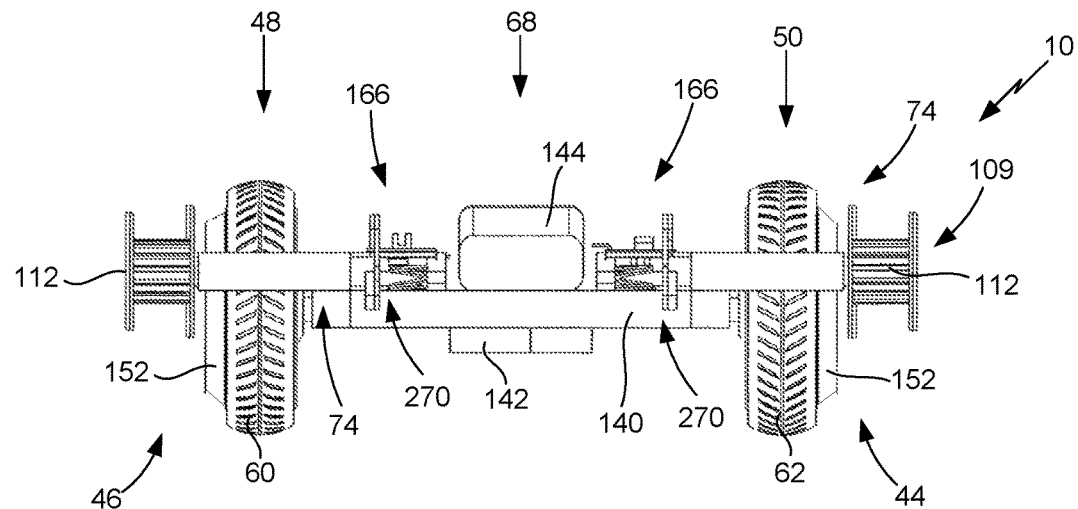
FIG. 69 is a back view of the power assist apparatus of FIG. 67.
Figure 70:
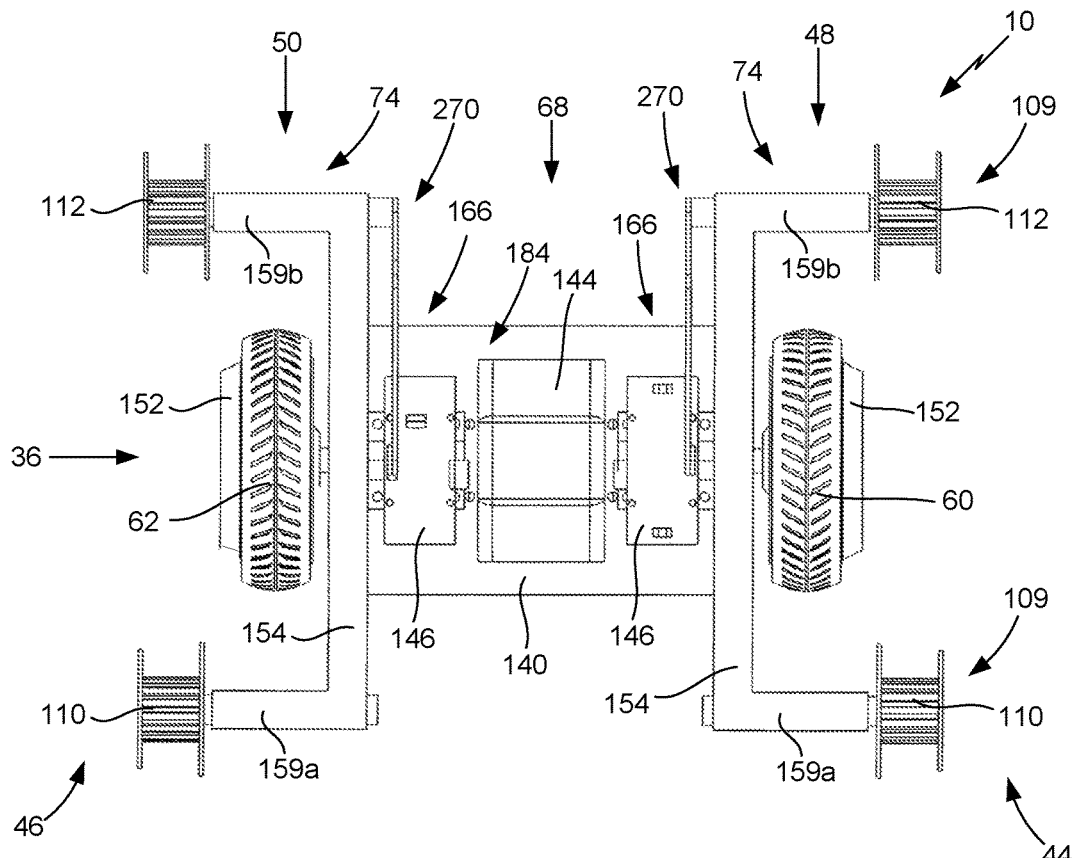
FIG. 70 is a top view of the power assist apparatus of FIG. 67.

In the configuration of the sixth embodiment shown in FIGS. 67-73, the elongated support arms 154 of each of the outrigger assemblies 74 are attached to or integral with the support frame 140, typically at the upper surface 184 (as shown, for instance, in FIG. 72) or the lower surface 186 thereof. In the various previous embodiments of the apparatus 10, the support arms 92/94 or 154 pivot relative to the motorized mechanism 36 in response to the movement of the drive wheels 28/30 of the manual wheelchair 12 when the wheelchair 12 is positioned on apparatus 10 and in use by the occupant. In the present embodiment, however, the support arms 154 (or, as applicable, 92/94) are fixed relative to the motorized mechanism 36, comprising the wheelmotors 152 at each of the first motorized section 48 and the second motorized section 50, as best shown in FIGS. 68-70. In this embodiment, the support frame 140, to which the support arms 92/94 or 154 are mounted, functions as the outrigger support assembly 72. In the previous embodiments, the pivot mechanism 166 is mounted on or associated with the outrigger assembly 74 to allow the support arms 92/94 or 154 thereof to pivot as a result of the movement of the drive wheels 28/30 by the occupant and the position sensor mechanism 146 is associated with the outrigger assembly 74 to monitor the pivot action of the support arms 92/94 or 154 and then transmit a signal to the control mechanism 142 that operates one or more of the wheelmotors 152 or other motorized mechanism 36 in response to the pivoting support arms 92/94 or 154 that cause the apparatus 10 to move the wheelchair 12 in the manner desired by the occupant of wheelchair 12. As explained in more detail below, in the present embodiment, the pivot mechanism 166 does not monitor the pivoting of the outrigger assembly 74 (since it does not pivot), instead the pivot mechanism 166 receives a signal, whether mechanical or electronic, from the modified wheel support mechanism 109 that the hand wheels 28/30 are being rotated, relative to the support arms 92/94 or 154, by the occupant and sends that information to the control mechanism 142, which (as in the previous embodiments) operates one or more of the wheelmotors 152 to cause the apparatus 10 to move the wheelchair 12 in the desired direction.

Figure 71:
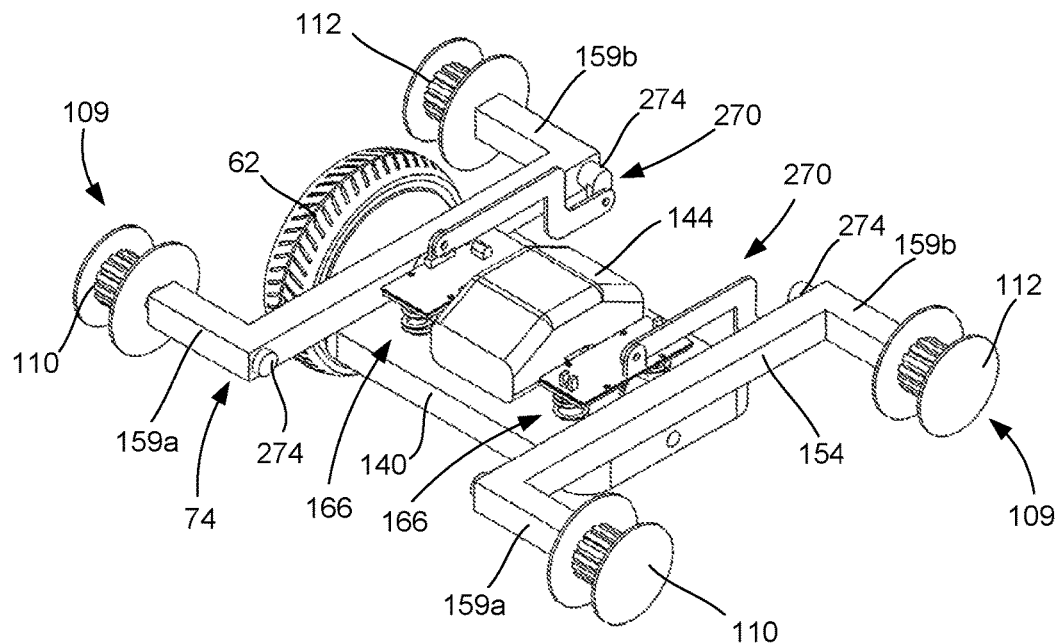
FIG. 71 is a side perspective view of power assist apparatus of FIG. 67 with the wheel and wheelmotor on the first side of the apparatus removed.
Figure 72:
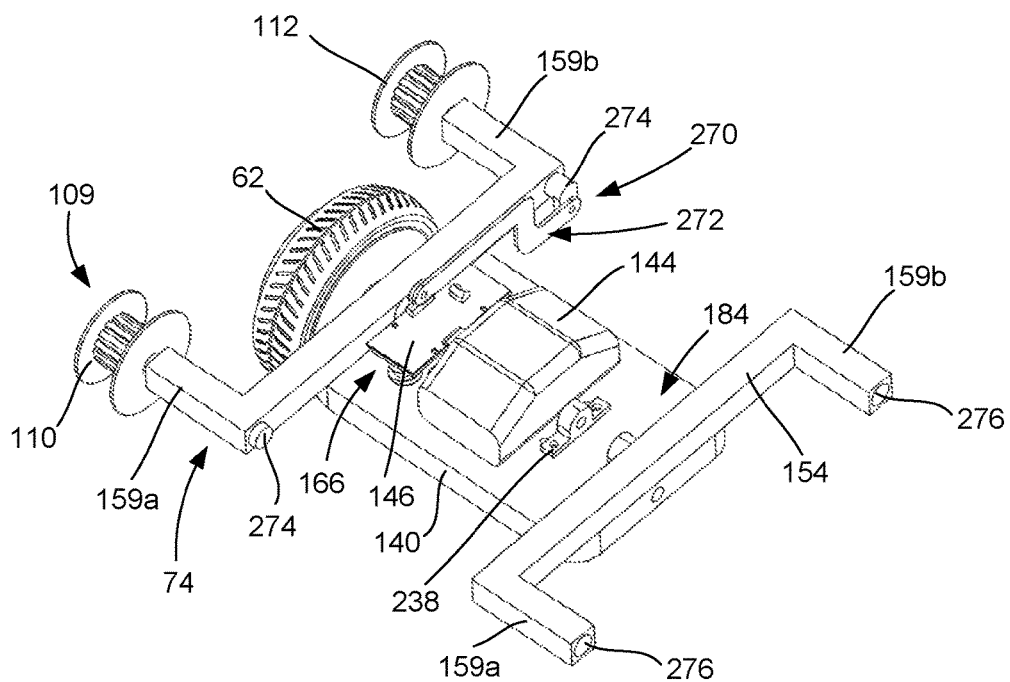
FIG. 72 is a side perspective view of the power assist apparatus of FIG. 71 with the wheel support mechanism and portions of the pivot mechanism on the first side removed.
Figure 73:
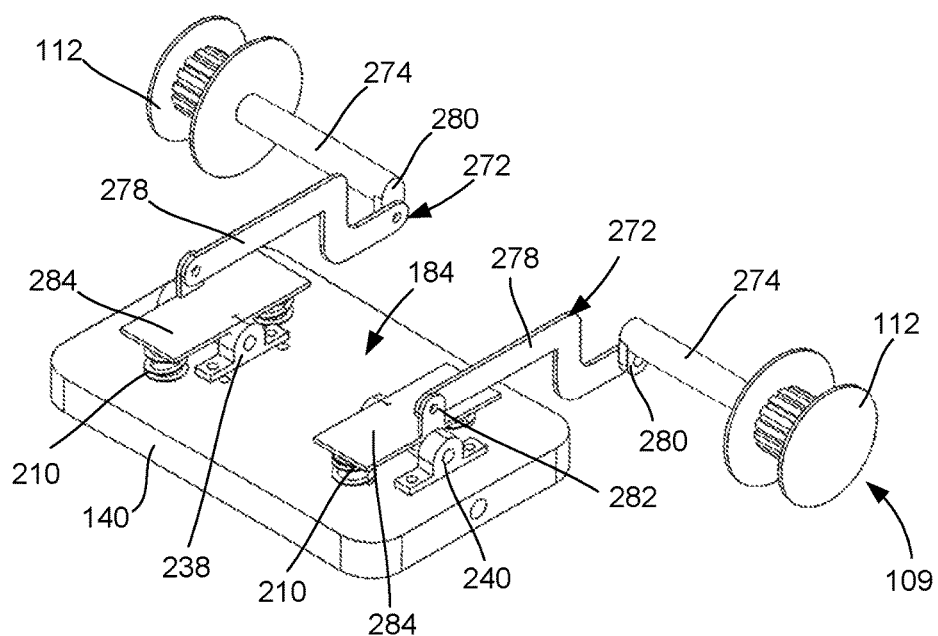
FIG. 73 is a side perspective view of the pivot mechanism of the power assist apparatus of FIG. 72 the position sensor mechanism.

In the sixth embodiment, a communicating mechanism 270 is utilized to transmit rotational movement of the drive wheels 28/30 to the pivot mechanism 166, as best shown in FIGS. 67 and 70-73, as opposed to determining movement of the drive wheels 28/30 of the wheelchair 12 through the pivoting of the outrigger assemblies 74 (such as by being mounted on the support arms 92/94 or 154) in prior embodiments. In the embodiment shown in the figures, the communicating mechanism 270 is a mechanical device comprising a linkage assembly 272. Rotational movement of the drive wheels 28/30 of the wheelchair 12 by the occupant is transmitted from the modified wheel support mechanism 109 to the pivot mechanism 166 by the communicating mechanism 270. In the embodiment shown in the figures, the apparatus 10 utilizes modified wheel catches 110/112 that are configured as rollers or cams on which the drive wheels 28/30 sit to support the wheelchair 12 above the surface 14. Each of the wheel catches 110/112 are attached to the support arms 92/94 or 154, typically the outwardly disposed members 159 thereof, in a manner that allows the wheel catches 110/112 to pivot or rotate relative to the support arms 92/94 or 154. In the configuration shown in the figures, the front wheel catches 110 only pivot or rotate (limited rotation) in response to the partial rotational movement of the drive wheels 28/30. In a preferred configuration, the modified front wheel catches 110 are sized and configured to be able to be as flush as possible with the surface 14 so as to not interfere with being able to roll the drive wheels 28/30 of the wheelchair 12 on to the apparatus 10 (as described above). As best shown in FIGS. 71-73, the back wheel catches 112 are operatively connected to the linkage assembly 272 of the communicating mechanism 270 such that the rotation of the drive wheels 28/30 will be transmitted to the pivot mechanism 166 so the rotation can be transmitted to the control mechanism 142, which will operate one or more of the wheelmotors 152 (or other motorized mechanism 36) to move the apparatus 10 and wheelchair 12 in the direction desired by the occupant of the wheelchair 12. In the embodiment shown in the figures, the back wheel catch 112 is attached to a pivot rod 274 that extends through a pivot aperture 276 in the outwardly disposed members 159 of the support arm 154, as best shown in FIGS. 72-73, so the pivot rod 274 can rotate relative to the support arm 154 and transmit rotational/pivoting movement of the back wheel catch 112 to the linkage assembly 272, which is then transmitted to the pivot assembly 166. Generally, it will be necessary to limit the amount of pivoting or rotational movement (i.e., prevent full rotation of the wheel catches 110/112) of each of the modified wheel catches 110/112 for effective and safe operation of the apparatus 10.

The linkage assembly 272 utilized in the embodiment shown in the figures generally comprises a main elongated link member 278 and a first link connector 280 that connects the pivot rod 274 to the link member 278 and a second link connector 282 that connects the link member 278 to the pivot mechanism 166, as best shown in FIG. 73. In this embodiment, pivot mechanism 166 comprises a pivot board 284 that is pivotally supported by one or more bearing blocks 238/240 that are mounted to the support frame 140. In the figures, a pair of spaced apart bearing blocks 238/240 pivotally support the pivot board 284 above the upper surface 184 of the support frame 140 such that the pivot board 284 will pivot relative to the support frame 140 in response to movement of the linkage assembly 272 (which moves in response to the pivot or rotation of the pivot rod 274 due to the occupant moving the drive wheels 28/30). The springs 210 limit the amount of pivoting movement of the pivoting mechanism 166 and will place the apparatus 10 in a balanced position when the drive wheels 28/30 of wheelchair 12 are not being rotated by the occupant. As best shown in FIGS. 70-72, the position sensor mechanism 146 is attached to, mounted on or integral with the pivot board 284 such that the pivoting motion of the pivot board 284 is recognized or measured by the position sensor mechanism 146 and transmitted to the control mechanism 142 to operate one or more of the wheelmotors 152 to move the apparatus 10 and, therefore, the wheelchair 12 on the apparatus 10 in the direction desired by the occupant of wheelchair 12. As will be readily appreciated by persons skilled in the relevant art, the wheel catches 110/112, linkage assembly 272, pivot rods 274 and pivot boards 284 can be subject to a wide variety of alternative configurations.

A variety of different configurations can be utilized with the apparatus 10 of the sixth embodiment. For instance, the support arms 92/94 or 154 and/or the pivot mechanisms 166 can be mounted on the lower surface 186 of the support frame 140 instead of the upper surface 184. The communicating mechanism 270 can be associated with the front wheel catches 110 or it could be associated with both the front 110 and back 112 wheel catches. More specifically, the linkage assembly 272 can be operatively connected with the front wheel catches 110 instead of the back wheel catches 112 or the linkage assemblies 272 can be configured to connect to both the front wheel catch 110 and the back wheel catch 112. The communication mechanism 270 can be configured in a wide variety of different manners. For instance, instead of being a mechanical connection, the communication mechanism 270 can be electronic, utilizing Bluetooth® or the like, to electronically communicate the rotation or pivoting of the drive wheels 28/30 to the position sensor mechanism 146, which is utilized by the control mechanism 142 to operatively control one or both of the wheelmotors 152 or other motorized mechanisms 36. The wheel catches 110/112 at the outward ends of the outrigger assemblies 74 can be a wheel, roller, cam or it can be in a half wheel or D-shaped configuration. In addition, there can be multiple rollers or like devices at each end of the outrigger assemblies 74, with one or more of the devices providing the input for the position sensor mechanism 146, to assist with distributing the load of the wheelchair 12 and its occupant.

In normal use, the wheelchair 12 will be utilized as a hand-propelled wheelchair 12, with the occupant of the wheelchair 12 utilizing the hand rim 34 to provide the desired motion, speed and direction, of the wheelchair 12 or another person will engage the handles 24 to push the occupant and the wheelchair 12 in the desired direction. If power assisted operation is desired for the wheelchair 12, the occupant or the other person can easily, quickly and without using any tools removably attach the power assist apparatus 10 of the present invention to the wheelchair 12. With the apparatus 10 tilted forward, such that the first/front wheel catches 110 or the front end 250 of the elongated wheel catches 246 are on or very near the surface 14, the occupant rolls the wheelchair 12 backwards to place the drive wheels 28/30 of the wheelchair 12 onto the front catches 110 or elongated wheel catch 246 of the outward extending outrigger assemblies 74. When the occupant continues to roll backwards, the drive wheels 28/30 will be "caught" by the second/back catches 112 or fully engaged in the wheel-receiving area 248 of the elongated wheel catch 246 and the apparatus 10 will shift to a more balanced position with both drive wheels 28/30 off of the surface 14, thereby creating the gap 42 shown in FIGS. 3-5. With the wheelchair 12 supported slightly off of the surface 14 by the outrigger assemblies 74 of the apparatus 10, the occupant of wheelchair 12 will utilize the hand rims 34 of the wheelchair 12 to control the movement of the wheelchair 12 in substantially the same manner as if the wheelchair 12 was on the surface 14. If another person is assisting the occupant of the wheelchair 12, then he or she will pull the wheelchair 12 (using the handles 24) onto the two outrigger assemblies 74. As stated above, preferably the front wheel catches 110 and the front end 250 of the elongated wheel catches 246 are sized and configured to allow easy movement of the drive wheels 28/30 onto the wheel support mechanisms 109 when they are on the surface 14 and to hold the wheelchair 12 on the apparatus 10 when the drive wheels 28/30 are engaged by pair of front 110 and the pair of rear 112 wheel catches, as shown in FIGS. 2-5, or engaged by the pair of elongated wheel catches 246.

The occupant or person assisting the occupant will operate a control button, switch, toggle or other device to place the apparatus 10 in its on or ready position, with the battery 144 applying electricity to the control mechanism 142 and position sensor mechanisms 146 and ready to apply power to the electric motor (i.e., the wheelmotor 152). To initiate and control the movement of the now-powered wheelchair 12, the occupant will grasp the hand rims 34 associated with each drive wheel 28/30 of the wheelchair 12 and rotate them forward or rearward, together or separately, as he or she would if the wheelchair 12 is being used on the surface 14 without the apparatus 10. In the first five embodiments, the occupant's movement of the drive wheels 28/30 is physically transmitted to each outrigger assembly 74 of the support assemblies 38, causing the outrigger assembly 74 to pivot forward or rearward in response. The motion by one or both of the outrigger assemblies 74 is received by the position sensor mechanism 146 and transmitted to and processed by the control mechanism 142. In the sixth embodiment, the occupant's movement of the drive wheels 28/30 is transmitted to the modified wheel catches 110 and/or 112 and then, in the configuration shown in the figures, to the position sensor mechanism 146 via the communication mechanism 270 and pivot mechanism 166. In one embodiment, a linkage assembly 272 mechanically transmits the rotation or pivot of the back wheel catches 112, via a pivot rod 274 rotatably disposed in a pivot aperture 276, to pivot mechanism 166 that has a pivot board 284 supporting the position sensor mechanism 146, thereby transmitting the rotational movement of one or more of the drive wheels 28/30 by the occupant to the control mechanism 142. In any of the embodiments, the control mechanism 142 sends a signal to the motorized mechanism 36 to instruct the motor associated therewith, whether the motor is in the "hoverboard" device or is a wheelmotor 152, to provide power to the wheels 60/62 as appropriate to obtain the desired direction of movement of the combination apparatus 10 and wheelchair 12. In the first two embodiments of the apparatus 10, the pivoting motion takes place at or near the center position 68 of the apparatus 10 (i.e., at pivot bearings 148 in FIG. 26). In the third, fourth and fifth embodiments, the pivoting motion takes place away from the center position 68 towards the sides 44/46 of the apparatus 10. In the third embodiment of the new apparatus 10, an extender 164 and pivot mechanism 166 (having pivot tube 168 with the pivot bearings 148) connect the two support frames 140 and moves the pivot point away from the center position 68 of the apparatus 10. In the fourth embodiment, the pivot mechanism 166 utilizes a pivot block 202 located at the opposite sides of the single support frame 140 so the outrigger assemblies 74 will pivot independently of the support frame 140 and the motorized mechanism 36 (comprising a wheelmotor 152 at each of the motorized sections 48/50), as best shown in FIGS. 36-41. In the fifth embodiment, the pivot mechanism 166 utilizes a pivot block 202 located between a pair of bearing blocks 238/240 that support the pivot block 202 above the upper surface 184 of the support frame 140 so the outrigger assemblies 74 will pivot independently of the support frame and the motorized mechanism 36 (also comprising a wheelmotor 152 at each of the motorized sections 48/50). In the sixth embodiment, the pivot mechanism 166 comprises the pivot board 284 pivotally supported by one or more bearing blocks 238/240 and springs 210, with the pivot board 284 connected to the rotating pivot rod 274 by the linkage assembly 272.

When the occupant or the person pushing the wheelchair 12 desires to slow or stop the forward motion of the power-assisted wheelchair 12, he or she will lean or pull back or rearward on the hand rims 34 of the drive wheels 28/30 of the wheelchair 12 to reverse the wheelmotors 152. The back wheels 78 will engage the surface 14 to assist in stopping the wheelchair 12 in an emergency situation and assist with providing support when turning the apparatus 10. The placement and configuration of the back wheel brackets 120 will cause the back wheels 78 to provide a braking action, thereby assisting in slowing or stopping the forward motion of the wheelchair 12. If the power assist apparatus 10 is no longer needed, the occupant or person assisting the occupant will turn off power to the apparatus 10 using the control button, switch, toggle or other device. The apparatus 10 will lean forward, placing the front wheels 76 and the front wheel brackets 110 or the front end 250 of the elongated wheel bracket 246 on the surface 14, which will allow the occupant/assistant to use the hand rims 34 associated with the drive wheels 28/30 to roll the wheelchair 12 forward off of the apparatus 10. As set forth above, the attachment of the wheelchair 12 to the apparatus 10 and the detachment of the wheelchair from the apparatus 10 is easily and quickly accomplished without the use of any tools.

As will be readily appreciated by persons skilled in the art, the various components of the power assist apparatus 10 can be made out of a wide variety of different materials and in different configurations. In a preferred embodiment, the materials and configurations selected for the new apparatus 10 are chosen for their strength and relatively lightweight qualities so apparatus 10 can be easily stored and placed into position when its use is desired to power the wheelchair 12. In the first embodiment, an off-the-shelf "hoverboard" can be utilized. In the other embodiments, a custom made motorized mechanism 36, utilizing many commonly available components (i.e., wheelmotors 152) can be manufactured for use with the new power assist apparatus 10 of the present invention. Likewise, the control mechanism 142, battery 144 and position sensor mechanism 146 can be manufactured from or at least partially comprise readily available components to reduce the cost of manufacturing the apparatus 10.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there are numerous components described herein that can be replaced with equivalent functioning components to accomplish the objectives of the present invention.

What is claimed is:

1. A power assist apparatus for use with a wheelchair having a first drive wheel and a second drive wheel adapted to move the wheelchair across a surface, said apparatus comprising:

a motorized mechanism having a first motorized section to be positioned at the first drive wheel of the wheelchair and a second motorized section to be positioned at the second drive wheel of the wheelchair said motorized mechanism further comprising a motor at each of said first motorized section and said second motorized section, a control mechanism associated with said motors so as to control the operation of said motors, a first wheel operatively connected to said motor of said first motorized section so as to be rotatably driven thereby and a second wheel operatively connected to said motor of said second motorized section so as to be rotatably driven thereby;

an outrigger assembly associated with each of said first motorized section and said second motorized section, each of said outrigger assemblies comprising at least one support arm, each of said support arms being structured and arranged to engage and support one of the first drive wheel and the second drive wheel of the wheelchair;

one or more outrigger support assemblies supporting one of said outrigger assemblies at said first motorized section and the other of said outrigger assemblies at said second motorized section, each of said support arms of said outrigger assemblies being structured and arranged to extend outward from said one or more outrigger support assemblies so as to support each of the first drive wheel and the second drive wheel of the wheelchair in spaced apart relation to the surface on which the wheelchair is to be moved by said apparatus;

a pivot mechanism operatively associated with each of said outrigger assemblies, said pivot mechanism structured and arranged to allow said outrigger assembly associated with said first motorized section to pivot independent of said outrigger assembly associated with said second motorized section; and a position sensor mechanism operatively associated with each of said outrigger assemblies to determine the respective movement of each of said outrigger assemblies, each of said position sensor mechanisms electronically connected to said control mechanism to transmit position information of said outrigger assemblies to said control mechanism, said position sensor mechanism configured to provide self-balancing operation for said apparatus, wherein rotational movement of one or more of the drive wheels of the wheelchair will pivot one or more of the outrigger assemblies and cause positional information to be transmitted to said control mechanism and then operational control information to be transmitted to said motor of at least one of said first motorized section and said second motorized section so as to move the wheelchair in the direction desired by movement of the one or more of the drive wheels of the wheelchair.

2. The apparatus of claim 1, wherein said outrigger support assemblies are structured and arranged to pivotally and/or slidably support said outrigger assemblies.

3. The apparatus of claim 1 further comprising a wheel support mechanism attached to or integral with said support arm of each of said outrigger assemblies, said wheel support mechanism structured and arranged to support the first drive wheel on a first side of said apparatus and the second drive wheel on a second side of said apparatus.

4. The apparatus of claim 1, wherein said motor of each of said first motorized section and said second motorized section of said motorized mechanism is a wheelmotor.

5. The apparatus of claim 1, wherein each of said outrigger assemblies comprise a forward adjustable member moveably supported by said at least one support arm, a rearward adjustable member moveably supported by said at least one support arm and a wheel support mechanism attached to or integral with each of said forward adjustable members and said rearward adjustable members, each of said forward adjustable member and said rearward adjustable member being structured and arranged to move said wheel support mechanism inward or outward to adjust a width between said wheel support mechanisms at a first side of said apparatus and said wheel support mechanisms at a second side of said apparatus to correspond to a width between the first drive wheel and the second drive wheel of the wheelchair.

6. The apparatus of claim 5, wherein each of said wheel support mechanisms comprises a front wheel catch at a forward side of said apparatus and a back wheel catch at a rearward side of said apparatus, each of said front wheel catches and said back wheel catches of each of said outrigger assemblies structured and arranged to engage and support one of the first drive wheel and the second drive wheel of the wheelchair.

7. The apparatus of claim 1, wherein said motors, said control mechanism and said position sensor mechanisms are electrically connected to at least one battery.

8. The apparatus of claim 1 further comprising a support frame disposed between and interconnecting said outrigger assembly of said first motorized section and said outrigger assembly of said second motorized section, said support frame and said one or more outrigger support assemblies cooperatively configured to allow said outrigger assembly of said first motorized section to pivot relative to said support frame and said outrigger assembly of said second motorized section upon rotational movement of the first drive wheel of the wheelchair and to allow said outrigger assembly of said second motorized section to pivot relative to said support frame and said outrigger assembly of said first motorized section upon rotational movement of the second drive wheel of the wheelchair when the wheelchair is supported by said apparatus.

9. The apparatus of claim 8, wherein said pivot mechanism is structured and arranged to allow each of said outrigger assemblies to slide relative to said support frame.

10. The apparatus of claim 9, wherein said pivot mechanism comprises a pivot block attached to or integral with each of said outrigger assemblies and one or more enlarged sections attached to or integral with opposing sides of said support frame, said enlarged sections sized and configured to be received in a pivot aperture of said pivot block so as to allow said pivot blocks and said outrigger assemblies to pivot relative to said support frame in response to rotational movement of the first drive wheel and the second drive wheel of the wheelchair.

11. The apparatus of claim 8, wherein each of said first motorized section and said second motorized section has said position sensor mechanism, said position sensor mechanism of said first motorized section operatively associated with said outrigger assembly thereof and said position sensor mechanism of said second motorized section operatively associated with said outrigger assembly thereof, each of said position sensor mechanisms supported by said pivot mechanism.

12. A power assist apparatus for use with a wheelchair having a first drive wheel and a second drive wheel adapted to move the wheelchair across a surface, said apparatus comprising:
a motorized mechanism having a first motorized section to be positioned at the first drive wheel and a second motorized section to be positioned at the second drive wheel, said motorized mechanism further comprising a motor at each of said first motorized section and said second motorized section, a control mechanism associated with each of said motors so as to control the operation of said motor, a first wheel operatively connected to said motor of said first motorized section so as to be rotatably driven thereby and a second wheel operatively connected to said motor of said second motorized section so as to be rotatably driven thereby;
a support frame interconnecting said first motorized section and said second motorized section so as to dispose said first motorized section at a first side of said apparatus and said second motorized section at a second side of said apparatus;
an outrigger assembly associated with each of said first motorized section and said second motorized section, each of said outrigger assemblies comprising at least one support arm, each of said support arms being structured and arranged to engage and support one of the first drive wheel and the second drive wheel of the wheelchair;
one or more outrigger support assemblies supporting one of said outrigger assemblies at said first motorized section and the other of said outrigger assemblies at said second motorized section, each of said support arms of said outrigger assemblies being structured and arranged to extend outward from said one or more outrigger support assemblies so as to support each of the first drive wheel and the second drive wheel of the wheelchair in spaced apart relation to the surface on which the wheelchair is to be moved by said apparatus;
a pivot mechanism operatively associated with each of said outrigger assemblies and each of said first motorized section and said second motorized section, said pivot mechanism structured and arranged to allow said outrigger assembly at said first motorized section to pivot independent of said support frame, said first motorized section and said outrigger assembly associated with said second motorized section and to allow said outrigger assembly at said second motorized section to pivot independent of said support frame, said second motorized section and said outrigger assembly associated with said first motorized section; and
a position sensor mechanism operatively associated with each of said outrigger assemblies to determine the respective movement of each of said outrigger assemblies, each of said position sensor mechanisms electronically connected to said control mechanism to transmit position information of said outrigger assemblies to said control mechanism, said position sensor mechanism configured to provide self-balancing operation for said apparatus,
wherein rotational movement of one or more of the drive wheels of the wheelchair will pivot one or more of the outrigger assemblies and cause positional information to be transmitted from said position sensor mechanism to said control mechanism and then operational control information to be transmitted to said motor of at least one of said first motorized section and said second motorized section so as to move the wheelchair in the direction desired by movement of the one or more of the drive wheels of the wheelchair.

13. The apparatus of claim 12, wherein each of said pivot mechanisms comprise a pivot block attached to or integral with each of said outrigger assemblies and one or more enlarged sections attached to or integral with opposing sides of said support frame, said enlarged sections sized and configured to be received in a pivot aperture of said pivot block so as to allow said pivot blocks and said outrigger assemblies to pivot relative to said support frame.

14. The apparatus of claim 12 further comprising one or more wheel support mechanisms associated with said support arm of each of said outrigger assemblies.

15. The apparatus of claim 14, wherein each of said outrigger assemblies further comprises a first support arm at a forward side of said apparatus, a second support arm at a rearward side of said apparatus, an elongated support arm interconnecting said first support arm and said second support arm, a forward adjustable member slidably associated with said first support arm and a rearward adjustable member slidably associated with said second support arm, each of said forward adjustable member and said rearward adjustable member having one of said one or more wheel support mechanism attached to or integral therewith, each of said forward adjustable member and said rearward adjustable member structured and arranged to adjust a width between said wheel support mechanisms to accommodate a width between the first drive wheel and the second drive wheel of the wheelchair.

16. The apparatus of claim 12, wherein each of said first motorized section and said second motorized section has said position sensor mechanism, said position sensor mechanism of said first motorized section operatively associated with said outrigger assembly thereof and said position sensor mechanism of said second motorized section operatively associated with said outrigger assembly thereof, each of said position sensor mechanisms supported by said pivot mechanism.

17. A power assist apparatus for use with a wheelchair having a first drive wheel and a second drive wheel adapted to move the wheelchair across a surface, said apparatus comprising:
a motorized mechanism having a first motorized section to be positioned at the first drive wheel of the wheelchair and a second motorized section to be positioned at the second drive wheel of the wheelchair, said motorized mechanism further comprising a wheelmotor at each of said first motorized section and said second motorized section, a control mechanism operatively connected to each of said wheelmotors so as to control the operation of said wheelmotors, a first wheel operatively connected to said wheelmotor of said first motorized section so as to be rotatably driven thereby and a second wheel operatively connected to said wheelmotor of said second motorized section so as to be rotatably driven thereby;
a support frame interconnecting said first motorized section and said second motorized section so as to dispose said first motorized section at a first side of said apparatus and said second motorized section at a second side of said apparatus;
an outrigger assembly associated with each of said first motorized section and said second motorized section, each of said outrigger assemblies comprising a first support arm at a forward side of said apparatus, a second support arm at a rearward side of said apparatus and an elongated support arm interconnecting said first support arm and said second support arm, each of said first support arms and said second support arms of said outrigger assemblies being structured and arranged to extend outwardly from said elongated support arm so as to support one of the first drive wheel and the second drive wheel of the wheelchair in spaced apart relation to the surface on which the wheelchair is to be moved by said apparatus;
a pivot mechanism operatively associated with each of said outrigger assemblies and said support frame so as to allow said outrigger assemblies to pivot relative to said support frame and each of said first motorized section and said second motorized section, said pivot mechanism associated with said outrigger assembly at said first side of said apparatus structured and arranged to pivot in response to rotational movement of the first drive wheel of the wheelchair, said pivot mechanism associated with said outrigger assembly at said second side of said apparatus structured and arranged to pivot in response to rotational movement of the second drive wheel of the wheelchair; and
a position sensor mechanism operatively associated with each of said outrigger assemblies to determine the respective movement of each of the first drive wheel and the second drive wheel of the wheelchair, each of said position sensor mechanisms electronically connected to said control mechanism to transmit rotational information of the first drive wheel and the second drive wheel to said control mechanism, said position sensor mechanism configured to provide self-balancing operation for said apparatus,
wherein rotational movement of one or more of the first drive wheel and the second drive wheel of the wheelchair will pivot one or more of said outrigger assemblies and cause positional information to be transmitted from said position sensor mechanism to said control mechanism and then operational control information to be transmitted to said wheelmotor of at least one of said first motorized section and said second motorized section so as to move the wheelchair in the direction desired by movement of the one or more of the first drive wheel and the second drive wheel.

18. The apparatus of claim 17 further comprising a forward adjustable member slidably associated with said first support arm and a rearward adjustable member slidably associated with said second support arm, each of said forward adjustable member and said rearward adjustable member having a wheel support mechanism attached to or integral therewith, each of said forward adjustable member and said rearward adjustable member structured and arranged to adjust a width between said wheel support mechanisms on a first side of said apparatus and said wheel support mechanisms on a second side of said apparatus so as to accommodate a width between the first drive wheel and the second drive wheel of the wheelchair.

19. The apparatus of claim 17, wherein each of said first motorized section and said second motorized section has said position sensor mechanism, said position sensor mechanism of said first motorized section operatively associated with said outrigger assembly thereof and said position sensor mechanism of said second motorized section operatively associated with said outrigger assembly thereof, each of said position sensor mechanisms supported by said pivot mechanism.

20. The apparatus of claim 19, wherein each of said pivot mechanisms comprise a pivot block and one or more enlarged sections attached to or integral with opposing sides of said support frame, each of said outrigger assemblies attached to or integral with said respective pivot block, said enlarged sections sized and configured to be received in a pivot aperture of said pivot block so as to allow said pivot blocks and said outrigger assemblies to pivot relative to said support frame, each of said position sensor mechanisms mounted on said pivot block associated with said outrigger assembly so as to pivot with said respective outrigger assembly.

21. A power assist apparatus for use with a wheelchair having a first drive wheel and a second drive wheel adapted to move the wheelchair across a surface, said apparatus comprising:
- a first motorized section to be positioned at the first drive wheel of the wheelchair, said first motorized section having a motor and a wheel rotatably driven by said motor;
- a second motorized section to be positioned at the second drive wheel of the wheelchair, said first motorized section having a motor and a wheel rotatably driven by said motor;
- a control mechanism associated with each of said motors so as to control the operation of said motors,
- a support frame disposed between said first motorized section and said second motorized section;
- an outrigger assembly associated with each of said first motorized section and said second motorized section, each of said outrigger assemblies being structured and arranged to be supported by and extend outwardly from said support frame to engage and support one of the first drive wheel and the second drive wheel of the wheelchair so as to support each of the first drive wheel and the second drive wheel of the wheelchair in spaced apart relation to the surface on which the wheelchair is to be moved by said apparatus;
- a pivot mechanism operatively associated with each of said outrigger assemblies, said pivot mechanisms being structured and arranged to allow said outrigger assemblies to pivot independently of each other and of said support frame; and
- a position sensor mechanism operatively associated with each of said outrigger assemblies, each of said position sensor mechanisms connected to said control mechanism to transmit positional information of said outrigger assemblies to said control mechanism which then transmits operational control information to the motor of at least one of said first motorized section and said second motorized section to move the wheelchair in the direction desired by rotational movement of one or more of the first drive wheel and the second drive wheel of the wheelchair.

22. The apparatus of claim 21 further comprising an outrigger support assembly associated with each of said first motorized section and said second motorized section, each of said outrigger support assemblies being structured and arranged to pivotally and/or slidably support said outrigger assemblies relative to said support frame.

23. The apparatus of claim 21, wherein each of said outrigger assemblies has a support arm supported by an outrigger support assembly, each of said support arms configured to support one of said first drive wheel and said second drive wheel of the wheelchair.

24. The apparatus of claim 23 further comprising one or more wheel support mechanisms associated with each of said support arms, said wheel support mechanisms being structured and arranged to engage and support one of said first drive wheel and said second drive wheel of the wheelchair.

25. The apparatus of claim 21, wherein said pivot mechanism comprises a pivot block attached to or integral with each of said outrigger assemblies and one or more enlarged sections attached to or integral with opposing sides of said support frame, said enlarged sections sized and configured to be received in a pivot aperture of said pivot block so as to allow said pivot blocks and said outrigger assemblies to pivot relative to said support frame in response to rotational movement of the first drive wheel and the second drive wheel of the wheelchair.

26. The apparatus of claim 21, wherein each of said first motorized section and said second motorized section has said position sensor mechanism, said position sensor mechanism of said first motorized section operatively associated with said outrigger assembly thereof and said position sensor mechanism of said second motorized section operatively associated with said outrigger assembly thereof, each of said position sensor mechanisms supported by said pivot mechanism.

27. The apparatus of claim 21, wherein each of said motors, said control mechanism and said position sensor mechanism are electrically connected to at least one battery.

* * * * *